US012595855B2

(12) United States Patent
Schmitt et al.

(10) Patent No.: US 12,595,855 B2
(45) Date of Patent: Apr. 7, 2026

(54) POPPET ASSEMBLY AND A CAM-ACTUATED CONTROL VALVE HAVING A POPPET ASSEMBLY

(71) Applicant: HUSCO Automotive Holdings LLC, Waukesha, WI (US)

(72) Inventors: Austin Schmitt, Hartland, WI (US); Michael Kujak, Hartland, WI (US); Gene Shimelfarb, Waukesha, WI (US); Alexander Schlarmann, Watertown, WI (US); Brian Heidemann, Lake Mills, WI (US)

(73) Assignee: HUSCO AUTOMOTIVE HOLDINGS LLC, Waukesha, WI (US)

( * ) Notice: Subject to any disclaimer, the term of this patent is extended or adjusted under 35 U.S.C. 154(b) by 112 days.

(21) Appl. No.: 18/684,509

(22) PCT Filed: Aug. 18, 2022

(86) PCT No.: PCT/US2022/040799
§ 371 (c)(1),
(2) Date: Feb. 16, 2024

(87) PCT Pub. No.: WO2023/023277
PCT Pub. Date: Feb. 23, 2023

(65) Prior Publication Data
US 2024/0353013 A1 Oct. 24, 2024

Related U.S. Application Data

(60) Provisional application No. 63/234,623, filed on Aug. 18, 2021.

(51) Int. Cl.
| | |
|---|---|
| F16K 31/524 | (2006.01) |
| F16K 11/16 | (2006.01) |
| F16K 27/02 | (2006.01) |

(52) U.S. Cl.
CPC ........ F16K 11/166 (2013.01); F16K 27/0263 (2013.01); F16K 31/52416 (2013.01); *F16K 2200/501* (2021.08)

(58) Field of Classification Search
CPC ............. F16K 11/166; F16K 31/52416; F16K 31/52483
See application file for complete search history.

(56) References Cited

U.S. PATENT DOCUMENTS

| | | | | | |
|---|---|---|---|---|---|
| 2,897,891 | A | * | 8/1959 | Nergaard | .............. F16K 11/166 137/637 |
| 3,118,390 | A | * | 1/1964 | Kinsley | ................. F16K 11/166 137/625.48 |

(Continued)

OTHER PUBLICATIONS

International Search Report and Written Opinion for International Application No. PCT/US2022/040799, mailed Dec. 6, 2022, 12 pages.

*Primary Examiner* — Kevin F Murphy
(74) *Attorney, Agent, or Firm* — Foley & Lardner LLP

(57) ABSTRACT

The present disclosure provides a control valve including a camshaft and one or more poppet assemblies. In general, the one or more poppet assemblies can include a poppet carriage that is moveable by the camshaft between a first end position and a second end position, a poppet coupled to the poppet carriage, and a spring configured bias the poppet carriage radially away from the camshaft, toward the first end position, in a first radial direction relative to a camshaft axis. According to some aspects, the camshaft can include a cam lobe that engages the poppet carriage to move the poppet carriage from the first end position toward the second end position in a second radial direction that is opposite the first radial direction.

19 Claims, 28 Drawing Sheets

(56)                    References Cited

U.S. PATENT DOCUMENTS

| | | | | |
|---|---|---|---|---|
| 4,846,138 | A * | 7/1989 | Vallejos | F01L 3/20 |
| | | | | 123/188.3 |
| 6,817,326 | B1 | 11/2004 | Anibas | |
| 7,533,697 | B2 * | 5/2009 | Zeiner | F23K 5/147 |
| | | | | 251/129.03 |
| 10,788,143 | B2 * | 9/2020 | Biester | F01P 7/165 |
| 2015/0041006 | A1 | 2/2015 | Morishita et al. | |
| 2017/0314691 | A1 | 11/2017 | Aboujaib et al. | |
| 2021/0062687 | A1 | 3/2021 | Siefker et al. | |

* cited by examiner

POPPET ASSEMBLY AND A CAM-ACTUATED CONTROL VALVE HAVING A POPPET ASSEMBLY

CROSS-REFERENCE TO RELATED PATENT APPLICATIONS

The present application is a National Stage Entry of International Patent Application No. PCT/US2022/040799, filed on Aug. 18, 2022, which is based on and claims priority to U.S. Provisional Patent Application No. 63/234,623, filed on Aug. 18, 2021, each of which is incorporated herein by reference in its entirety.

BACKGROUND

Generally, control valves can include a poppet that is moveable between one or more positions to selectively provide or inhibit fluid flow along one or more flow paths through the valve.

BRIEF SUMMARY

The present disclosure relates generally to a control valve having a poppet assembly.

In some aspects, the present disclosure provides a control valve including a valve body, a valve chamber arranged within the valve body, one or more chamber ports to provide fluid communication to or from the valve chamber, a camshaft extending through the valve body into the valve chamber along a camshaft axis and including a cam lobe, an actuator coupled to the camshaft to selectively rotate the camshaft about the camshaft axis, and a poppet assembly received within the valve chamber. The poppet assembly includes a poppet carriage operatively coupled to the camshaft and in engagement with the cam lobe such that the poppet carriage is movable by the camshaft between first and second end positions, a poppet coupled to the poppet carriage, and a spring that biases the poppet carriage radially away from the camshaft, toward the first end position, in a first radial direction relative to the camshaft axis. When the camshaft is rotated, the cam lobe engages the poppet carriage to move the poppet carriage from the first end position toward the second end position in a second radial direction that is opposite the first radial direction.

In some aspects, the present disclosure provides a control valve including a valve body having a valve chamber, a first chamber port, and a second chamber port, the first and second chamber ports are configured to provide fluid communication to or from the valve chamber, a camshaft extending through the valve body into the valve chamber along a camshaft axis and including a cam, an actuator coupled to the camshaft and configured to selectively rotate the camshaft about the camshaft axis, and a poppet cartridge received within the valve chamber that has a poppet axis. The poppet cartridge includes a first poppet carriage having a first carriage opening extending through the first poppet carriage between a first outer end and a first inner end of the first poppet carriage that defines a first engagement surface to be engaged by the cam such that the first poppet carriage is movable by the camshaft along the poppet axis between first poppet closed and open positions, a first poppet coupled to the first outer end of the first poppet carriage, a second poppet carriage having a second carriage opening extending through the second poppet carriage between a second outer end and a second inner end of the second poppet carriage that defines a second engagement surface to be engaged by the cam such that the second poppet carriage is movable by the camshaft along the poppet axis between second poppet closed and open positions, a second poppet coupled to the second outer end of the second poppet carriage, and a spring that biases the first and second poppet carriages radially away from the camshaft axis. The first engagement surface of the first poppet carriage is radially opposite the first poppet relative to the camshaft axis, and the second engagement surface of the second poppet carriage is radially opposite the second poppet relative to the camshaft axis.

In some aspects, the present disclosure provides a control valve including a valve body having a first side and a second side opposite the first side, a valve chamber arranged within the valve body having a first chamber port disposed along the first side of the valve body and a second chamber port disposed along the second side of the valve body, a camshaft having first and second cam lobes and that is arranged within a camshaft opening of the valve body extending through first and second ends of the valve body along a camshaft axis, an actuator coupled to the camshaft that selectively rotates the camshaft in at least one rotational direction along the camshaft axis, a first valve chamber manifold coupled to the first side of the valve body having an inlet that provides fluid communication to the first port of the valve body along a first manifold passageway, a second valve chamber manifold coupled to the second side of the valve body having an outlet that provides fluid communication to the second port of the valve body along a second manifold passageway, a cartridge slot extending within the valve chamber between the first and second sides of the valve body, and a poppet cartridge received within the cartridge slot of the valve body and operatively coupled to the camshaft. The poppet cartridge includes a first poppet carriage having a first poppet and that is movable between first poppet closed and open positions with the first poppet engaging the first port of the valve body when the first poppet carriage is in the first poppet closed position, a second poppet carriage having a second poppet and that is movable between second poppet closed and open positions with the second poppet engaging the second port of the valve body when the second poppet carriage is in the second poppet closed position, and a spring coupled between the first and second poppet carriages that biases the first poppet carriage toward the first poppet closed position and the second poppet carriage toward the second poppet closed position. The first cam lobe of the camshaft is configured to engage the first poppet carriage to move the first poppet carriage from the first poppet closed position toward the first poppet open position, and the second cam lobe of the camshaft is configured to engage the second poppet carriage to move the second poppet carriage from the second poppet closed position toward the second poppet open position.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The disclosure will be better understood and features, aspects and advantages other than those set forth above will become apparent when consideration is given to the following detailed description thereof. Such detailed description makes reference to the following drawings.

DETAILED DESCRIPTION

Figure 1:
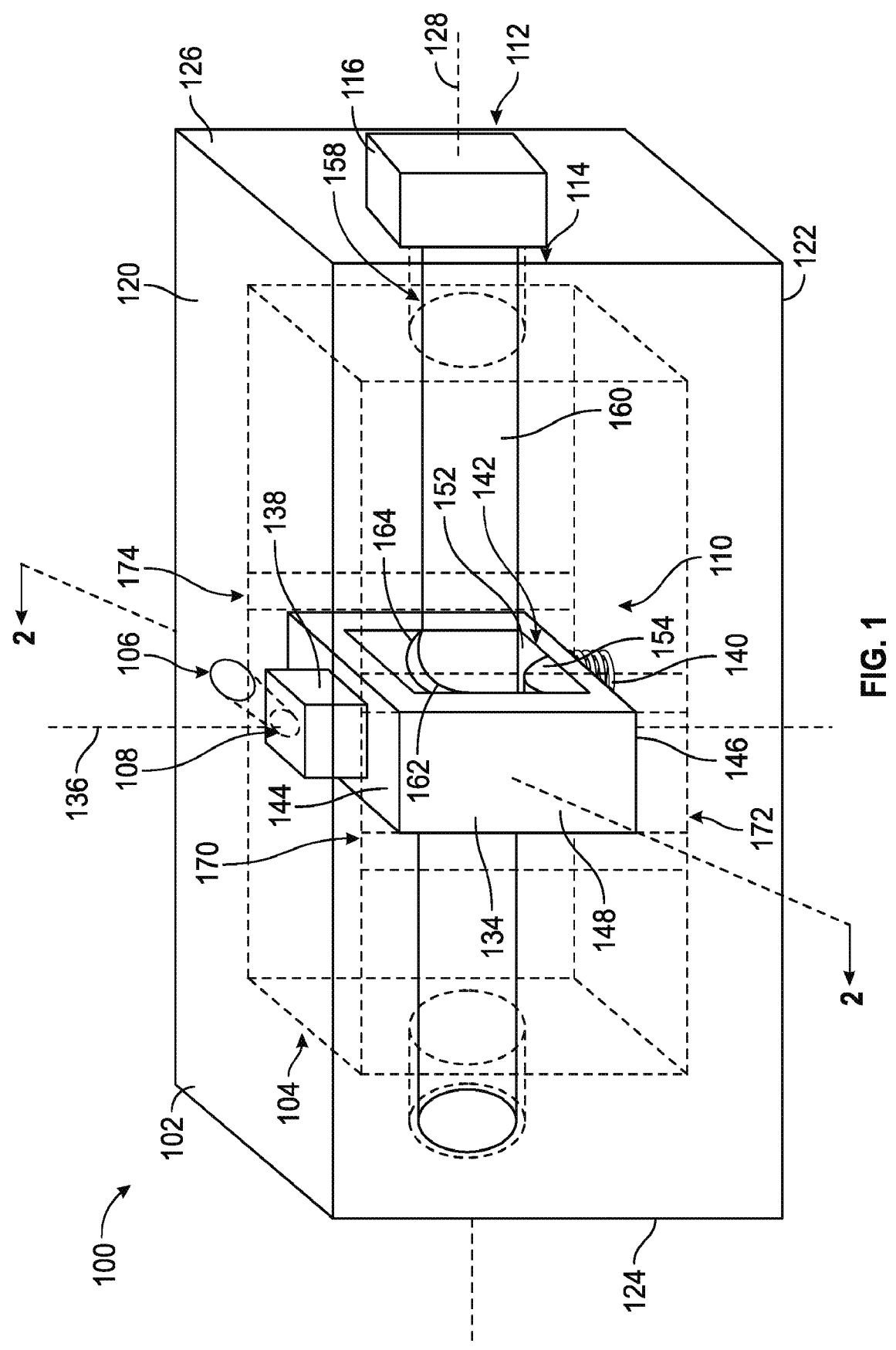
FIG. 1 is an isometric view of a control valve according to one aspect of the present disclosure with a valve body of the control valve illustrated as transparent.

Before any aspects of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use herein of the term "axial" and variations thereof refers to a direction that extends generally along an axis of symmetry, a central axis, or an elongate direction of a particular component or system. For example, an axially-extending structure of a component can extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component can generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

Still further, the use herein of the term "oval shape," "oval shaped," and other variations thereof refers to a shape that is generally round having a first width in a first direction that is different than a second width in a second direction that is orthogonal to the first direction. For example, in some non-limiting examples, a member or a feature of a member (e.g., a perimeter of an opening of the member or an inner or outer perimeter of a structural feature of the member) can define an oval shape. Similarly, the user herein of the term "C-shape," "C-shaped," and other variations thereof refers to a shape that includes a base portion, with at least two leg portions extending in generally similar directions from the base portion. In some non-limiting examples, a C-shaped member can include leg portions extending from opposite ends of the base portion at substantially right angles to the base portion (i.e., deviating from right angles by less than 5 degrees), with or without curved, chamfered, or otherwise non-square connecting regions between the leg portions and the base portion. In some non-limiting examples, a C-shaped member can include leg portions that extend as part of a continuous (e.g., non-angled) curve from either end of a straight or curved base portion. Thus, for example, some C-shaped members may have half-rectangular, semi-circular, or other similar cross-sectional profiles. Further, some C-shaped members may include a first leg that is longer than a second leg. In some non-limiting examples, a base portion of a C-shaped member can extend over a circular segment.

In general, as will be described in detail herein, a control valve can include one or more poppet assemblies that can be selectively movable between a poppet closed position and a poppet open position via a camshaft assembly. For example, the poppet assembly can include a poppet that is toward a chamber port (i.e., the poppet closed position) of one or more valve chambers of the control valve. The selective movement of the poppet from the poppet closed position toward the poppet open position can be accomplished by rotatable engagement of a cam of the camshaft with a poppet engagement surface of the poppet assembly. For example, the cam can rotatably engage the poppet engagement surface of the poppet assembly to cause the poppet to move toward the camshaft (i.e., toward the poppet open position).

Conventional poppet assemblies of a control valve typically require the poppet assembly to be arranged within a chamber port of the valve body outside of the valve chamber. Such conventional arrangements of poppet assemblies can require greater biasing force to overcome fluid pressure within the valve chamber with the poppet in the poppet closed position, and can lead to increased wear on the poppet assembly. The poppet assembly described herein can overcome these deficiencies by providing a poppet assembly that can be arranged within a valve chamber of a valve body of the control valve. According to some aspects of the present disclosure, a poppet assembly can include at least two poppet carriages, at least two poppets, and at least one spring arranged between the at least two poppet carriages that together can form a poppet cartridge that can be arranged within a valve chamber of a control valve.

FIG. 1 illustrates one non-limiting example of a control valve 100 according to the present disclosure. The control valve 100 can include a valve body 102 with a valve chamber 104 and at least one valve port 106 defined by at least one side of the valve body 102. The valve chamber 104 of the valve body 102 is in fluid communication with the valve port 106 via one or more chamber ports 108 of the valve body 102 that can be defined along at least one side of the valve body 102. The control valve 100 can further include a poppet assembly 110 received within the valve chamber 104 of the valve body 102. As will be described herein, the poppet assembly 110 can be selectively moved between two or more positions via a camshaft assembly 112, which can be rotatable within a camshaft opening 114 of the valve body 102 by an actuator 116, to provide or inhibit fluid communication to or from the valve port 106 via the chamber port 108 of the valve chamber 104. In some non-limiting examples, the control valve 100 can include one or more valve chamber covers or manifolds (see, e.g., FIG. 6) that can provide fluid communication between a chamber port and a valve port.

In the illustrated non-limiting example, the valve chamber 104 of the valve body 102 of the control valve 100 can extend between a first or upper side 120 and a second or lower side 122 of the valve body 102, opposite the upper side 120, and between a first valve body end 124 and a second valve body end 126 of the valve body 102, opposite the first valve body end 124. The camshaft opening 114 can extend axially from the second valve body end 126 through the valve chamber 104 and toward the first valve body end 124 along the camshaft axis 128. In some non-limiting examples, the valve body 102 can include a plurality of valve chambers 104 and the camshaft opening 114 can extend through each of the plurality of valve chambers 104. In some non-limiting examples, the camshaft opening 114 can extend through each of the first and second valve body ends 124, 126.

The poppet assembly 110 of the control valve 100 can include a poppet carriage 134 arranged within the valve chamber 104 and that has a poppet axis 136, a poppet 138 coupled to the poppet carriage 134, and a spring 140 connected to the valve chamber 104 and the poppet carriage 134. In the illustrated non-limiting example, a carriage opening 142 extends through the poppet carriage 134 between a first or upper carriage end 144 and a second or lower carriage end 146 of the poppet carriage 134, opposite the upper carriage end 144, and between a first lateral side 148 and a second lateral side 150 (see FIGS. 2 and 3) of the poppet carriage 134, opposite the first lateral side 148, relative to the poppet axis 136. The carriage opening 142 can define a carriage engagement surface 152 that can be engaged by the camshaft assembly 112. In the illustrated non-limiting example, the carriage engagement surface 152 includes a protrusion 154 extending from the lower carriage end 146, towards the camshaft axis 128, into the carriage opening 142.

In the illustrated non-limiting example, the poppet 138 of the poppet assembly 110 can be coupled to the upper carriage end 144, and the spring 140 can be coupled to the valve chamber 104 and the lower carriage end 146 opposite the poppet 138. In some non-limiting examples, the poppet 138 can include a sealing element (not shown) arranged along an outer perimeter of the poppet 138 to provide a seal between the poppet 138 and a surface of the valve chamber 104 (e.g., the surface adjacent to the chamber port 108). In some non-limiting examples, an outer perimeter of the poppet 138 can define a substantially circular shape, however, other shapes could be used. For example, the poppet 138 can be substantially oval, square, or rectangular in shape. In some non-limiting examples, the poppet 138 can be planar (e.g., flat). In other non-limiting examples, the poppet 138 can define a concave or a convex shape. In the illustrated non-limiting example, the poppet carriage 134 and the poppet 138 can be integrally formed as a unitary component. In some non-limiting examples, the spring 140 can include a first spring coupled to the valve chamber 104 and the lower carriage end 146 adjacent to the first lateral side 148 of the poppet carriage 134 and a second spring coupled to the valve chamber 104 and the lower carriage end 146 adjacent to the second lateral side 150 of the poppet carriage 134.

The camshaft assembly 112 of the control valve 100 can include a camshaft 158 arranged within the camshaft opening 114 of the valve body 102 such that the camshaft 158 extends through the valve body 102 into the valve chamber 104 along the camshaft axis 128. One end of the camshaft 158 can be coupled to the actuator 116, which can be arranged on the second valve body end 126 adjacent to the camshaft opening 114, to rotate the camshaft 158 in at least one rotational direction about the camshaft axis 128. In the illustrated non-limiting example, the camshaft 158 includes a central shaft 160, at least one cam 162 fixedly attached to and disposed axially along the central shaft 160 within the valve chamber 104, and at least one cam lobe 164 extending radially from the at least one cam 162. In some non-limiting examples, the camshaft 158 can include two or more cams 162. In some non-limiting examples, the at least one cam 162 can include two or more cam lobes 164 disposed in a single valve chamber 104.

Figure 2:
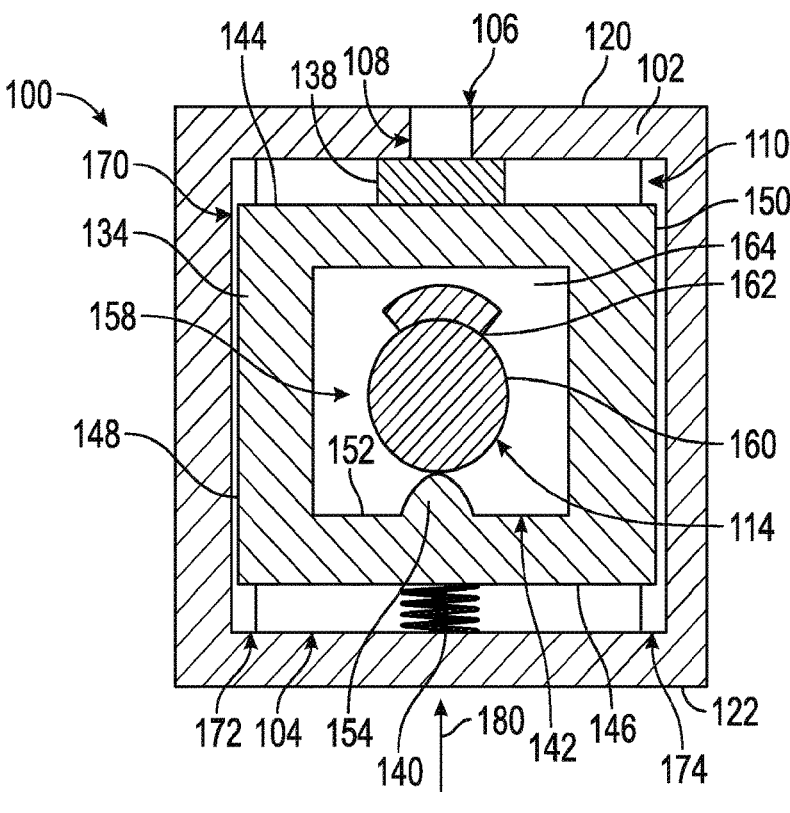
FIGS. 2 and 3 are cross-sectional views of the control valve of FIG. 1 taken along line 2-2 of FIG. 1 with a poppet carriage in a first end position and in a second end position, respectively.
Figure 3:
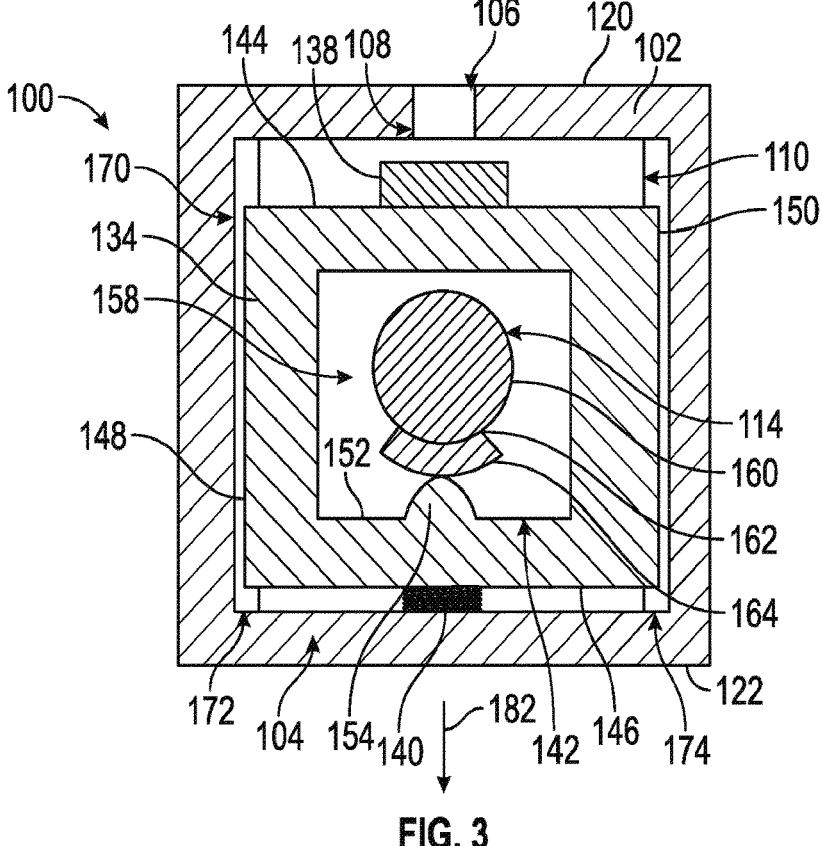

The poppet carriage 134 can be slidably arranged within a guide slot 170 defined in the valve chamber 104. In the illustrated non-limiting example, the guide slot 170 of the valve chamber 104 can include a first guide slot 172 configured to receive the first lateral side 148 of the poppet carriage 134 and a second guide slot 174, opposite the first guide slot 172, relative to the camshaft axis 128 that is configured to receive the second lateral side 150 of the poppet carriage 134. As such, the poppet carriage is moveable within the guide slot 170 of the valve chamber 104 between a first end position (as shown in FIGS. 1 and 2) and a second end position (as shown in FIG. 3) along the poppet axis 136. In the illustrated non-limiting example, the poppet assembly 110 can be configured such that, when the poppet carriage 134 is in the first end position, the poppet 138 engages the chamber port 108 and is in a closed position to block flow between the valve chamber 104 and the valve port 106, and, when the poppet carriage 134 is in the second end position, the poppet 138 disengages the chamber port 108 and is in an open position to permit flow between the valve chamber 104 and the valve port 106. Further, in the illustrated non-limiting example, the spring 140 is configured to bias the poppet carriage 134 toward the first end position (i.e., and the chamber port 108) in a first radial direction 180 (see FIG. 2) relative to the camshaft axis 128. In the illustrated non-limiting example, the spring 140 can be axially aligned with the poppet axis 136 such that the biasing force provided by the spring 140 is axially aligned with the poppet 138 and the chamber port 108. In some non-limiting examples, the spring 140 can include a first spring arranged within the first guide slot 172 of the valve chamber 104 and a second spring arranged within the second guide slot 174 of the valve chamber 104.

As shown in FIGS. 2 and 3, the camshaft 158 extends through the carriage opening 142 of the poppet carriage 134 such that the at least one cam lobe 164 of the at least one cam 162 is in axial alignment with the carriage opening 142. Thus, when the central shaft 160 of the camshaft 158 is rotated about the camshaft axis 128 via the actuator 116 in a first rotational direction, the cam lobe 164 engages the protrusion 154 of the poppet carriage 134 and causes the poppet carriage 134 to move from the first end position (as shown in FIG. 2) toward the second end position (as shown in FIG. 3) in a second radial direction 182 (see FIG. 3) that is opposite the first radial direction 180 while compressing the spring 140. As the camshaft 158 continues to rotate in the first rotational direction with the poppet carriage 134 in the second end position, the cam lobe 164 disengages the protrusion 154 of the poppet carriage 134 and the spring 140 biases the poppet carriage 134 back toward the first end position in the first radial direction 180.

Figure 4:
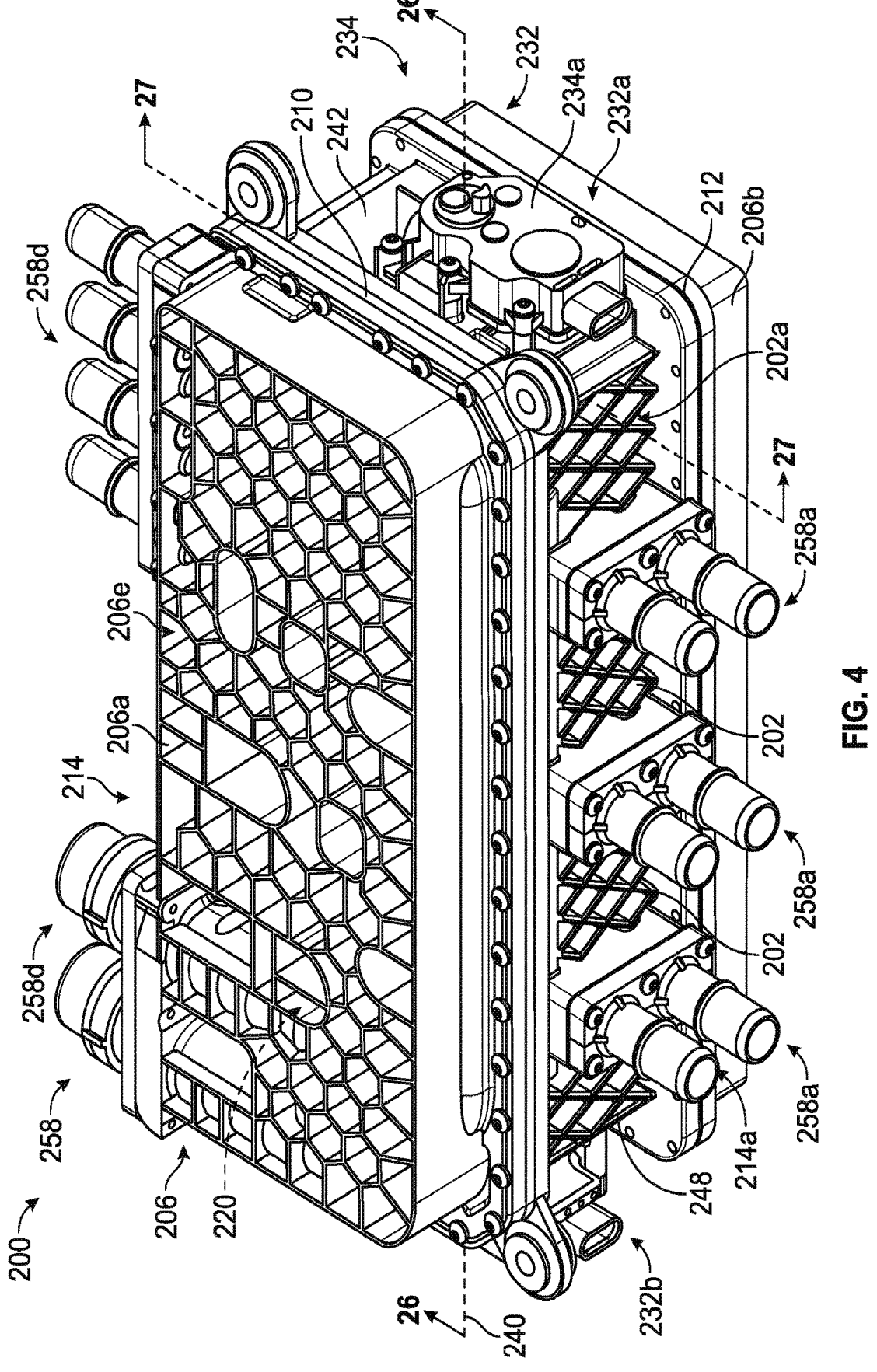
FIG. 4 is an isometric view of a control valve according to one aspect of the present disclosure.

It should be appreciated that a poppet assembly of a control valve can include at least two poppets that are arranged radially opposite each other relative to a camshaft and can be simultaneously biased radially outward from the camshaft to engage two or more chamber ports of a valve chamber. For example, a poppet assembly of a control valve can include at least one poppet subassembly (i.e., a poppet cartridge) that can include first and second poppet carriages each having a poppet that can be engaged by a single camshaft assembly. It should be further appreciated that a control valve can include multiple valve chambers each having at least one chamber port that can be engaged by one or more poppet cartridges. Further, the valve chambers can be in fluid communication with each other or with one or more valve ports of the control valve via one or more valve manifolds of the control valve in fluid communication with the valve chamber ports. In this regard, FIG. 4 illustrates another non-limiting example of a control valve 200 according to the present disclosure. The control valve 200 illustrated in FIG. 4 can be substantially similar to the control valve 100 in FIGS. 1-3.

Figure 5:
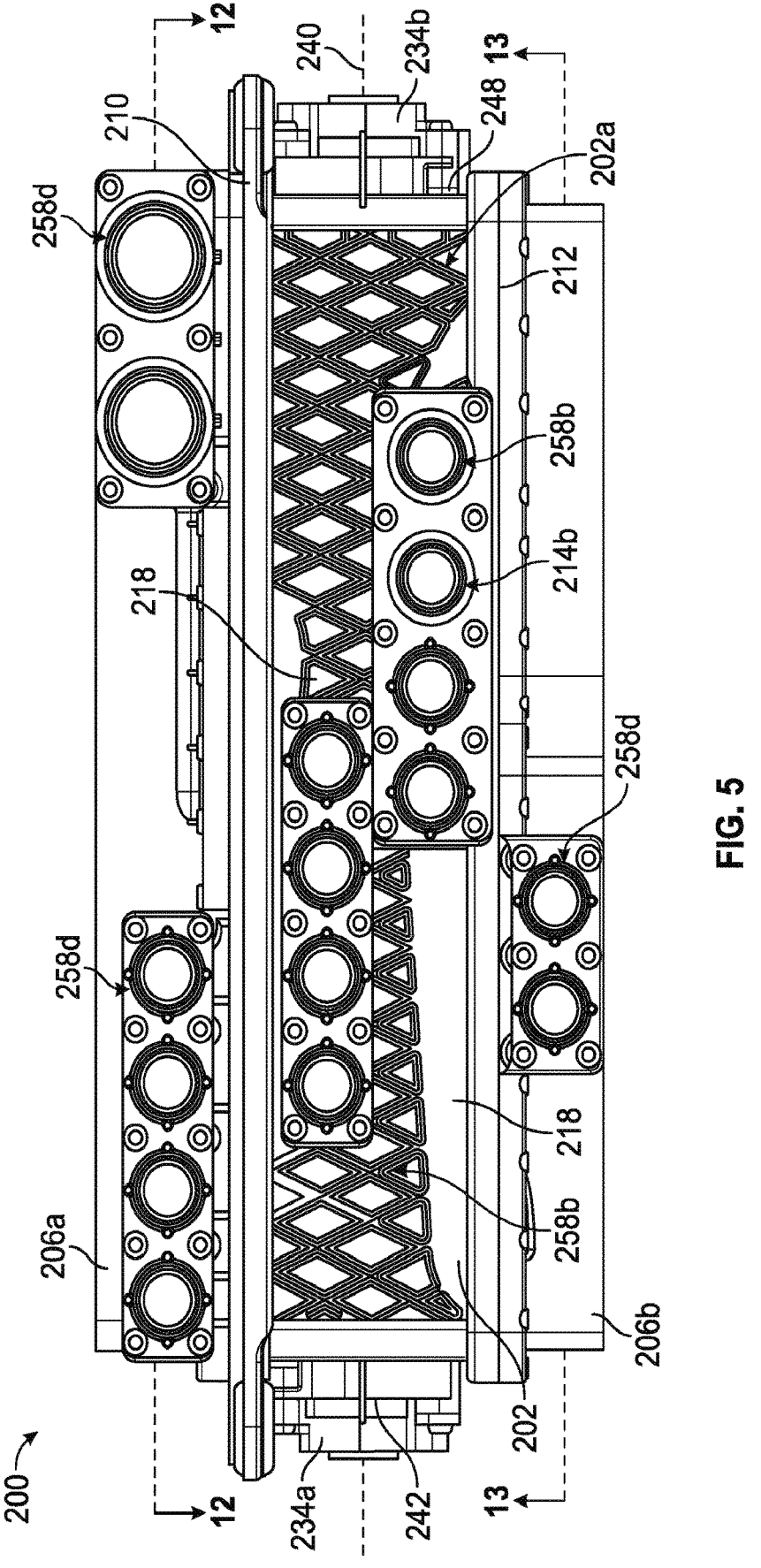
FIG. 5 is a rear view of the control valve of FIG. 4.
Figure 6:
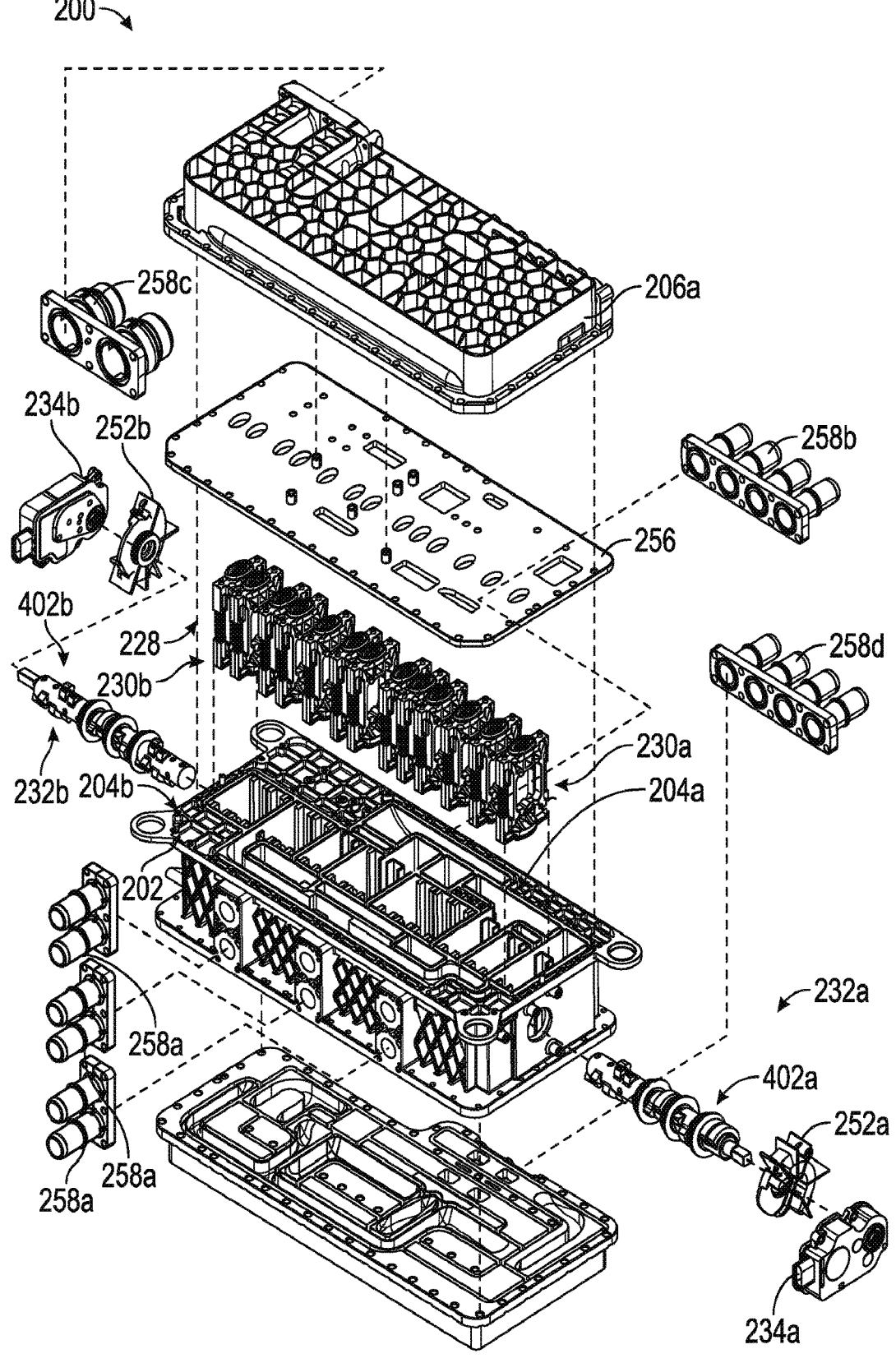
FIG. 6 is an exploded view of the control valve of FIG. 4.

Referring to FIGS. 4-6, in the illustrated non-limiting example, the control valve 200 can include a valve body 202 with one or more valve chambers 204 (see FIG. 6) and one or more valve chamber manifolds or covers 206 attached to the valve body 202. In the illustrated non-limiting example, the control valve 200 has a first or upper valve chamber manifold 206a attached to a first or upper side 210 of the valve body 202 and a second or lower valve chamber manifold 206b attached to a second or lower side 212 of the valve body 202, opposite the upper side 210. The control valve 200 can include one or more valve ports 214 that can be arranged on a third or front side 216 and/or a fourth or rear side 218 of the valve body 202 and/or on at least one of the upper and lower valve chamber manifolds 206a, 206b. The one or more valve chambers 204 of the valve body 202 are in fluid communication with the valve ports 214 via one or more chamber ports 220 (see FIG. 8) of the valve body 202 that can be defined in the upper and/or lower sides 210, 212 of the valve body 202. The control valve 200 can further include a poppet cartridge assembly 228 that can include one or more poppet cartridges 230 (see FIG. 6) received within the one or more valve chambers 204 of the valve body 202. As will be described herein, the one or more poppet cartridges 230 of the poppet assembly 228 can be selectively moved between two or more positions via one or more camshaft assemblies 232 (see FIG. 6), which can be rotatable by one or more actuators 234 within a camshaft opening 236 (see FIG. 7) of the valve body 202 along a camshaft axis 240, to provide or inhibit fluid communication to or from the valve ports 214 via the chamber ports 220 of the valve chambers 204 of the valve body 202.

Referring specifically to FIG. 6, the valve body 202 can include a plurality of valve chambers 204 (see FIG. 7) that can be configured to receive one or more poppet cartridges 230 of the poppet assembly 228. For example, in the illustrated non-limiting example, the valve body 202 can have a first plurality of valve chambers 204a that can be configured to receive a first plurality of poppet cartridges 230a of the poppet assembly 228 and a second plurality of valve chambers 204b that can be configured to receive a second plurality of poppet cartridges 230b of the poppet assembly 228. In particular, in the illustrated non-limiting example, each of the first plurality of valve chambers 204a can be configured to receive one or more of the first plurality of poppet cartridges 230a, and each of the second plurality of valve chambers 204b can be configured to receive one or more of the second plurality of poppet cartridges 230b. In some non-limiting examples, a single plurality of valve chambers 204 can be configured to receive both the first and second pluralities of poppet cartridges 230a, 230b of the poppet assembly 228. In some non-limiting examples, the valve body 202 can include three or more pluralities of valve chambers 204 that are configured to receive corresponding three or more pluralities of poppet cartridges 230 of the poppet assembly 228. In some non-limiting examples, the number of sets of the plurality of valve chambers can correspond to the number of camshaft assemblies.

With reference still to FIG. 6, the camshaft assembly 232 of the control valve 200 can include a first camshaft assembly 232a and a second camshaft assembly 232b. Further, the camshaft opening 236 of the valve body 202 can include a first camshaft opening 236a and a second camshaft opening 236b. As will be discussed in greater detail herein, a first camshaft 402a (see FIG. 21) of the first camshaft assembly 232a can be arranged within the first camshaft opening 236a of the valve body 202 and can be configured to engage each of the first plurality of poppet cartridges 230a arranged within the first plurality of valve chambers 204a. Likewise, a second camshaft 402b of the second camshaft assembly 232b can be arranged within the second camshaft opening 236b of the valve body 202 and can be configured to engage each of the second plurality of poppet cartridges 230a arranged within the second plurality of valve chambers 204b. In some non-limiting examples, the control valve 200 can include three or more camshaft assemblies 232 and the valve body 202 can include three or more camshaft openings 236. In some non-limiting examples, the first and second camshaft assemblies 232a, 232b can be arranged within a single camshaft opening 236 of the valve body 202.

Figure 7:
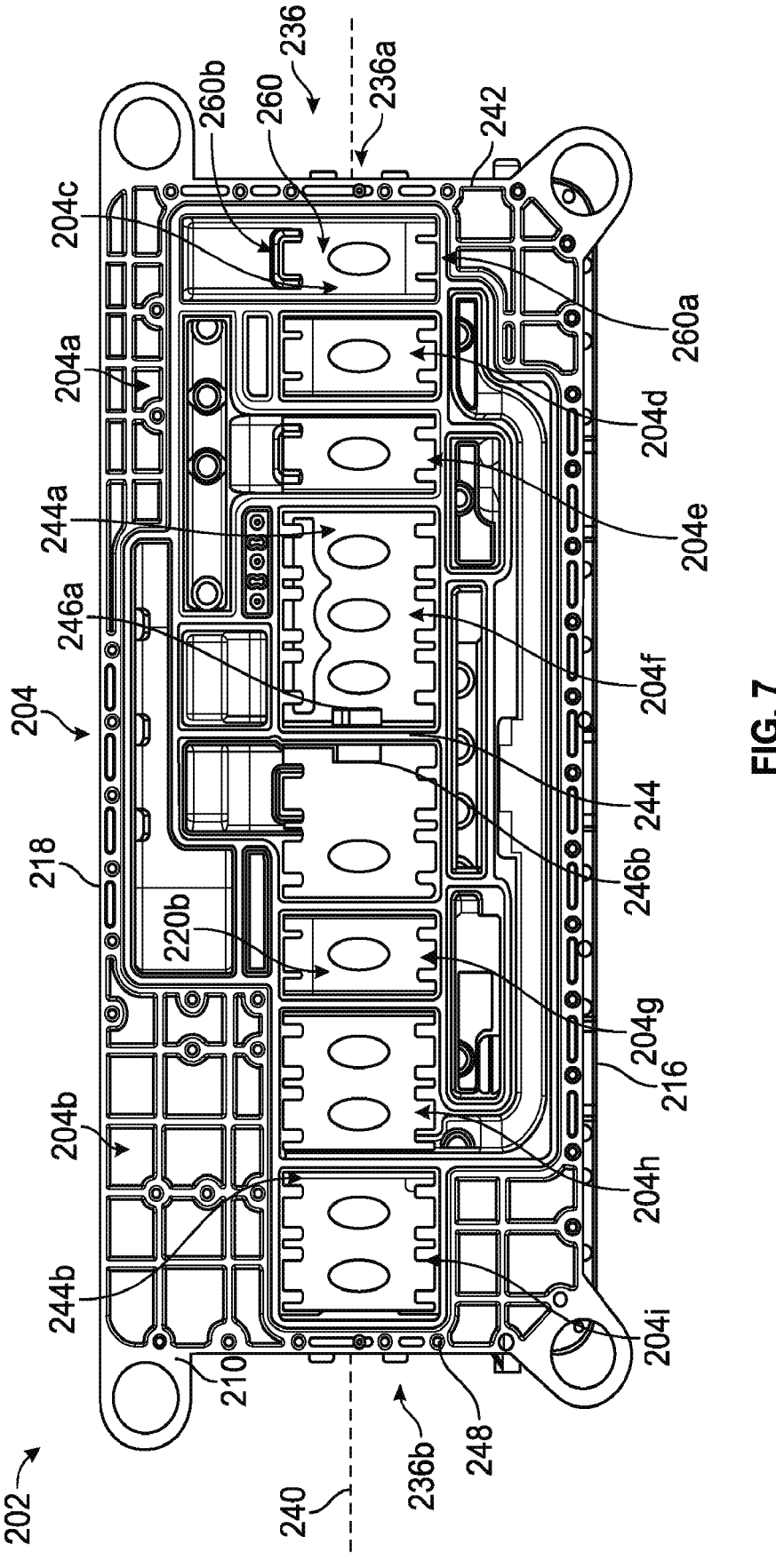
FIG. 7 is a top view of a valve body of the control valve of FIG. 6.
Figure 8:
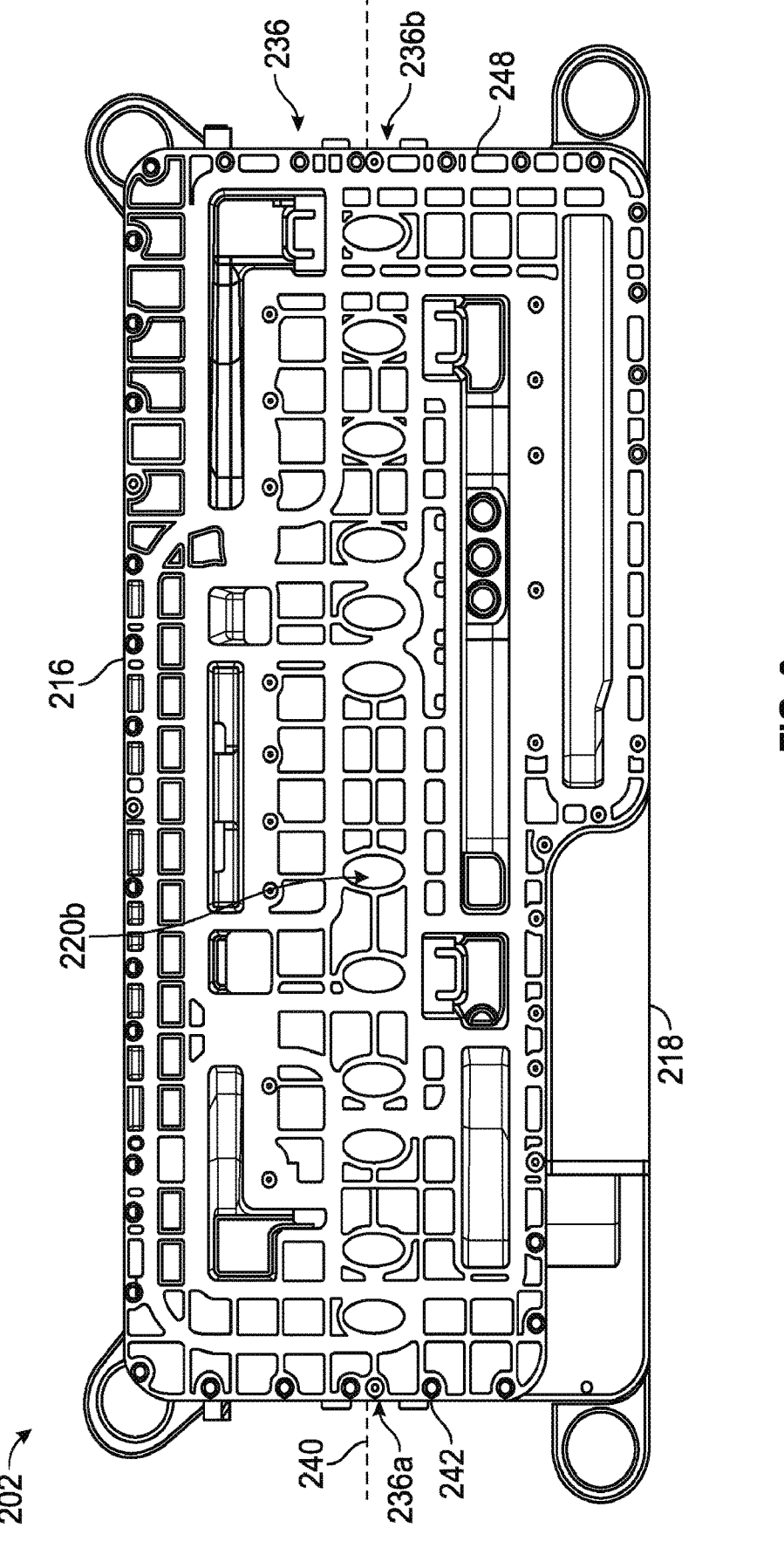
FIG. 8 is a bottom view of the valve body of FIG. 7.

Referring now to FIG. 7 in particular, the first camshaft opening 236a of the valve body 202 can extend axially along the camshaft axis 240 from a first or right valve body end 242 toward a central sidewall 244 of the valve body 202, which can be disposed between the first and second pluralities of valve chambers 204a, 204b, and a first camshaft end support 246a can be defined on the central sidewall 244. Similarly, the second camshaft opening 236b of the valve body 202 can extend axially along the camshaft axis 240 from a second or left valve body end 248 toward the central sidewall 244 of the valve body 202 and a second camshaft end support 246b can be defined on the central sidewall 244 opposite the first camshaft end support 246a. In some non-limiting examples, the first camshaft opening 236a can define a first camshaft axis and the second camshaft opening 236b can define a second camshaft axis that can be offset axially or angularly from the first camshaft axis. That is, the first camshaft 402a can be arranged in axial alignment with the second camshaft 402b, as illustrated in FIG. 6. However, in other non-limiting examples, first and second camshafts can be arranged in parallel, and horizontally or vertically offset. In other non-limiting examples, the first and second camshafts can be angularly offset relative to one another.

Referring again to FIG. 6, the first camshaft assembly 232a can be coupled to a first camshaft actuator 234a that can be attached to the first valve body end 242, and the second camshaft assembly 232b can be coupled to a second camshaft actuator 234b that is attached to the second valve body end 248. As will be discussed in greater detail herein, in the illustrated non-limiting example, one or more actuator sealing adapters 252a, 252b can be arranged between the first and second valve body ends 242. 248 and the first and second camshaft actuators 234a, 234b, respectively, to prevent leakage from the first and second camshaft openings 236a, 236b of the valve body 202 In some non-limiting examples, a single actuator 234 that can be coupled to both the first and second camshaft assemblies 232a, 232b.

Still referring to FIG. 6, the upper side 210 of the valve body 202 can be generally open to provide access for installation and maintenance of the plurality of poppet cartridges 230 within the valve chambers 204 of the valve body 202 and then closed via a seal plate 256 arranged between the upper side 210 of the valve body 202 and the upper valve chamber manifold 206a. As such, in the illustrated non-limiting example, the seal plate 256 can define one or more first or upper chamber ports 220a (see FIG. 10) of the plurality of chamber ports 220 of the valve chambers 204 of the valve body 202 along the upper side 210 of the valve body 202. As will be discussed in greater detail herein, the upper chamber ports 220a that can be defined by the seal plate 256 can be opposite one or more second or lower chamber ports 220b (see FIG. 8) that can be defined by the lower side 212 of the valve body 202. In some non-limiting examples, the upper chamber ports 220a can be aligned axially with the lower chamber ports 220b. In some non-limiting examples, the control valve 200 can have more upper chamber ports 220a than lower chamber ports 220b, or vice versa. In some non-limiting examples, the lower side 212 of the valve body 202 can be generally open and the seal plate 256 can be arranged between the lower side 212 of the valve body 202 and the lower valve chamber manifold 206b and can define the lower chamber ports 220b of the valve chambers 204 of the valve body 202. In some non-limiting examples, both the upper and lower sides 210, 212 of the valve body 202 can be generally open and the seal plate 256 can include a first or upper seal plate arranged between the upper side 210 of the valve body 202 and the upper valve chamber manifold 206a and a second or lower seal plate arranged between the lower side 212 of the valve body 202 and the lower valve chamber manifold 206b. In such non-limiting examples, the upper seal plate can define the upper chamber ports 220a and the lower seal plate can define the lower chambers ports 220b. In some non-limiting examples, the plurality of chamber ports 220 of the valve chambers 204 can include one or more chamber ports defined on the front or rear sides 216, 218 of the valve body 202. In such non-limiting examples, alternatively or additionally, the front and/or rear sides 216, 218 of the valve body 202 can be generally open and closed by a seal plate 256.

Referring to FIGS. 5 and 6, the one or more valve ports 214 of the control valve 200 can include one or more pluralities of valve ports 214. For example, in the illustrated non-limiting example, the control valve 200 includes a first plurality of valve ports 214a disposed along the front side 216 of the valve body 202, a second plurality of valve ports 214b disposed along the rear side 218 of the valve body 202, a third plurality of valve ports 214c disposed on the upper valve chamber manifold 206a, and a fourth plurality of valve ports 214d disposed on the lower valve chamber manifold 206b. In the illustrated non-limiting example, one or more of the pluralities of valve ports 214a, 214b, 214c, 214d can be in fluid connection with one or more of the other valve ports 214a, 214b, 214c, 214d via the valve body 202 and/or the upper and lower valve manifolds 206a, 206b. In some in some non-limiting examples, one or more valve ports 214 can be disposed on the first and second valve body ends 242, 248.

The control valve 200 can include on or more port connectors 258 that can facilitate fluid communication between the valve ports 214a, 214b, 214c, 214d and/or an external conduit (not shown). In the illustrated non-limiting example, the control valve 200 includes one or more first port connectors 258a removably attached to the front side 216 of the valve body 202 at the first plurality of valve ports 214a, one or more second port connectors 258b removably attached to the rear side 218 of the valve body 202 at the second plurality of valve ports 214c, one or more third port connectors 258c removably attached to the upper valve chamber manifold 206a at the third plurality of valve ports 214c, and one or more fourth port connectors 258d removably attached to the lower valve chamber manifold 206b at the fourth plurality of valve ports 214d. In some non-limiting examples, at least one of the first and second port connectors 258a, 258b can be integrally formed with the valve body 202. In some non-limiting examples, the third and fourth port connectors 258c, 258d can be integrally formed with the upper and lower valve chamber manifolds 206a, 206b, respectively.

As shown particularly in FIG. 7, the first plurality of valve chambers 204a of the valve body 202 can include a first valve chamber 204c disposed adjacent to the first valve body end 242, a second valve chamber 204d disposed adjacent to the first valve chamber 204c, a third valve chamber 204e disposed adjacent to the second valve chamber 204c, and a fourth valve chamber 204f disposed adjacent to both the third valve chamber 204e and the central sidewall 244 of the valve body 202. Likewise, the second plurality of valve chambers 204b can include a fifth valve chamber 204g disposed adjacent to the central sidewall 244 opposite the fourth valve chamber 204f, a sixth valve chamber 204h disposed adjacent to the fifth valve chamber 204g, a seventh valve chamber 204i disposed adjacent to the sixth valve chamber 204h, and an eighth valve chamber 204j disposed adjacent to both the seventh valve chamber 204i and the second valve body end 248. In other words, in the illustrated non-limiting example, the first and second pluralities of valve chambers 204a, 204b can be disposed in series within the valve body 202 along the camshaft axis 240 from the first valve body end 242 to the second valve body end 248 and separated by the central sidewall 244. In some non-limiting examples, the first plurality of valve chambers 204a can be disposed in parallel to the second plurality of valve chambers 204b. In some non-limiting examples, the first plurality of valve chambers 204a can include more or less chambers 204 than the second plurality of valve chambers 204b. In some non-limiting examples, the first plurality of valve chambers 204a can be disposed radially opposite the second plurality of valve chambers 204b relative to the camshaft axis 240.

In the illustrated non-limiting example, each of the first plurality of valve chambers 204a can separated from each other along the camshaft axis 240 (or a first camshaft axis) by a first plurality of sidewalls 244a that can extend between the upper and lower sides 210, 212 of the valve body 202. Likewise, each of the second plurality of valve chambers 204b can be separated from each other along the camshaft axis 240 (or a second camshaft axis) by a second plurality of sidewalls 244b that can extend between the upper and lower sides 210, 212 of the valve body 202. In some non-limiting examples, the central sidewall 244 can be closer to the first valve body end 242 than the second valve valve body end 248, or vice versa. In some non-limiting examples, one or more of the first and second pluralities of sidewalls 244a, 244b can be moveable during operation of the control valve 200 to selectively combine two or more valve chambers 204.

Referring still to FIG. 7, each of the valve chambers 204 can be configured to slidably receive one or more poppet cartridges 230 of the poppet assembly 228 such that the cartridge 230 is contained within the valve body 202. For example, in the illustrated non-limiting example, each of the valve chambers 204 can include one or more cartridge guides or slots 260 that can be defined by inner surfaces of the valve chamber 204 that can extend within the valve chamber 204 between the upper and lowers sides 210, 212 of the valve body 202. In the illustrated non-limiting example, the one or more cartridge slots 260 of the valve chambers 204 can include a first guide slot 260a that can extend along one side of the valve chamber 204 and a second guide slot 260b extending along a second another side of the valve chamber 204 such that the first and second guide slots 260a, 260b can be parallel and aligned opposite each other.

As briefly mentioned above, and with reference specifically to FIGS. 7 and 8, the lower side 212 of the valve body 202 can partially define the valve chambers 204 and can also define the lower chamber ports 220b of one or more of the valve chambers 204. In the illustrated non-limiting example, the valve body 202 can be configured such that each of the valve chambers 204 can have at least one lower chamber port 220b. In some non-limiting examples, one or more of the valve chambers 204 can have only an upper chamber port 220a. In some non-limiting examples, one or more of the valve chambers 204 can have two or more lower chamber ports 220b and two or more upper chamber ports 220a. In some non-limiting examples, the number of lower chamber ports 220b in a particular valve chamber 204 can correspond to the number of poppet cartridges 230 that are received within that valve chamber 204. For example, in the illustrated non-limiting example, the first valve chamber 204c can be configured to receive a single poppet cartridge 230 and can have one lower chamber port 220b, the eighth valve chamber 204j can be configured to receive two poppet cartridges 230 and can have two lower chamber ports 220b, and the fourth valve chamber 204f can be configured to receive three poppet cartridges 230 and can have three lower chamber ports 220b.

Figure 9:
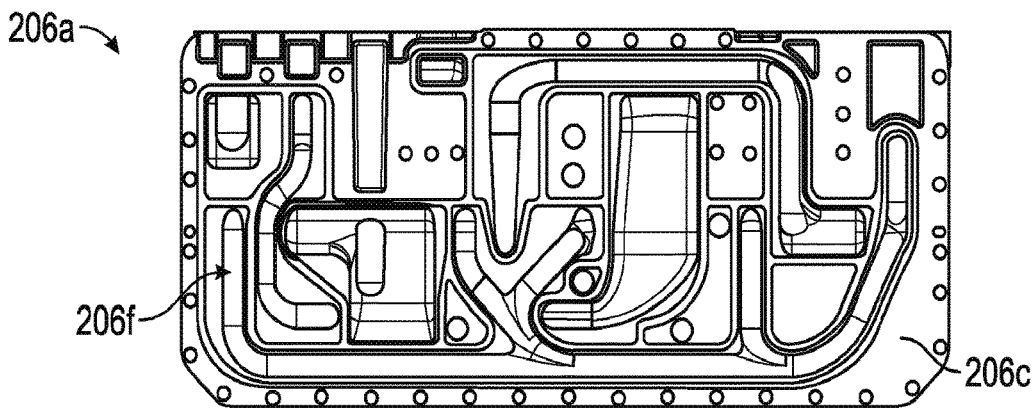
FIG. 9 is a bottom view of a first valve chamber manifold of the control valve of FIG. 6.
Figure 26:
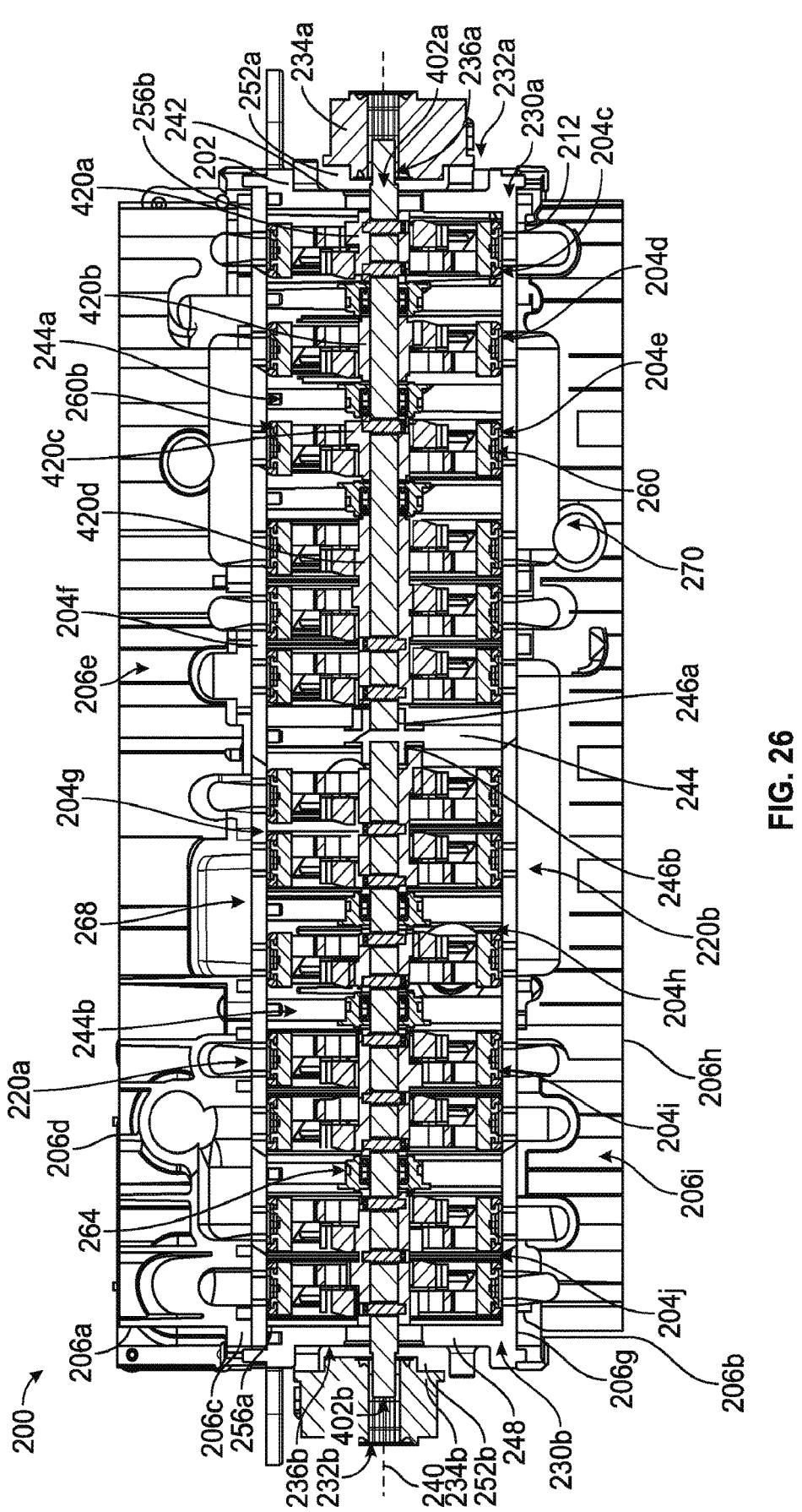
FIG. 26 is a cross-sectional view of the control valve taken along line 26-26 of FIG. 4.

Referring now to FIG. 9, the upper valve chamber manifold 206a can have an inner side 206c and an outer side 206d (see FIG. 26) opposite the inner side 206c. In the illustrated non-limiting example, the inner side 206c of the upper valve chamber manifold 206a can have an outer perimeter that is similar to an outer perimeter of the upper side 210 of the valve body 202 and can be configured to cover and attach to the upper side of 210 of the valve body 202 (and/or the seal plate 256). In some non-limiting examples, the upper valve chamber manifold 206a can include two or more upper valve chamber manifolds that are configured to cover different sections of the upper side 210 of the valve body 202. For example, in some non-limiting examples a first upper valve chamber manifold can be disposed over the first plurality of valve chambers 204a, and a second upper valve chamber manifold can be disposed over the second plurality of valve chambers 204b. In some nonlimiting examples, the upper valve chamber manifold 206a can include a lower portion extending from the inner side 206c toward the outer side 206d that is formed of a first material and an upper portion extending from the outer side 206d to the lower portion that is formed of a second material that is different than the first material.

Figure 10:
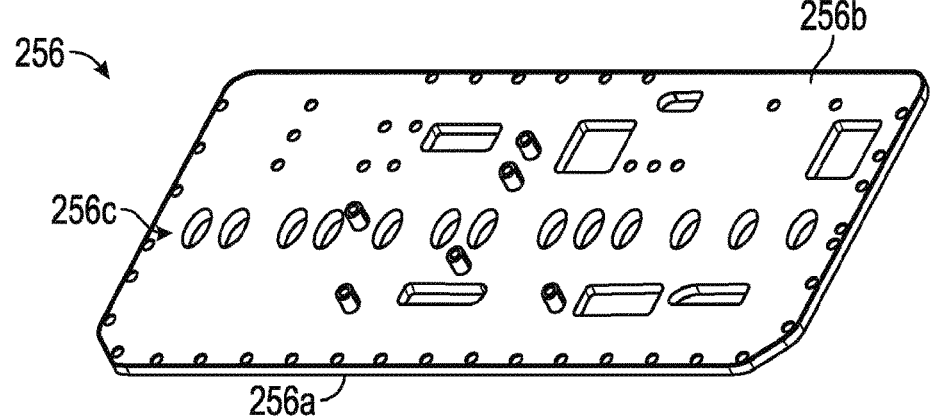
FIG. 10 is an isometric view of a seal plate of the control valve of FIG. 6.

Referring now to FIG. 10, the seal plate 256 can have an inner side 256a and an outer side 256b opposite the inner side 256a. As shown particularly in FIG. 10, the seal plate 256 can have an outer perimeter that is similar to both an outer perimeter of the upper valve chamber manifold 206a and an outer perimeter of the upper side 210 of the valve body 202. As such, in the illustrated non-limiting example, the inner side 256a of the seal plate 256 can contact the upper side 210 of the valve body 202 while the outer side 256b of the seal plate 256 can contact the inner side 206c of the upper valve chamber manifold 206a. As briefly mentioned above, the seal plate 256 can define one or more of the valve chambers 204 of the valve body 202 and one or more of the upper chamber ports 220 of the valve chambers 204. For example, in the illustrated non-limiting example, when the seal plate 256 is attached to the upper side 210 of the valve body 204, the inner side 256a of the seal plate 256 can partially define the valve chambers 204 of the valve body 204 and one or more apertures 256c extending through the seal plate 256 from the inner side 256a to the outer side 256b can define the upper chamber ports 220a of the valve chambers 204. In some non-limiting examples, the seal plate 256 can include two or more seal plates that can be attached to different sections of the upper side 210 of the valve body 202 and/or the inner side 206c of the upper valve chamber manifold 206a. For example, in some non-limiting examples a first seal plate can be attached to one section of the valve body 202 and can partially define the first plurality of valve chambers 204a, and a second seal plate can be attached to a different section of the valve body 202 and can partially define the second plurality of valve chambers 204b.

Figure 12:
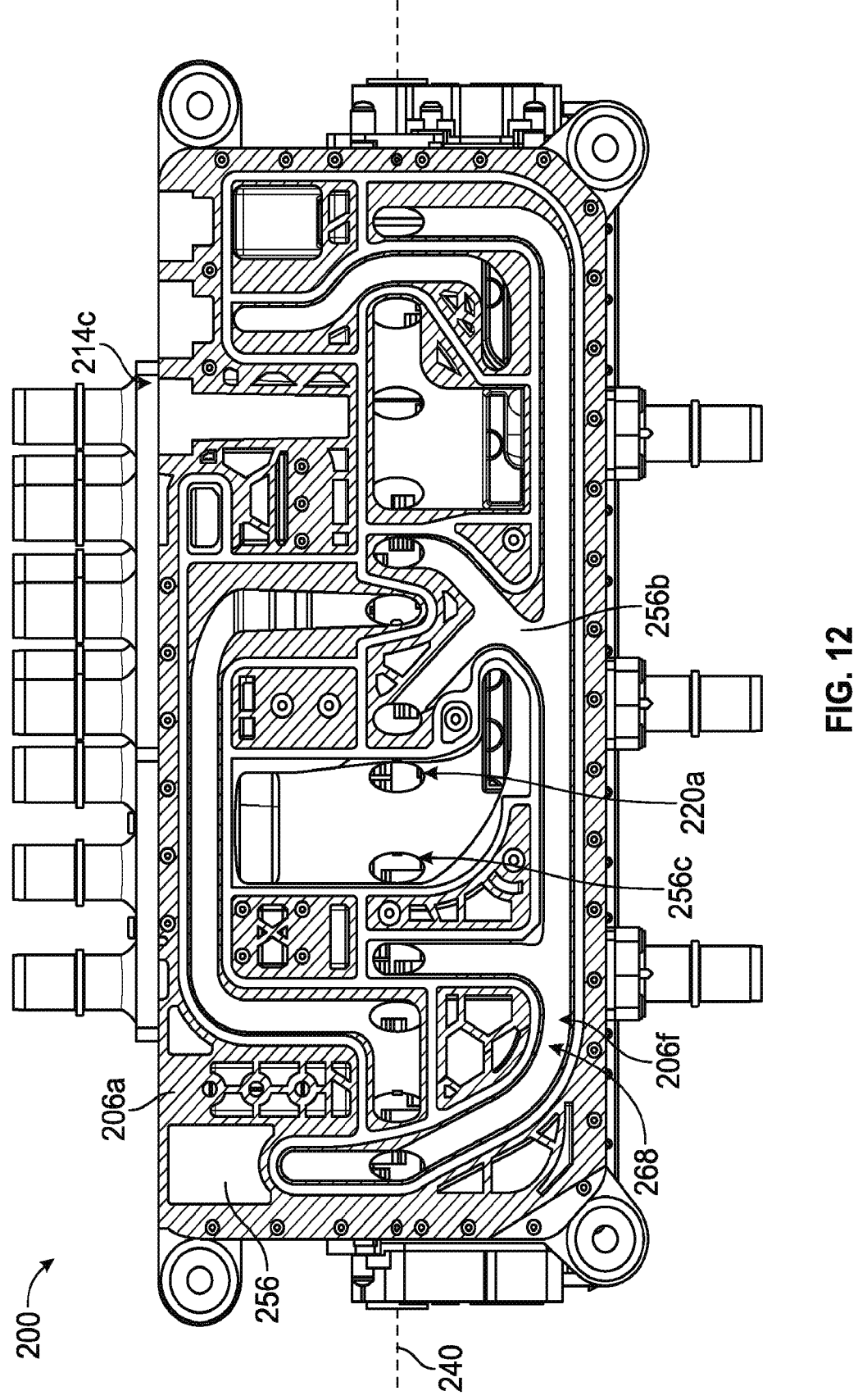
FIG. 12 is a cross-sectional view of the control valve taken along line 12-12 of FIG. 5.

Referring now to FIG. 12, the outer side 256b of the seal plate 256 can also be attached to the inner side 206c of the upper valve chamber manifold 206a. As shown particularly in FIG. 12, in the illustrated non-limiting example, the inner side 206c of the upper valve chamber manifold 206a can define one or more upper manifold channels 206f that can, in conjunction with the outer side 256b of the seal plate 256, define a first or upper manifold passageway 268 of the control valve 200. For example, the upper valve chamber manifold 206a and the seal plate 256 together can define a plurality of upper manifold passageways 268 corresponding to the plurality of upper manifold channels 206f. The plurality of upper manifold passageways 268 can provide fluid communication between one or more of the valve chambers 204 of the valve body 202 (via the upper chamber ports 220a that can be defined by the seal plate 256) and one or more of the third valve ports 214c of the upper valve chamber manifold 206a and/or with one or more other valve chambers 204 of the valve body 202 (via the other upper chamber ports 220a). In some non-limiting examples, the seal plate 256 and at least a portion of the upper valve chamber manifold 206a can be formed of similar materials. In some non-limiting examples, at least the seal plate 256 can be formed of a similar material as the valve body 202. In some non-limiting examples, the seal plate 256 can be formed of a material that is different than that of the upper valve chamber manifold 206a and the valve body 202. In some non-limiting examples, the seal plate 256 can be integrally formed with the upper valve chamber manifold 206a.

Figure 11:
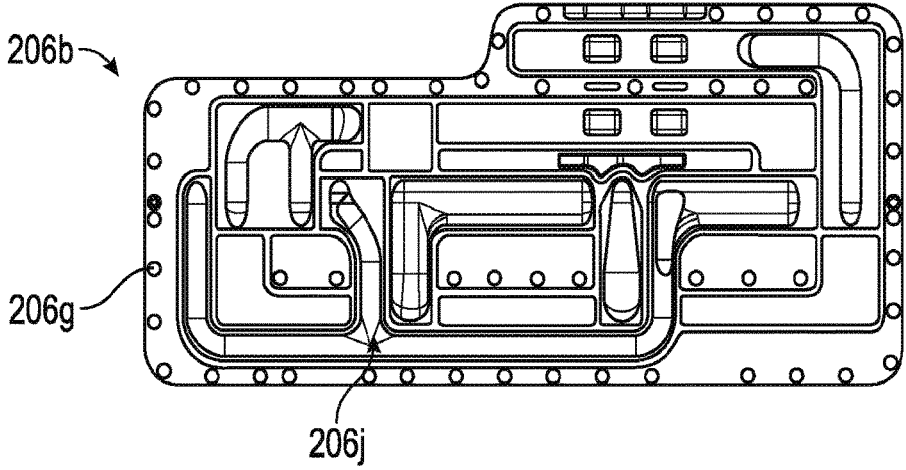
FIG. 11 is a top view of a second valve chamber manifold of the control valve of FIG. 6.

Referring now to FIG. 11, the lower valve chamber manifold 206b can have an inner side 206g and an outer side 206h (see FIG. 26) opposite the inner side 206g. In the illustrated non-limiting example, the inner side 206g of the lower valve chamber manifold 206b can have an outer perimeter that is similar to an outer perimeter of the lower side 212 of the valve body 202 and can be configured to cover and attach to the lower side 212 of the valve body 202. In some non-limiting examples, the lower valve chamber manifold 206b can include two or more lower valve chamber manifolds that are configured to cover different sections of the lower side 212 of the valve body 202. For example, in some non-limiting examples a first lower valve chamber manifold can cover the first plurality of valve chambers 204a, and a second lower valve chamber manifold can cover the second plurality of valve chambers 204b of the valve body 202. In some nonlimiting examples, the lower valve chamber manifold 206b can include an upper portion extending from the inner side 206g toward the outer side 206h that is formed of a first material and a lower portion extending from the outer side 206h to the upper portion that is formed of a second material that is different than the first material.

Figure 13:
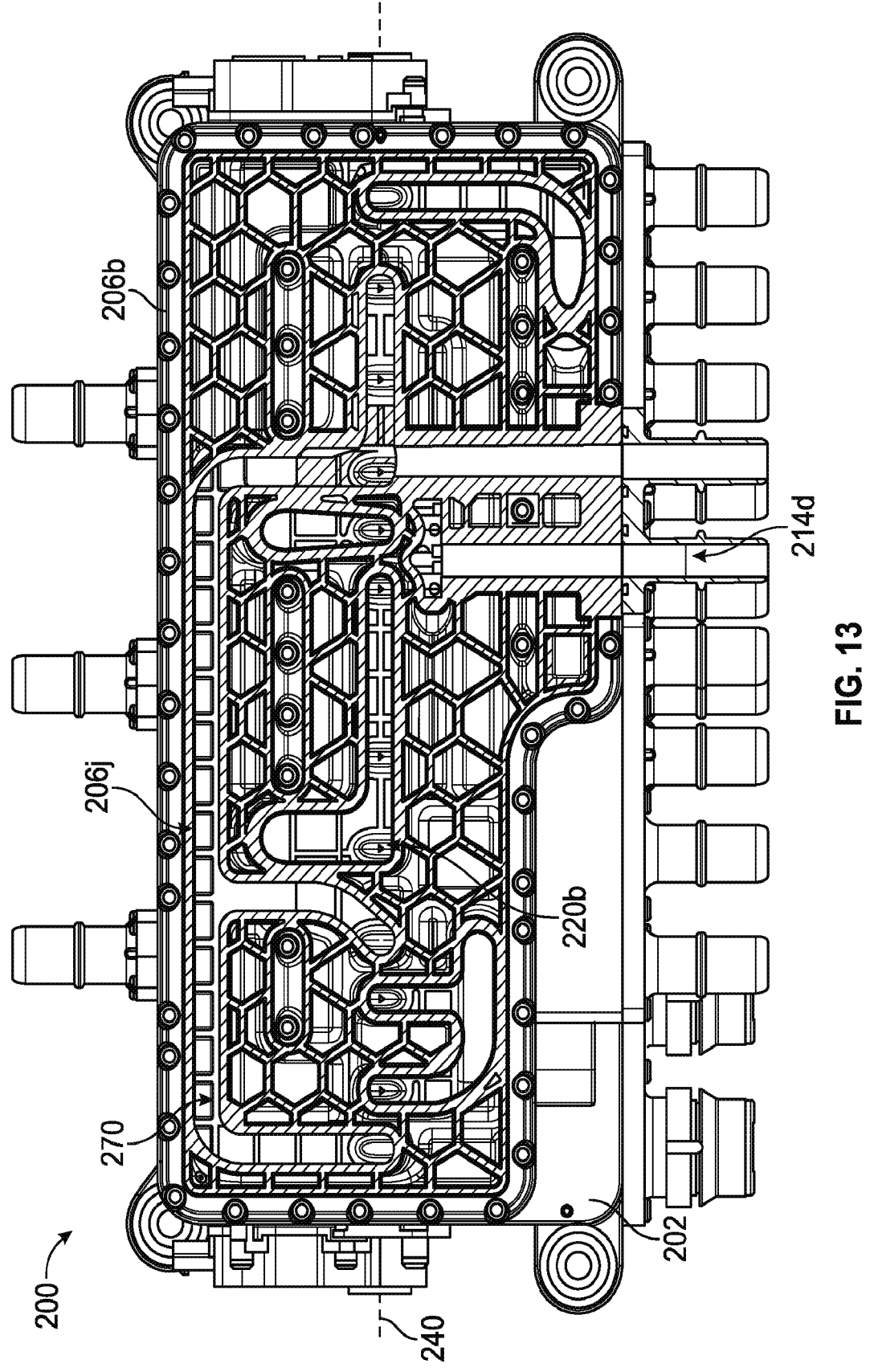
FIG. 13 is a cross-sectional view of the control valve taken along line 13-13 of FIG. 5.

As shown in FIG. 13, similar to the upper valve chamber manifold 206a, the inner side 206g of the lower valve chamber manifold 206b can define one or more lower manifold channels 206j that can, in conjunction with the lower side 212 of the valve body 202, define a second or lower manifold passageway 270 of the control valve 200. For example, in the illustrated non-limiting example, the lower valve chamber manifold 206b and the lower side 212 of the valve body 202 together can define a plurality of lower manifold passageways 270 corresponding to the plurality of lower manifold channels 206j. The plurality of lower manifold passageways 270 can provide fluid communication between one or more of the valve chambers 204 of the valve body 202 (via the lower chamber ports 220b that can be defined by the lower side 212 of the valve body 202) and one or more other valve chambers 204 of the valve body 202 (via other lower chamber ports 220b). In some non-limiting examples, the lower valve chamber manifold 206b can be formed of a similar material as the valve body 202. In some non-limiting examples, the lower valve chamber manifold 206b can be integrally formed with the valve body 202. In some non-limiting examples, the lower valve chamber manifold 206b can be combined with the upper valve chamber manifold 206a and can extend along the upper and lower sides 210, 212 and one or both of the front and rear sides 216, 218 of the valve body 202.

Referring again to FIGS. 4-6 in some non-limiting examples, the upper valve chamber manifold 206a, the lower valve chamber manifolds 206b, and or the valve body 202 can include one or more structures that can be configured to reduce an overall weight of the control valve 202 and/or provide more efficient thermal dissipation of the control valve 200. For example, in the illustrated non-limiting example, the outer side 206d of the upper valve chamber manifold 206a can have a honeycomb shaped structure that can be formed of a first plurality of recesses 206e (see FIG. 4) extending from the outer side 206d toward the inner side 206c that can provide structural rigidity while also providing passageways for ambient air to contact the upper valve chamber manifold 206a along the upper manifold passageways 268. Similarly, the outer side 206h of the lower valve chamber manifold 206b can have a similar honeycomb shaped structure that can be formed of a second plurality of recesses 206i (see FIG. 26) extending from the outer side 206h toward the inner side 206g that can provide structural rigidity while also providing passageways for ambient air to contact the lower valve chamber manifold 206a along the lower manifold passageways 270. In addition, the front and/or rear sides 216, 218 of the valve body 202 can have a similar honeycomb shaped structure that can be formed of a third plurality of recesses 202a (see FIGS. 4 and 5) extending from the front and/or rear side 216, 218 toward the valve chambers 204 that can provide structural rigidity while also providing passageways for ambient air to contact the valve body 202 along the valve chambers 204.

Figure 14:
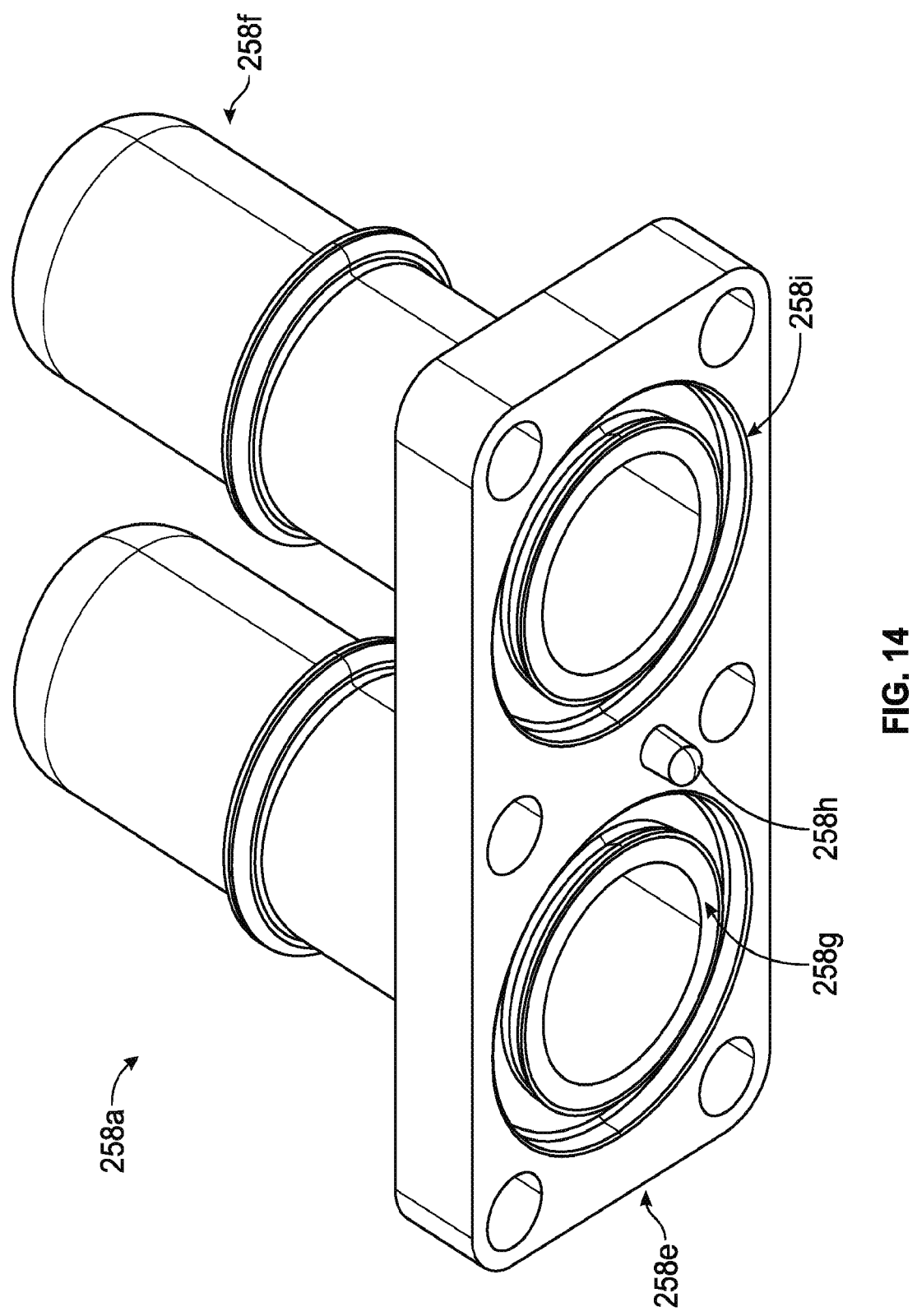
FIG. 14 is a perspective view of a port connector of the control valve of FIG. 6.
Figure 15:
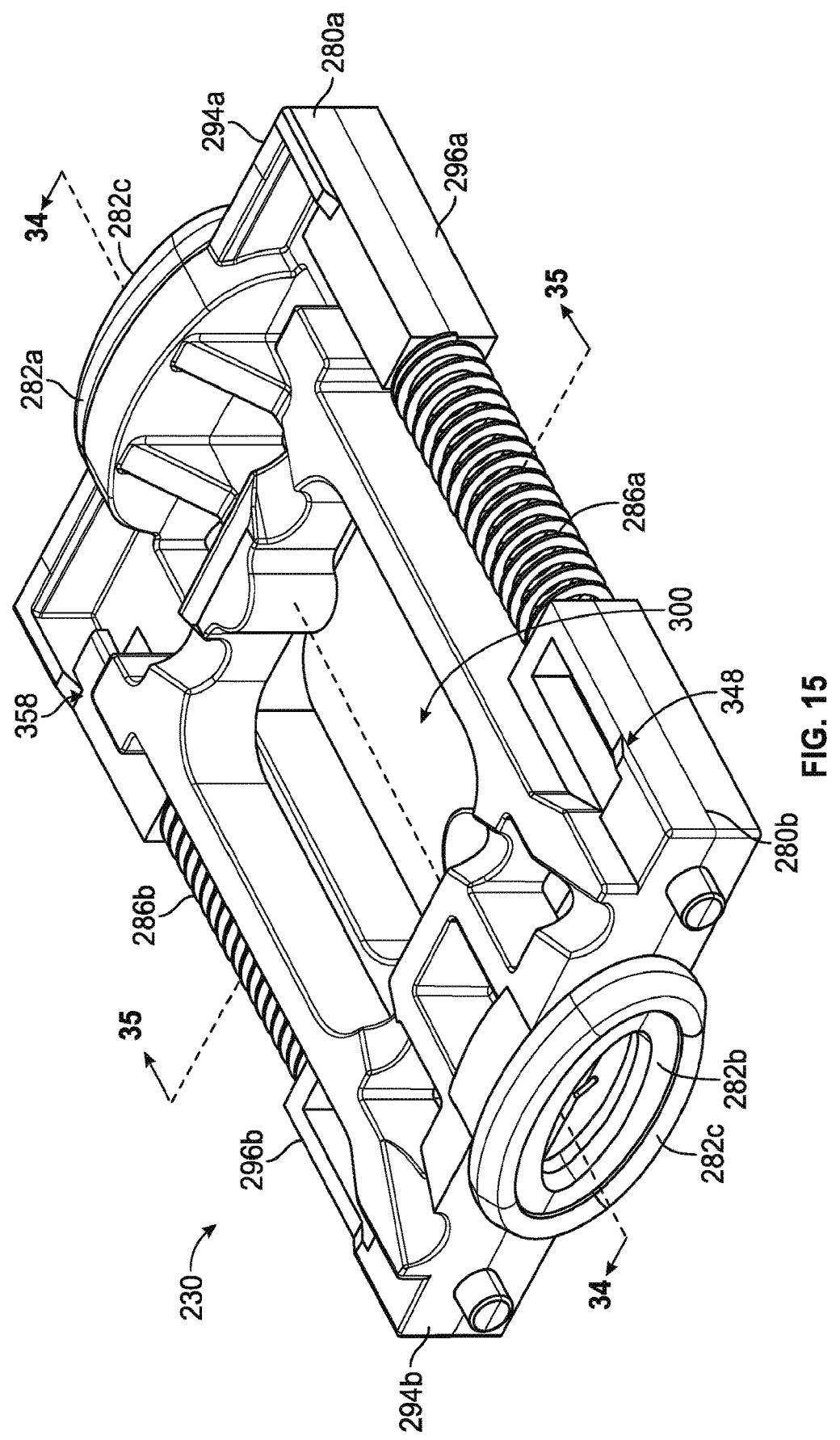
FIG. 15 is a perspective view of a poppet cartridge of a poppet assembly of the control valve of FIG. 6.

Referring now to FIG. 14, the first port 258a is illustrated in greater detail. The second and third port connectors 258b, 258c are generally similar to the first port connector 258a. The first port connector 258a of the control valve 200 can include a base portion 258e that can be configured to attach to the valve body 202 and/or the upper valve chamber manifold 206a, a connector portion 258f that extends outwardly from the base portion 258e, and a connector opening 258g extending the through the base and connector portions 258e, 258f. Further, the base portion 258e of the first port connector 258a can include one or more tabs 258h that can be configured to be received by a corresponding recess (not shown) of the valve body 202 to provide alignment and structural support to the first port connector 258a. Still further, the base portion 258e of the first port connector 258a can further include an annular groove 258i disposed on the base portion 258e around the connector opening 258g that can be configured to receive a sealing element (e.g., a gasket) to provide a seal between the first port connector 258a and the respective valve port 214a of the valve body 202.

Figure 16:
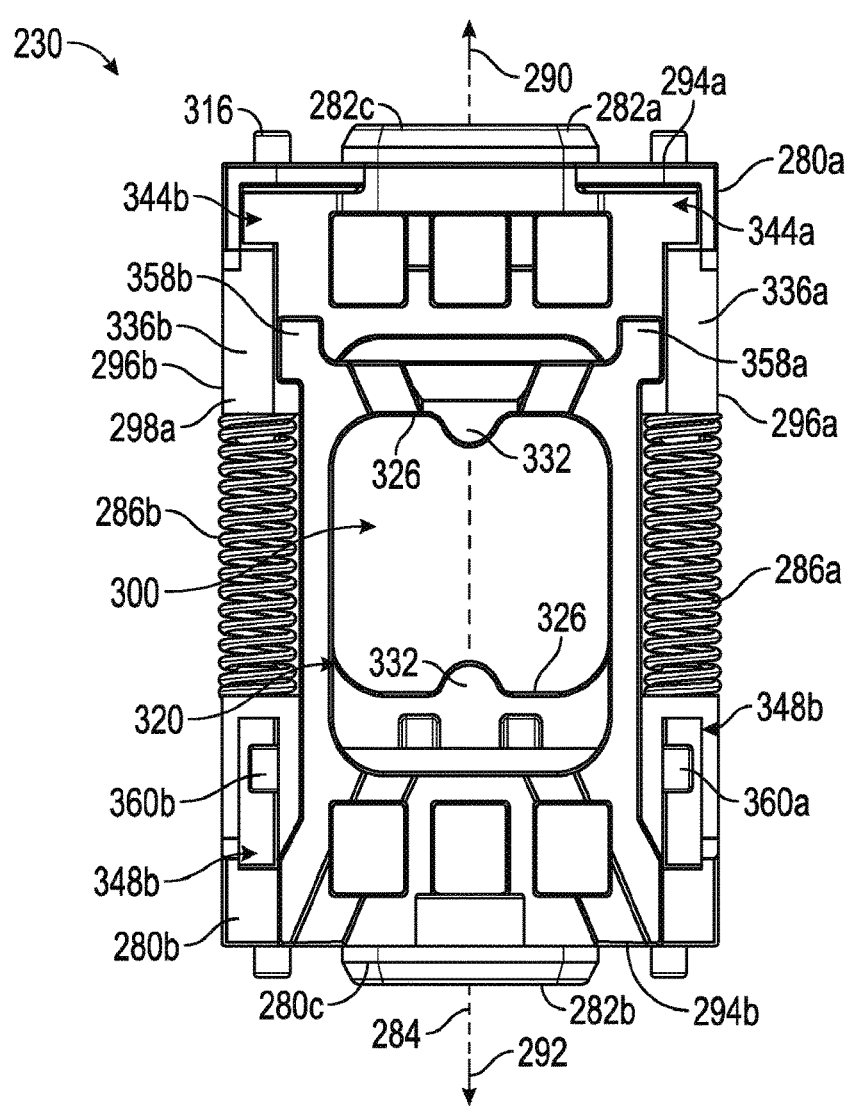
FIG. 16 is a front plan view of the poppet cartridge of FIG. 15.
Figure 17:
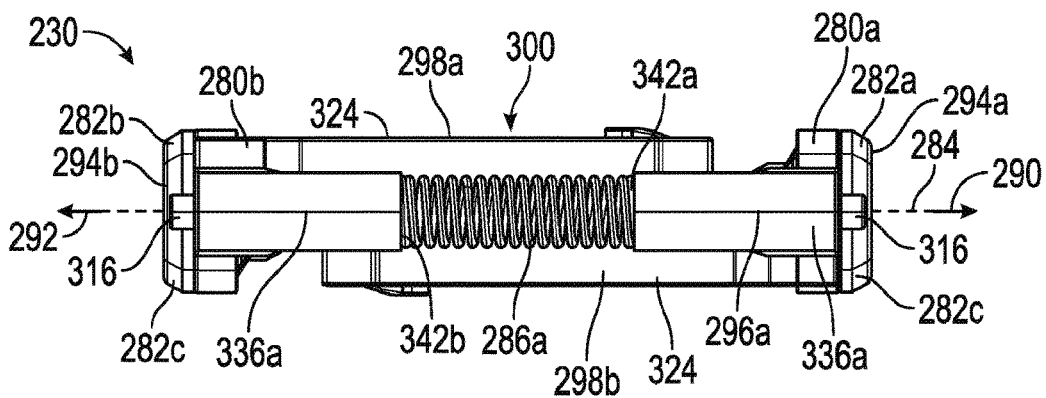
FIG. 17 is a first or right side view of the poppet cartridge of FIG. 15.
Figure 18:
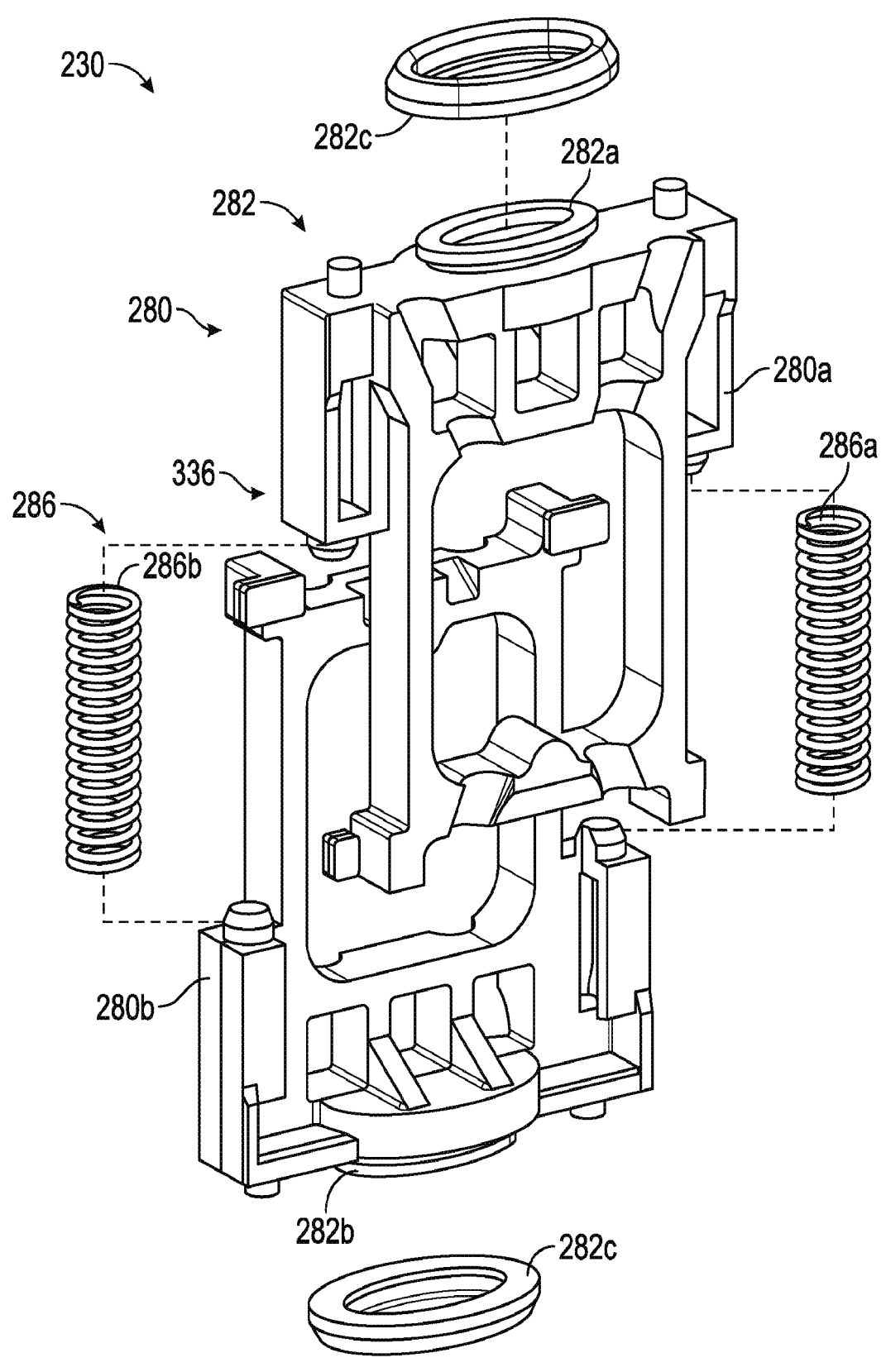
FIG. 18 is an exploded view of the poppet cartridge of FIG. 15.

Referring now to FIGS. 15-18, and as shown particularly in FIG. 18, each of the plurality of poppet cartridges 230 of the poppet assembly 228 of the control valve 200 can include one or more poppet carriages 280 and one or more poppets 282 coupled to the one or more poppet carriages 280. In the illustrated non-limiting example, the poppet cartridge 230 can include a first or upper poppet carriage 280a, a first or upper poppet 282a attached to the upper poppet carriage 280a, a second or lower poppet carriage 280b, and a second or lower poppet 282b attached to the lower poppet carriage 280b. The upper and lower carriages 280a, 280b can be arranged such that the upper and lower poppets 282a, 282b can be arranged on opposing ends of the poppet cartridge 230. For example, in the illustrated non-limiting example, the upper poppet 282a can be arranged on a first or upper end 294a of the poppet cartridge 230 and the lower poppet 282b can be arranged on a second or lower end 294b of the poppet cartridge 230 opposite the upper end 294a. As such, a poppet axis 284 of the poppet cartridge 230 can extend axially through the upper and lower poppets 282a, 282d and the upper and lower ends 294a, 294b of the poppet cartridge 230. In the illustrated non-limiting example, the upper and lower poppets 282a, 282b of the poppet cartridge 230 are axially aligned along the poppet axis 284. In some non-limiting examples, the upper and lower poppets 282a, 282b of the poppet cartridge 230 can be axially offset from each other relative to the poppet axis 284. In some non-limiting examples, the poppet cartridge 230 can include two or more upper poppets 282a or two or more lower poppets 282b. In some non-limiting examples, the poppet cartridge 230 can include three or more poppet carriages 280 and three or more poppets 282 and can have two or more poppet axes 284.

In some non-limiting examples, the upper and lower poppets 282a, 282b can define a substantially circular shape, however, other shapes could be used. For example, the poppets 282a, 282b can be substantially oval, square, or rectangular in shape. In the illustrated non-limiting example, the upper and lower poppets 282a, 282b each define an oval shape. In some non-limiting examples, the poppets 282a, 282b can be planar (e.g., flat). In other non-limiting examples, the poppets 282a, 282b can define a concave or a convex shape. In the illustrated non-limiting example, the upper and lower poppet carriages 280a, 280b and the upper and lower poppets 282a, 282b, respectively, can be integrally formed as a unitary component.

A poppet seal 282c can be provided on each of the poppets 282a, 282b and can extend along the periphery of the poppets 282a, 282b. Thus, in the illustrated non-limiting example, the poppet seal 282c can define an oval shape that can be similar to a shape defined by the periphery of the poppets 282a, 282b. In some non-limiting examples, the poppet seal 282c can be integral to upper and lower 282a, 282b, or, alternatively, the poppet seal 282c can be integrally formed with at least one of the upper and lower chamber ports 220a, 220b of the valve body 202. In other non-limiting examples, the poppet seal 282c can be a separate part that can be snapped in place or otherwise installed on to the poppets 282a, 282b during assembly of the control valve 200. In some non-limiting examples, the poppet seals 282c can be overmolded on the upper and lower poppets 282a, 282b.

The poppet cartridge 230 can include at least one spring 286 that can be attached to the upper and lower poppet carriages 280a, 280b (see. e.g., FIG. 16) and/or to the valve chamber 204 (see, e.g., FIG. 1). For example, in the illustrated non-limiting example, the spring 286 of the poppet cartridge 230 can include a first spring 286a and a second spring 286b arranged parallel to and spaced apart from one another, with the first spring 286a arranged along a first lateral side 296a of the poppet cartridge 230 and the second spring 286b arranged along a second lateral side 296b of the poppet cartridge 230, opposite the first lateral side 296a, relative to the poppet axis 284. The first and second springs 286a, 286b can be configured to simultaneously bias the upper and lower poppet carriages 280a, 280b axially outward from each other relative to the poppet axis 284. In other words, and as shown in FIGS. 16 and 17, the first and second springs 286a, 286b can simultaneously bias the upper poppet carriage 280a in a first axial direction 290 along the poppet axis 284 and the lower poppet carriage 280b in a second axial direction 292 along the poppet axis 284 that is opposite the first axial direction 290. In some non-limiting examples, the poppet cartridge 230 can include three or more springs 286.

Figure 19:
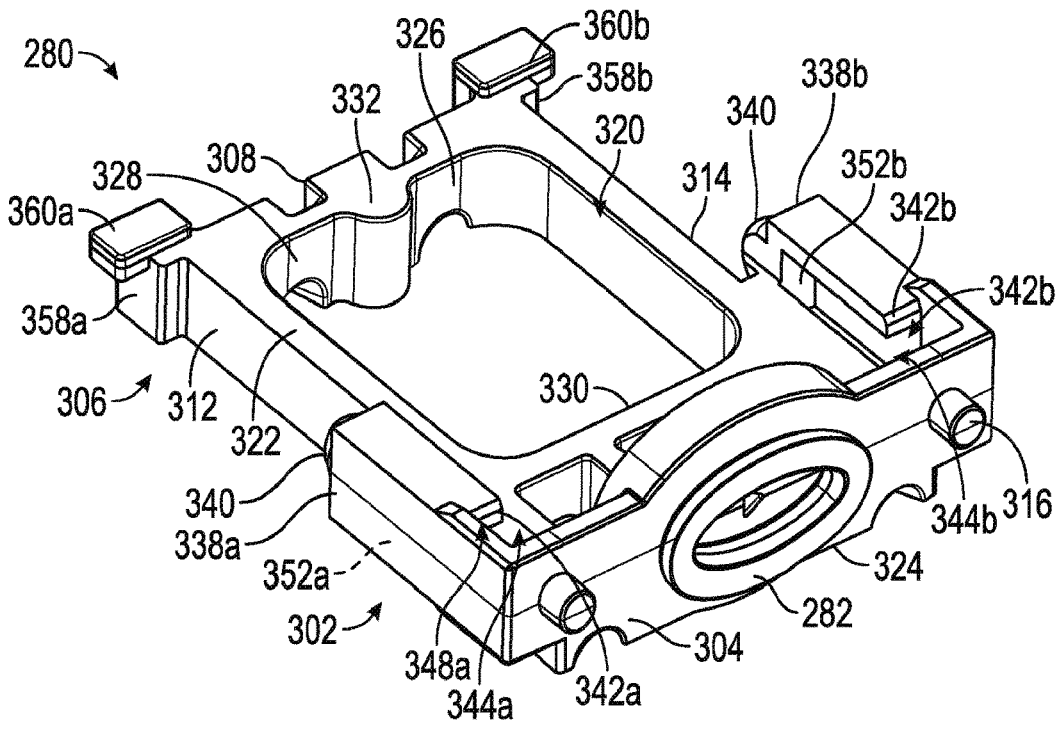
FIG. 19 is a perspective view of a poppet carriage of the poppet cartridge of FIG. 18.
Figure 20:
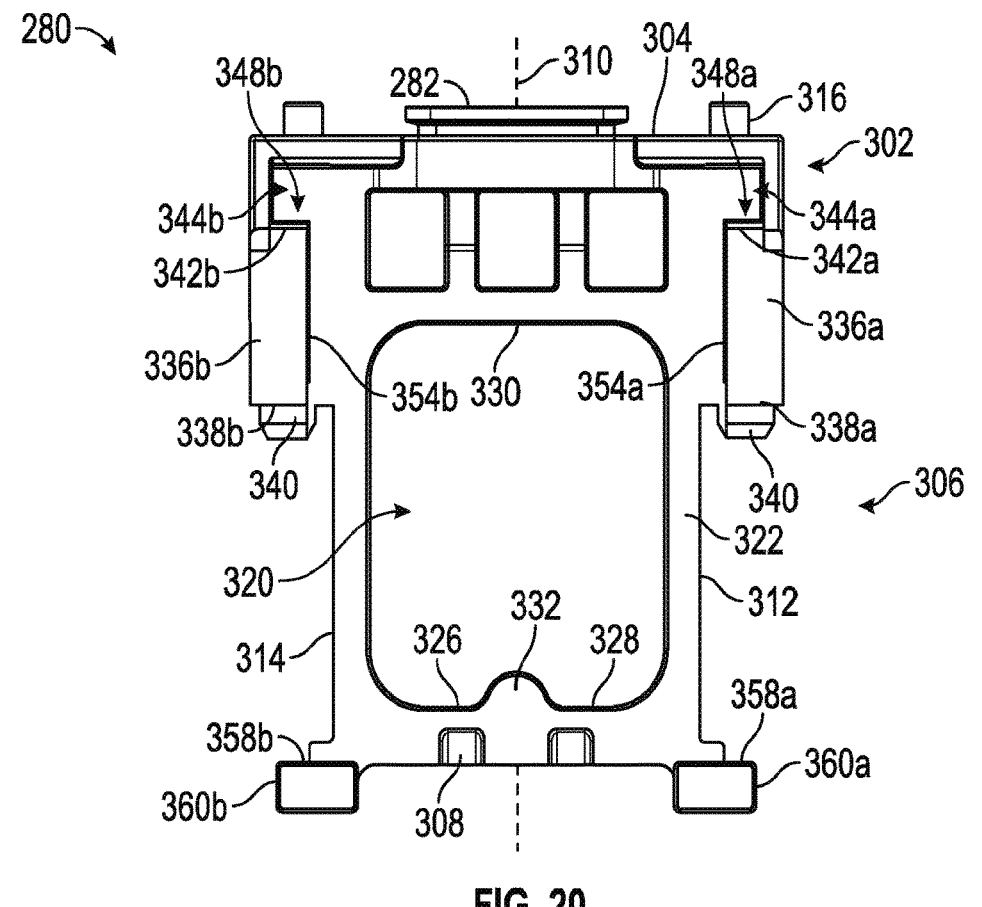
FIG. 20 is a front plan view of the poppet carriage of FIG. 19.

Referring now to FIGS. 19 and 20, one of the poppet carriages 280 of the poppet cartridge 230 is shown in greater detail. For ease of disclosure, only one of the upper and lower poppet carriages 280a, 280b of the poppet cartridge 230) is illustrated and discussed in detail herein. In that regard, in the illustrated non-limiting example, the lower poppet carriage 280b of the poppet cartridge 230 is generally similar to the upper poppet carriage 280a, and in some non-limiting examples identical to the upper poppet carriage 280a, but oriented upside-down and inside-out relative to the upper poppet carriage 280a along the poppet axis 284 (e.g., the lower poppet carriage 280b is mirrored horizontally and vertically relative to the upper poppet carriage 280a, along the poppet axis 284). As such, in the illustrated non-limiting example, the poppet carriage 280 of FIGS. 19 and 20 can be representative of both the upper and lower poppet carriages 280a, 280b of the poppet cartridge 230. However, in some non-limiting examples, certain arrangements and features of the lower poppet carriage 280b may differ from the upper poppet carriage 280a of the poppet cartridge 230. For example, the size of the poppets 282 may differ in some non-limiting examples.

The poppet carriage 280 can have a first or outer portion 302 extending from a first or outer end 304 of the poppet carriage 280 and a second or inner portion 306 extending from a second or inner end 308, opposite the outer end 304, and to the outer portion 302 of the poppet carriage 280. A poppet carriage axis 310 can extend through the outer and inner ends 304, 308 of the poppet carriage 280 between a first lateral side 312 and a second lateral side 314 of the poppet carriage 280, with the second lateral side 314 being opposite the first lateral side 312, relative to the poppet carriage axis 310. In the illustrated non-limiting example, a single poppet 282 can be attached to and extend axially outward from the outer end 304 of the poppet carriage 280 and can be aligned at least laterally with the poppet carriage axis 310. Further, one or more poppet stoppers 316 can extend axially outward from the outer end 304 adjacent to the poppet 282 and can be configured to limit compression of the poppet seal 282c of the poppet 282 when contacting the valve chamber 204 (see FIG. 27).

A carriage opening 320 can extend through a first or inner side 322 and a second or outer side 324 of the poppet carriage 280. In the illustrated non-limiting example, the carriage opening 320) can extend through the poppet carriage 280 between the outer and inner ends 304, 308 and between the first and second lateral sides 312, 314 of the poppet carriage 280. The carriage opening 320 can define a variety of shapes, including circular, oval, rectangular, or square shapes, generally. In the illustrated non-limiting example, the carriage opening 320 can define a generally rectangular shape. In some non-limiting examples, the carriage opening 320 can extend through the first or second lateral sides 312, 314 of the poppet carriage 280. In such non-limiting examples, the carriage opening 320 can define a "C"-shape. In some non-limiting examples, the poppet carriage 280 can have a plurality of carriage openings 320.

In some non-limiting examples, one or more surfaces of the carriage opening 320 can define a carriage engagement surface 326 that can be configured to be engaged by the first camshaft assembly 232a of the control valve 200. For example, in the illustrated non-limiting example, a first or inner side 328 of the carriage opening 320 can define the carriage engagement surface 326 of the poppet carriage 280. In particular, the inner side 328 of the carriage opening 320 can be disposed toward the inner end 308 of the poppet carriage 280 and can be opposite a second or outer side 330 of the carriage opening 320 that is disposed toward the outer end 304 of the poppet carriage 280. The carriage engagement surface 326 can further include a carriage engagement protrusion 332 that can extend from the inner side 328 of the carriage opening 320 and partially into the carriage opening 320 toward the outer end 304 of the poppet carriage 280) (and radially toward the camshaft axis 240 (see FIG. 29) of the camshaft assembly 232). In some non-limiting examples, the carriage engagement protrusion 332 can be a groove or recess extending into the carriage engagement surface 326 toward the inner end 304 of the poppet carriage 280 (and radially away from the camshaft axis 240 of the camshaft assembly 232). In some non-limiting examples, the carriage engagement surface 326 of the poppet carriage 280 can include a plurality of carriage engagement protrusions 332. In some non-limiting examples, the poppet carriage 280 can include a plurality of carriage engagement surfaces 326.

The poppet carriage 280 can have one or more carriage rails 336 that can be configured to engage a corresponding feature of the other poppet carriage 280 of the poppet cartridge 230 and slidably engage the cartridge slots 260 (see FIG. 7) of the valve chambers 204 of the valve body 202. For example, in the illustrated non-limiting example, the poppet carriage 280 has a first carriage rail 336a a second carriage rail 336b arranged parallel to and spaced apart from one another relative to the carriage opening 320, with the first carriage rail 336a extending radially outward from the first lateral side 312 and axially downward from the outer portion 302 toward the inner end 308 and the second carriage rail 336b extending radially outward from the second lateral side 314 and axially downward from the outer portion 302 toward the inner end 308 relative to the poppet carriage axis 310. Thus, in the illustrated non-limiting example, the first carriage rail 336a can be configured to slidably engage the first cartridge slot 260a of the valve chambers 204 and the second carriage rail 336b can be configured to slidably engage the second cartridge slot 260b of the valve chambers 204.

In the illustrated non-limiting example, the first and second carriage rails 336a, 336b can extend partially toward the inner end 308 of the poppet carriage 280 such that the first and second carriage rails 336a, 336b can have first and second carriage rail inner ends 338a, 338b, respectively, that can be disposed and aligned with each other between the outer and inner ends 304, 308 of the poppet carriage 280 toward the inner end 308. A carriage spring protrusion 340 can extend axially downward from each of the first and second carriage rail inner ends 338a, 338b toward the inner end 308 of the poppet carriage 280. Similarly, the first and second carriage rails 336a, 336b can extend partially toward the outer end 304 of the poppet carriage 280 such that the first and second carriage rails 336a, 336b can have first and second carriage rail outer ends 342a, 342b, respectively, that can be opposite the first and second carriage rail inner ends 338a, 338b. The first and second carriage rail outer ends 342a, 342b can each be disposed between the outer and inner ends 304, 308 of the poppet carriage 280 toward the outer end 304 and can be laterally aligned with each other. In the illustrated non-limiting example, the first and second carriage rail outer ends 342a, 342b can define first and second carriage rail gaps 344a, 344b, respectively, that can extend between the respective first and second carriage rail outer ends 342a, 342b toward the outer end 304 of the poppet carriage 280. In some non-limiting examples, the first and second carriage rails 336a, 336b can extend from the outer end 304 to the inner end 308 of the poppet carriage 280, respectively. In some non-limiting examples, the poppet carriage 280 can include one or more carriage rails extending along and outwardly from the inner or outer sides 322, 324 of the poppet carriage 280.

Similarly, the poppet carriage 280 can also have one or more carriage slots 348 that can be configured to be slidably engaged by a corresponding feature of the other poppet carriage 280 of the poppet cartridge 230. For example, in the illustrated non-limiting example, the poppet carriage 280 has a first carriage slot 348a and a second carriage slot 348b arranged parallel to and spaced apart from one another relative to the carriage opening 320 along the inner side 322 of the poppet carriage 280. In the illustrated non-limiting example, the first and second carriage slots 348a, 348b are defined by the first and second carriage rails 336a, 336b, respectively. In particular, the first carriage slot 348a extends along the first carriage rail 336a axially downward from the first carriage rail outer end 342a toward the first carriage rail inner end 338a to a first carriage slot end 352a (see FIG. 19), and the second carriage slot 348b extends along the second carriage rail 336b axially downward from the second carriage rail outer end 342b toward the second carriage rail inner end 338b to a second carriage slot end 352b (see FIG. 19). Further, the first and second carriage slots 348a, 348b are open at and extend through both the first and second carriage rail outer ends 342a, 342b and through inner sides 354a, 354b of the first and second carriage rails 336a, 336b, respectively. The inner sides 354a, 354b of the first and second carriage rails 336a, 336b can be disposed toward the carriage opening 320 between the first and second carriage rail inner and outer ends 338a, 338b, 342a, 342b and opposite the first and second lateral sides 312, 314 of the poppet carriage 280, respectively. In some non-limiting examples, the first and second carriage slots 348a, 348b can extend through the first and second carriage rail inner ends 338a, 338b. In some non-limiting examples, the poppet carriage 280 can include one or more carriage slots 348 extending along and outwardly from the inner or outer sides 322, 324 of the poppet carriage 280.

Correspondingly, the poppet carriage 280 can have one or more carriage pads 358 that can be configured to slidably engage the one or more carriage slots 348 of the other poppet carriage 280 of the poppet cartridge 230. For example, in the illustrated non-limiting example, the poppet carriage 280 has a first carriage pad 358a and a second carriage pad 358b arranged parallel to and spaced apart from one another relative to the carriage opening 320 and extending laterally outward the first and second lateral sides 312, 314 at the inner end 308 of the poppet carriage 280. In the illustrated non-limiting example, the carriage pads 358a, 358b extend from the first and second lateral sides 312, 314 to a first lateral distance from the poppet axis 284 that is less than that of the carriage rails 336a, 336a. First and second carriage pad protrusions 360a, 360b can extend laterally outward from the first and second carriage pads 358a, 358b, respectively, and along the inner side 322 of the poppet carriage 280. In the illustrated non-limiting example, the carriage pads 358a, 358b extend from the inner side 322 to the outer side 324 of the poppet carriage 280 and the carriage pad protrusions 360a, 360b extend from the inner side 322 partially toward the outer side 324 of the poppet carriage 280. Further, the carriage pad protrusions 360a, 360b extend from the first and second lateral sides 312, 314 to a second lateral distance from the poppet axis 284 that is less than that of the carriage rails 336a, 336a but greater than the first lateral distance of the carriages pads 358a, 358b. In some non-limiting examples, the poppet carriage 280) can include three or more carriage pads 358 that can extend outwardly from the lateral sides 312, 314 of the poppet carriage 280. In some non-limiting examples, the poppet carriage 280 can include one or more carriage pads 358 that extend outwardly from the inner and outer sides 322, 324 of the poppet carriage 280.

Referring again to FIG. 18, in the illustrated non-limiting example, the poppet cartridge 230 can be formed by the upper poppet carriage 280a (i.e., one poppet carriage 280 of FIGS. 19 and 20) that slidably engages the lower poppet carriage 280b (i.e., another poppet carriage 280 oriented differently) such that the upper and lower poppet carriages 280a, 280b are slidably moveable relative to each other along the poppet axis 284. More specifically, with the outer side 324 of the upper poppet carriage 280a being axially opposite the outer side 324 of the lower poppet carriage 280b and the inner sides 322 of the upper and lower poppet carriages 280a, 280b facing each other, the carriage pads 358a, 358b of the upper poppet carriage 280a can be received within the carriage rail gaps 344a, 344b of the lower poppet carriages 280b and the carriage pads 358a, 358b of the lower poppet carriage 280a can be received within the carriage rail gaps 344a, 344b of the upper poppet carriage 280b.

With the carriage pads 358a, 358b of both poppet carriages 280a, 280b received within the carriage rail gaps 344a, 344b of the opposing poppet carriage 280a, 280b, the carriage pad protrusions 360a, 360b of the upper poppet carriage 280a can be slidably received by the carriage slots 348a, 348b at the carriage rail outer ends 342a, 342b of the lower poppet carriage 280b, and the carriage pad protrusions 360a, 360b of the lower poppet carriage 280a can be slidably received by the carriage slots 348a, 348b at the carriage rail outer ends 342a, 342b of the upper poppet carriage 280a. With the carriage pad protrusions 360a, 360b of each poppet carriage 280a, 280b slidably received by the carriage slots 348a, 348b, the upper and lower poppet carriages 280a, 280b can be moved axially away from each other along the poppet axis 284 to an axial distance until the carriage pad protrusions 360a, 360b of one or both of the poppet carriages 280a, 280b contact the carriage slot ends 352a, 352b of the opposing poppet carriage 280a, 280b. In other words, the first and second carriage slot ends 352a, 352b can be configured to define a maximum axial distance one poppet carriage 280a, 280b can slidably move relative to the other poppet carriage 280a, 280b. In addition, the carriage slot ends 352a, 352b can also define a maximum axial length of the poppet cartridge 230 along the poppet axis 284.

Referring again to FIGS. 15-17, with the carriage pad protrusions 360a, 360b of each poppet carriage 280a, 280b slidably received by the carriage slots 348a, 348b, the carriage rails 336a, 336b of the upper and lower poppet carriages 280a, 280b are axially aligned. Thus, laterally outward sides of the first carriage rail 336a of the upper poppet carriage 280a and the second carriage rail 336b of the lower poppet carriage 280b together can define the first lateral side 296a of the poppet cartridge 230. Similarly, laterally outward sides of the second carriage rail 336b of the upper poppet carriage 280a and the first carriage rail 336a of the lower poppet carriage 280b together can define the second lateral side 296b of the poppet cartridge 230. In addition, with the carriage rails 336a, 336b of the upper and lower poppet carriages 280a, 280b axially aligned, each of the carriage spring protrusions 340 at the carriage rail inner ends 338a, 338b can also be axially aligned. Thus, the first spring 286a of the poppet cartridge 230 can be coupled to the carriage spring protrusions 340 between the first carriage rail inner end 338a of the upper poppet carriage 280a and the second carriage rail inner end 338b of the lower poppet carriage 280b. Similarly, the second spring 286b of the poppet cartridge 230 can be coupled to the carriage spring protrusions 340 between the second carriage rail inner end 338b of the upper poppet carriage 280a and the first carriage rail inner end 338a of the lower poppet carriage 280b.

Thus, in the illustrated non-limiting example, with the upper and lower poppet carriages 280a, 280b mated and the first and second springs 286a, 286b arranged as described above, the poppet cartridge 230 can be formed. In particular, the upper poppet 282a can be arranged on the outer end 304 of the upper poppet carriage 280a, which can define the upper end 294a of the poppet carriage 230, and the lower poppet 282b can be arranged on the outer end 304 of the lower poppet carriage 280b, which can define the lower end 294b of the poppet carriage 230. Further, the outer side 324 of the lower poppet carriage 280b and some of the inner portion 306 of the inner side 322 of the upper poppet carriage 280a can define a first side 298a of the poppet cartridge 230, and the outer side 324 of the upper poppet carriage 280a and some of the inner portion 306 of the inner side 322 of the lower poppet carriage 280b can define a second side 298b of the poppet cartridge 230, opposite the first side 298a.

Similarly, with the poppet cartridge 230 assembled and as particularly shown in FIG. 16, the carriage openings 320 of the upper and lower poppet carriages 280a, 280b can axially overlap relative to the poppet axis 284 and can also be axially separated relative to the camshaft axis 240. Thus, the overlapping carriage openings 320 of the poppet carriages 280a, 280b together can define a cartridge opening 300 of the poppet cartridge 230, with the carriage engagement surfaces 326 (i.e., the outer sides 330 of the carriage openings 320) of the poppet carriages 280a, 280b being disposed radially opposite each other relative to the camshaft axis 240. In addition, in the illustrated non-limiting example, the carriage engagement protrusions 332 of the carriage engagement surfaces 326 of the poppet carriages 280a, 280b are aligned axially along the poppet axis 284. In some non-limiting examples, the carriage engagement protrusions 332 of the poppet carriages 280a, 280b can be laterally offset from each other relative to the poppet axis 284. As will be discussed in greater detail below, the cartridge opening 300 (i.e., the axially overlapping carriage openings 320 of the poppet carriages 280a, 280b) of the poppet cartridge 230 can be configured to receive a portion of the camshaft assembly 232 of the control valve 200 such that the carriage engagement protrusions 332 of the carriage engagement surfaces 326 of the poppet carriages 280a, 280b are rotatably engageable by the camshaft assembly 232.

Figures 21, 22:
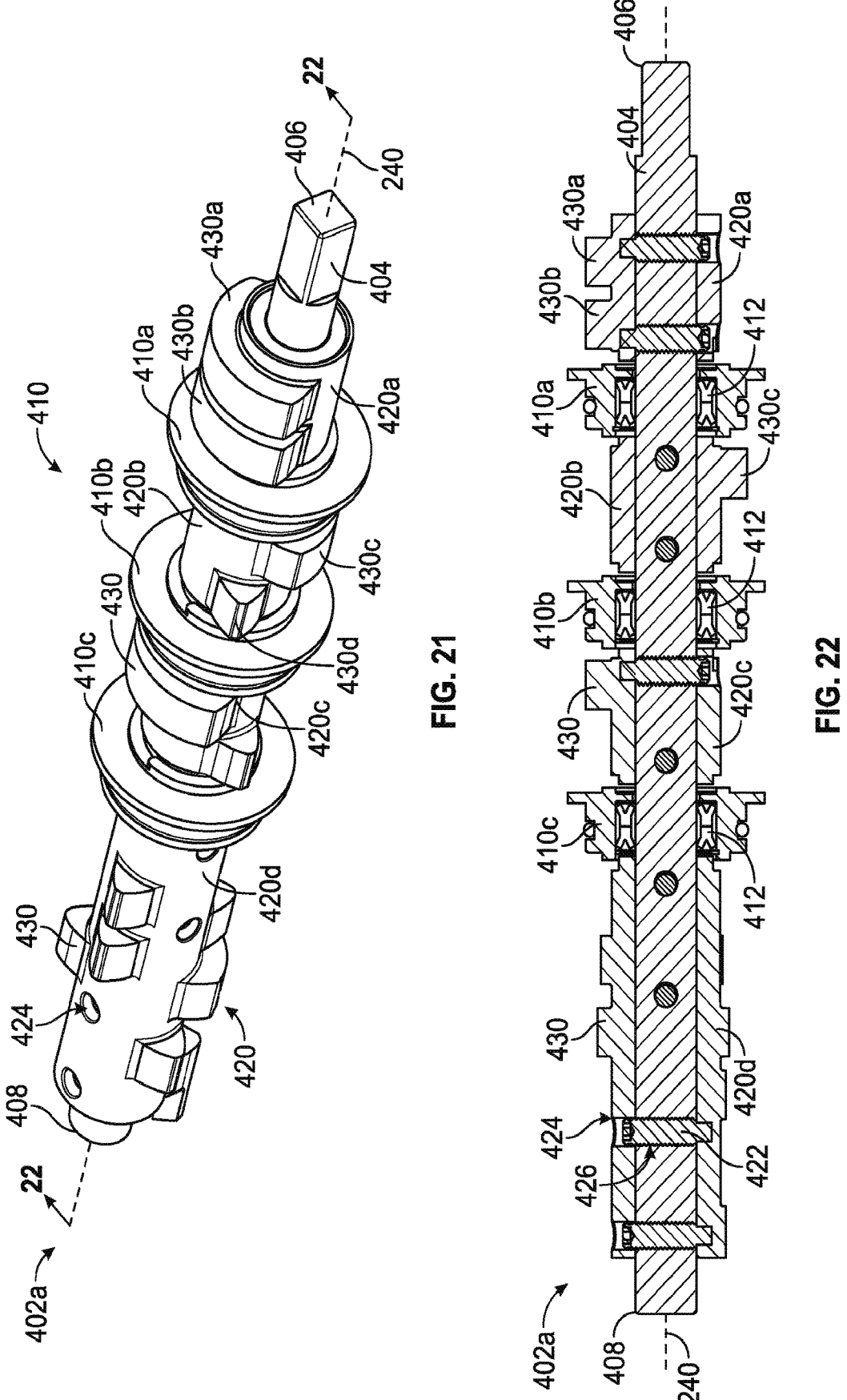
FIG. 21 is a perspective view of a first camshaft assembly of the control valve of FIG. 6.
FIG. 22 is a cross-sectional view of the first camshaft assembly along line 22-22 of FIG. 21.

Referring now to FIG. 21, the first camshaft assembly 232a of the camshaft assembly 232 of the control valve 200 is illustrated in greater detail. For ease of reference, only the first camshaft assembly 232a is illustrated and discussed in detail herein. In that regard, in the illustrated non-limiting example, the second camshaft assembly 232b of the camshaft assembly 232 is generally similar to the first camshaft assembly 232a. However, as discussed in greater detail below, certain arrangements and components of the second camshaft assembly 232b may differ from the first camshaft assembly 232a.

As shown in FIG. 21, the first camshaft 402a of the first camshaft assembly 232a can include a first central shaft 404 having a first or outer end 406 and a second or inner end 408 opposite the first end 406, with the camshaft axis 240 extending through the first and second ends 406, 408 of the first central shaft 404. In some non-limiting examples, the first camshaft 402a can define a first camshaft axis that is axially offset from a second camshaft axis defined by the second camshaft assembly 232b. In some non-limiting examples, the first camshaft assembly 232a can include the first actuator 234a (see FIG. 6). The first camshaft 402a can be coupled to the first actuator 234a to rotate the first central shaft 404 of the first camshaft 402a. For example, the first end 406 of the first central shaft 404 can be coupled to the first actuator 234a (e.g., a rotary actuator, a drive motor, etc.) configured to rotate the first central shaft 404 in one or more rotational directions about the camshaft axis 240. In some non-limiting examples, the first end 406 of the central shaft 404 can protrude outside of the valve body 202 (see FIG. 7) from the first camshaft opening 236a to allow the engagement with the first actuator 234a. In the illustrated non-limiting example, the first camshaft assembly 232a can further include the first camshaft sealing adapter 252a (see FIG. 6) arranged between the first valve body end 242 and the first actuator 234a and can be configured to receive the first central shaft 404 near the first end 406. In some non-limiting examples, the first end 406 of the first central shaft 404 of the first camshaft 402a may be the only portion of the first camshaft assembly 232a that protrudes from, or is arranged external to, the valve body 202. In some non-limiting examples, only a single external dynamic seal (not shown) may be required to prevent leakage outside of the valve body 202 from the first camshaft opening 236a. For example, a dynamic seal can be included in first camshaft sealing adapter 252a to prevent external leakage from the valve body 202.

The first camshaft assembly 232a can also include one or more seal bearings 410 arranged within the first camshaft opening 236a of the valve body 202. For example, in the illustrated non-limiting example, the first camshaft assembly 232a includes a first seal bearing 410a, a second seal bearing 410b, and a third seal bearing 410c arranged along the first central shaft 404 between the first and second ends 406, 408. In addition, the second end 408 of the first central shaft 404 of the first camshaft 402a can be at least partially received within, and rotatably coupled to, the first camshaft end support 246a (see FIG. 7) defined on a side of the central sidewall 244 of the valve body 202. Each of the seal bearings 410a, 410b, 410c can be configured to rotatably receive a portion of the first central shaft 404, with the first seal bearing 410a disposed adjacent to the first end 406, the second seal bearing 410b arranged adjacent to the first seal bearing 410a toward the second end 408, and the third seal bearing 410c arranged adjacent to both the second seal bearing 410b and the second end 408 of the first central shaft 404. Each of the seal bearings 410a, 410b, 410c can extend radially outward from the first central shaft 404 of the first camshaft 402a relative to the camshaft axis 240.

In some non-limiting examples, the seal bearings 410a, 410b, 410c can be configured to provide support for radial loads (i.e., loads applied normal to the camshaft axis 240 defined by the first camshaft 402a) exerted on the first central shaft 404 of the first camshaft 402a during operations of the control valve 200. In particular, each of the seal bearings 410a, 410b, 410c can be received within respective seal bearing support apertures 264 (see FIG. 26) defined in the first plurality of sidewalls 244a of the valve body 202. In addition, the seal bearings 410a, 410b, 410c can provide seals between each of the first plurality of valve chambers 204a via one or more sealing rings 412 arranged within each of the seal bearings 410a, 410b, 410c. For example, in the illustrated non-limiting example, the one or more sealing rings 412 of the seal bearings 410a, 410b, 410c can contact an outer surface of the first central shaft 404 of the first camshaft 402a and can be configured to maintain a seal with the outer surface of the first central shaft 404 while the first central shaft 404 is rotated.

The first camshaft 402a of the first camshaft assembly 232a can further include one or more cams 420 that can be fixedly attached to the first central shaft 404 and that can be configured to be disposed within one of the first plurality of valve chambers 204a of the valve body 202 to engage one or more of the first plurality of poppet cartridges 230a within the corresponding valve chamber 204. For example, in the illustrated non-limiting example, the first camshaft 402a includes a first cam 420a arranged between the first end 406 of the first central shaft 404 and the first sealing bearing 410a, a second cam 420b arranged between the first and second sealing bearings 410a, 410b, a third cam 420c arranged between the second and third sealing bearings 410b, 410c, and a fourth cam 420d arranged between third sealing bearing 410c and the second end 408 of the first central shaft 404. As shown in FIG. 22, in the illustrated non-limiting example, each of the cams 420a, 420b, 420c, 420d can be removably fixed to the first central shaft 404 via one or more fasteners 422 that are received within fastener opening 424 of the cams 420a, 420b, 420c, 420d and secured to corresponding fastener holes 426 defined along the outer surface of the first central shaft 404. In some non-limiting examples, one or more of the cams 420a, 420b,

420c, 420d can be formed of two pieces (e.g., two semi-circular pieces) that are attached to opposing radial sides of the first central shaft 404 to form the one or more the cams 420a, 420b, 420c, 420d. In some non-limiting examples, the cams 420a, 420b, 420c, 420d can be splined with the first central shaft 404. For example, the outer surface of the first central shaft 404 can include a plurality of grooves extending axially along the camshaft axis 240 and the inner surface of the cams 420a, 420b, 420c, 420d can include a plurality of ribs that are configured to be received by the corresponding plurality of grooves of the first central shaft 404. In some non-limiting examples, one or more of the cams 420a, 420b, 420c, 420d can be integrally formed with the first central shaft 404.

As shown in FIG. 21, each of the cams 420a, 420b, 420c, 420d can have one or more cam lobes 430 that can extend radially outward from first central shaft 404 relative to the camshaft axis 240. In the illustrated non-limiting example, the cam lobes 430 of the cams 420a, 420b, 420c, 420d can be configured to rotatably engage at least one of the carrier engagement protrusions 332 (or the carrier engagement surfaces 326) of the upper and lower poppet carriages 280a, 280b within the cartridge opening 300 of one of the first plurality of poppet cartridges 230a when the first central shaft 404 is rotated. In the illustrated non-limiting example, each of the cams 420a, 420b, 420c, 420d can have at least two cam lobes 430. In some non-limiting examples, the cam lobes 430 of the cams 420a, 420b, 420c, 420d can be integrally formed with the first central shaft 404.

Figure 27:
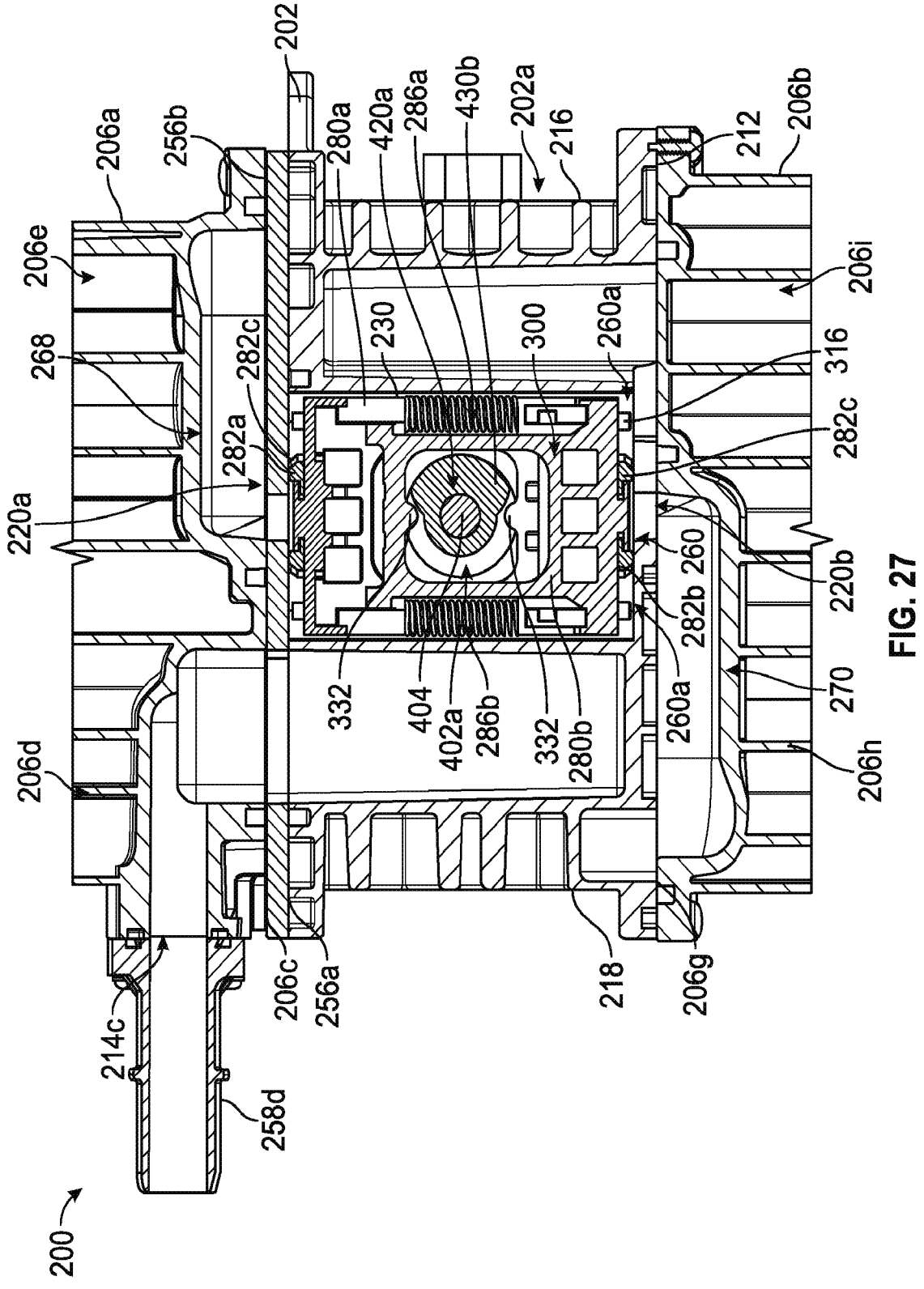
FIG. 27 is a cross-sectional view of the control valve taken along line 27-27 of FIG. 4.
Figure 28:
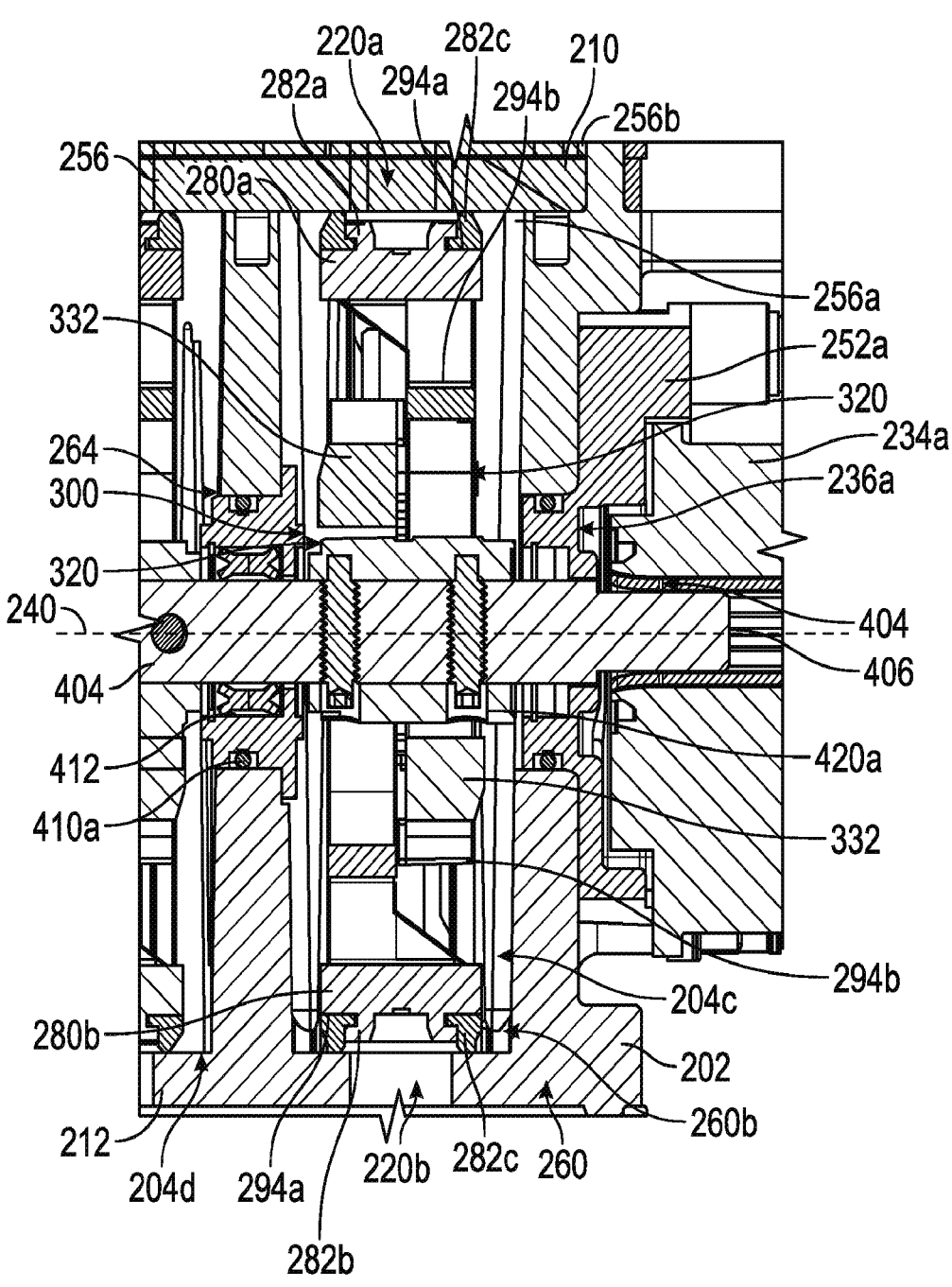
FIG. 28 is a detail view of a first valve chamber of the control valve of FIG. 26.
Figure 30:
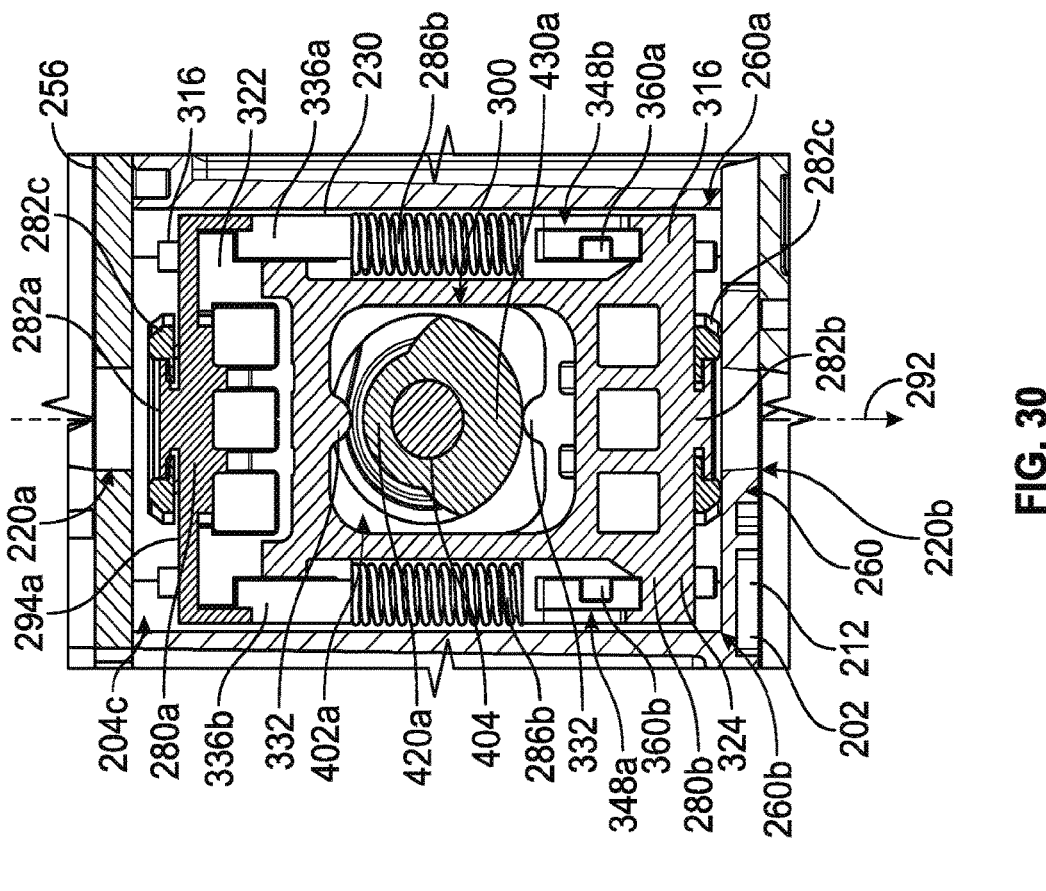
FIG. 30 is another detail view of the first valve chamber of the control valve of FIG. 27 with the first cam of the first camshaft in a second position, the upper poppet carriage of the poppet cartridge in a poppet open position, and the lower poppet carriage of the poppet cartridge in a poppet closed position.
Figure 29:
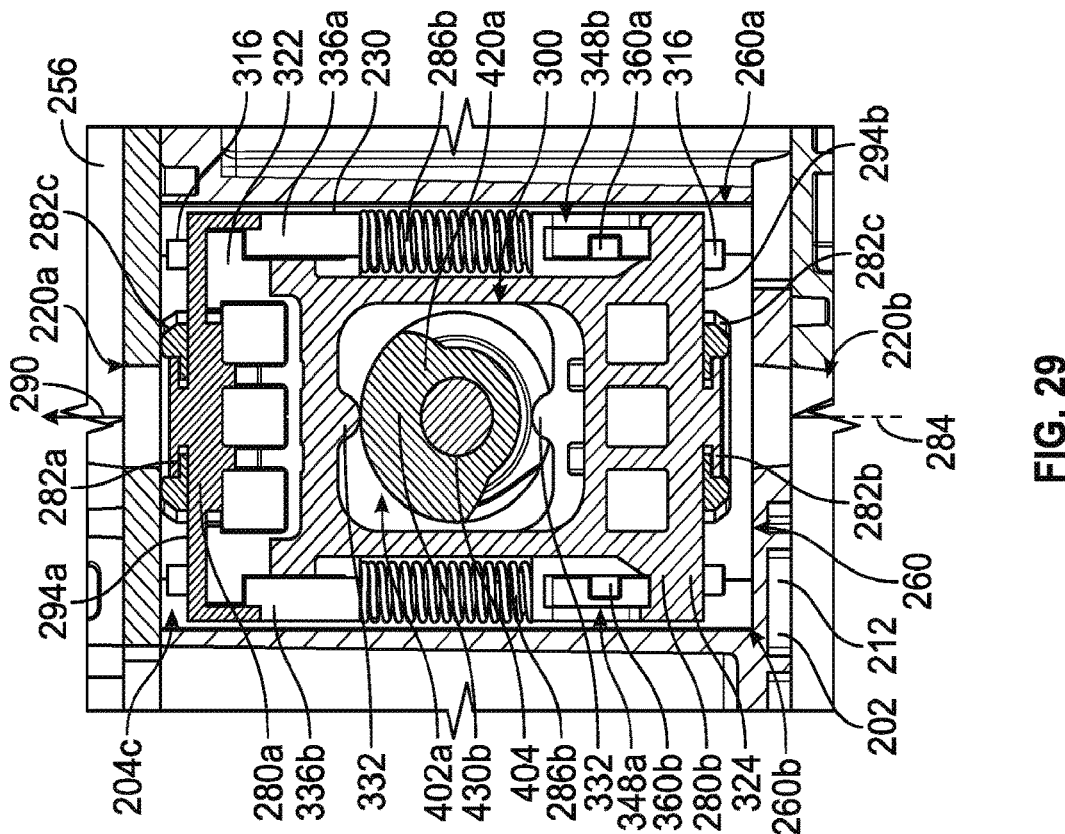
FIG. 29 is a detail view of the first valve chamber of the control valve of FIG. 27 with a first cam of a first camshaft in a first position, an upper poppet carriage of a poppet cartridge in a poppet closed position, and a lower poppet carriage of the poppet cartridge in a poppet open position.

As previously noted herein, the first camshaft 402a can selectively move the upper and lower poppet carriages 280a, 280b of one of the first plurality of poppet cartridges 230a from a first end position toward a second end position. As such, the upper poppet 282a attached to the upper carriage 280a of the poppet cartridge 230 can be selectively moved from an upper poppet closed position (as shown in FIG. 27) toward an upper poppet open position (as shown in FIG. 30) by movement of the upper poppet carriage 280a from the first end position toward the second end position in a first radial direction relative to the camshaft axis 240 along the poppet axis 284 (i.e., the second axial direction 292 in FIG. 16) towards the camshaft axis 240. Similarly, the lower poppet 282b attached to the lower poppet carriage 280b of the poppet cartridge 230 can be selectively moved between a lower poppet closed position (as shown in FIG. 27) toward a lower poppet open position (as shown in FIG. 29) by movement of the lower poppet carriage 280b from the first end position toward the second end position in a second radial direction that is opposite the first radial direction and toward the camshaft axis 240 (i.e., the first axial direction 290 in FIG. 16).

More specifically, in the illustrated non-limiting example, the correlation between the first and second end positions of the poppet carriages 280a, 280b and the open and closed positions of the poppets 282a, 282a can result from the arrangement of the first and second springs 286a, 286b of the poppet cartridge 230. In particular, the first and second springs 286a, 286b can simultaneously bias the upper poppet carriage 280a outwardly from the camshaft axis 240) in the second radial direction (i.e., the first axial direction 290) and the lower poppet carriage 280b outwardly from the camshaft axis 240 in the first radial direction (i.e., axially away from the upper poppet carriage 280a along the poppet axis 284 in the second axial direction 292).

Thus, with the first camshaft 402a extending through the cartridge opening 300 (i.e., the carriage openings 320 of the upper and lower poppet carriages 280a, 280b) of one of the first plurality of poppet cartridges 230a, the first cam 420a of the first camshaft 402a, for example, can selectively engage one or both of the poppet carriages 280a, 280b. For example, as shown in FIG. 29, when the first central shaft 404 of the first camshaft 402a is rotated to a first angular position, the second cam 420b can rotatably engage the carriage engagement protrusion 332 of the lower poppet carriage 280b to move the lower poppet carriage 280b in the first axial direction 290 from the first end position (with the lower poppet 282b in the lower poppet closed position) toward the second end position (with the lower poppet 282b in the lower poppet open position). With the first central shaft 404 of the first camshaft 402a in the first angular position, the upper poppet carriage 280a remains in the first end position (with the upper poppet 282a in the upper poppet closed position) as the first cam 420a does not engage the upper poppet carriage 280a. When the first camshaft is rotated to a second angular position (e.g., 180 degrees from the first angular position), as shown in FIG. 30, the first cam 420a can rotationally engage the carriage engagement protrusion 332 of the upper poppet carriage 280a to move the upper poppet carriage 280a in the second axial direction 292 from the first end position (with the upper poppet 282a in the upper poppet closed position) toward the second end position (with the upper poppet 282a in the upper poppet open position). With the first central shaft 404 of the first camshaft 402a rotating from the first angular position to the the second angular position, the lower poppet carriage 280b moves back to the first end position (with the lower poppet 282b in the lower poppet closed position) as the second cam 420b no longer engages the lower poppet carriage 280b.

Figure 23:
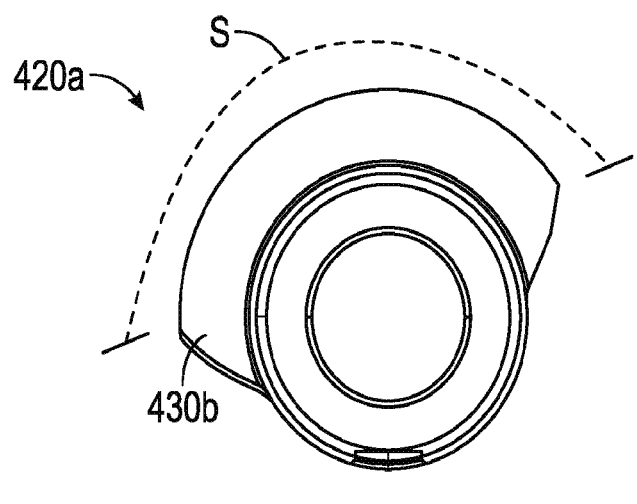
FIG. 23 is a front plan view of a first cam of the first camshaft assembly of FIG. 21.
Figure 24:
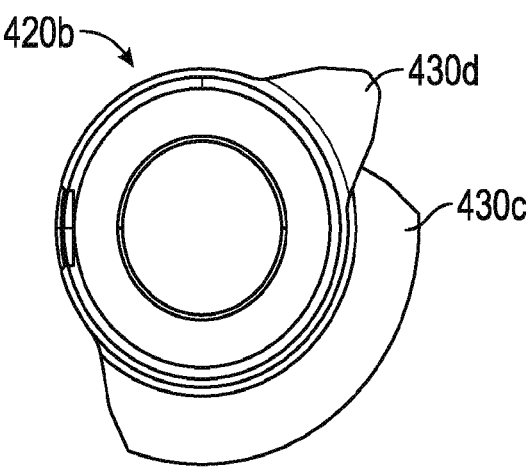
FIG. 24 is a front plan view of a second cam of the first camshaft assembly of FIG. 21.
Figure 25:
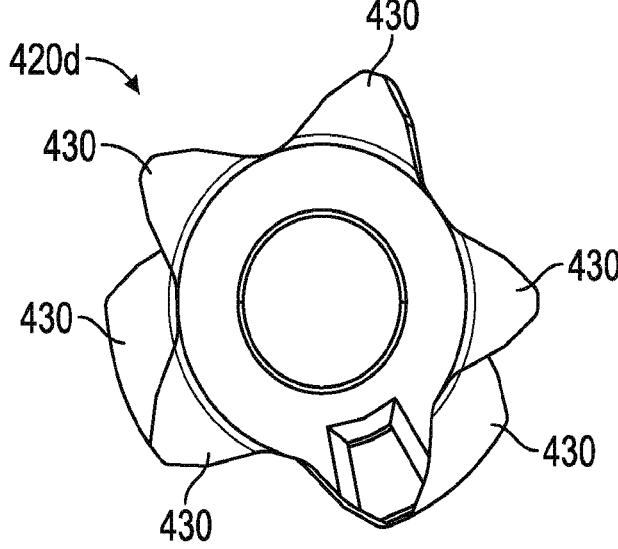
FIG. 25 is a front plan view of a fourth cam of the first camshaft assembly of FIG. 21.

Referring now to FIGS. 23-25, the cams 420a, 420b, 420c, 420d of the first camshaft 402a, and any cams of the second camshaft 402b (see FIG. 6) of the second camshaft assembly 232b, can be configured in various ways to meet the requirements of various arrangements are not limited to the non-limiting examples illustrated in FIGS. 21-25. For example, each of the cams 420a, 420b, 420c, 420d of the first camshaft 402a can be configured in different ways to engage one or more of the first plurality of poppet cartridges 230a that may be disposed within a particular one of the first plurality of valve chambers 204a having the corresponding cam 420a, 420b, 420c, 420d. For example, the first and second cams 420a, 420b of the first camshaft 402a can be configured to engage only one of the first plurality of poppet cartridges 230a that are disposed in the corresponding first and second valve chambers 204c, 204d, respectively, of the valve body 202 (see FIG. 27).

Accordingly, as shown in FIGS. 21 and 23, the first cam 420a has a first cam lobe 430a disposed toward the first end 406 of the first central shaft 404 that is configured to engage the upper (i.e., first) poppet carriage 280a of the (i.e., first) poppet cartridge 230 and a second cam lobe 430b disposed adjacent to the first cam lobe 430a toward the second end 408 of the first central shaft 404 that is configured to engage the lower (i.e., second) poppet carriage 280b of the (i.e., first) poppet cartridge 230 disposed within the first valve chamber 204c. Similarly, as shown in FIGS. 21 and 24, the second cam 420b of the first camshaft 402a includes a third cam lobe 430c disposed toward the second cam lobe 430b of the first cam 420a that is configured to engage the upper (i.e., third) poppet carriage 280a of the (i.e., second) poppet cartridge 230) and a fourth cam lobe 430d disposed toward the second end 408 of the first central shaft 404 that is configured to engage the lower (i.e., fourth) poppet carriage 280b of the (i.e., second) poppet cartridge 230 disposed within the second valve chamber 204d. Alternatively, as shown in FIGS. 21 and 25, the fourth cam 420*d* of the first camshaft 402*a* can be configured to engage three or more of the first plurality of poppet cartridges 230*a* that can be disposed within the fourth valve chamber 204*f* of the valve body 202. As such, the fourth cam 420*d* of the first camshaft 402*a* includes six cam lobes 430 arranged in series along the fourth cam 420*d*.

Correspondingly, the arrangement, shape, and overall design of the first and second cam lobes 430*a*, 430*b* of the first cam 420*a* of the first camshaft 402*a*, and any other cam lobes 430 of the first camshaft 402*a* (e.g., the third and fourth cam lobes 430*c*, 430*d* of the second cam 420*b*) or of the second camshaft 402*b* (see FIG. 6) of the second camshaft assembly 232*b*, can be designed in various ways to meet the requirements of various applications and are not limited to the non-limiting examples illustrated in FIGS. 21-25. For example, in the illustrated non-limiting example, the design of each of the two or more cam lobes 430 of the cams 420*a*, 420*b*, 420*c*, 420*d* of the first camshaft 402*a* can be manipulated to alter a timing in which the corresponding upper and lower chamber ports 220*a*, 220*b* of the corresponding valve chamber 204 of the valve body 202 are opened or closed relative to each other by the poppet cartridge 230.

With particular reference to the first cam 420*a* of the first camshaft 402*a* shown in FIG. 23, the design of the first cam lobe 430*a* and/or the second cam lobe 430*b* of the first cam 420*a* of the first camshaft assembly 232*a* can be manipulated to alter a timing of the opening or closing of the corresponding upper chamber port 220*a* and/or the lower chamber port 220*b* of the first valve chamber 204*c* by the corresponding upper and lower poppets 282*a*, 282*b* of the poppet cartridge 230. More specifically, a particular radial orientation and/or an arc length s of the first cam lobe 430*a* relative to the a radial orientation and/or an arc length s of the second cam lobe 430*b* of the first cam 420*a* can alter a time and/or a duration in which the upper chamber port 220*a* is opened by the upper poppet 282*a* of the poppet cartridge 230 relative to a time and/or a duration in which the lower chamber port 220*b* is opened by the corresponding lower poppet 282*b* of the same poppet cartridge 230.

For example, with the first cam lobe 430*a* being radially aligned with the second cam lobe 430*b* and the first cam lobe 430*a* having the same arc length s as the second cam lobe 430*b* (e.g., similar to the illustrated design of the first cam 420*a* in FIG. 23), the first cam 420*a* can cause the upper chamber port 220*a* to open for a first duration of time with the lower chamber port 220*b* closed and then the lower chamber port 220*b* to open simultaneously as the upper chamber port 220*a* closes and the lower chamber port 220*b* remaining open for the first duration of time. On the other hand, with the first cam lobe 430*a* being radially opposite to the second cam lobe 430*b* relative to the camshaft axis 240 and the first cam lobe 430*a* having the same arc length s as the second cam lobe 430*b*, the first cam 420*a* can cause the upper and lower chamber ports 220*a*, 220*b* to simultaneously open for the same duration of time and then simultaneously close. Relatedly, with the first cam lobe 430*a* being radially aligned with the second cam lobe 430*b* and the first cam lobe 430*a* having a greater arc length s than that of the second cam lobe 430*b*, the first cam 420*a* can cause the upper chamber port 220*a* open for a first duration of time and the lower chamber port 220*b* to open for a second duration of time that is less than the first duration of time, with a portion of the second duration of time overlapping with the first duration of time.

While FIGS. 4-30 illustrated one non-limiting configuration for operation of the poppet cartridge 230 of the control valve 200, a plurality of configurations can be conceived by one skilled in the art. For example, the motion described in the exemplary configuration utilizes a poppet cartridge having two poppets that travel along axial-planar motion, where each of the poppets move between the two end positions axially and in the same plane. In some non-limiting examples, the poppet cartridge motion can be non-planar, where the poppets move between one or more end positions in two different planes. Additionally or alternatively, the poppet cartridge motion can include three dimensional movement, where the poppets move between one or more end positions in more than one plane and/or along alternate axes.

Figure 31:
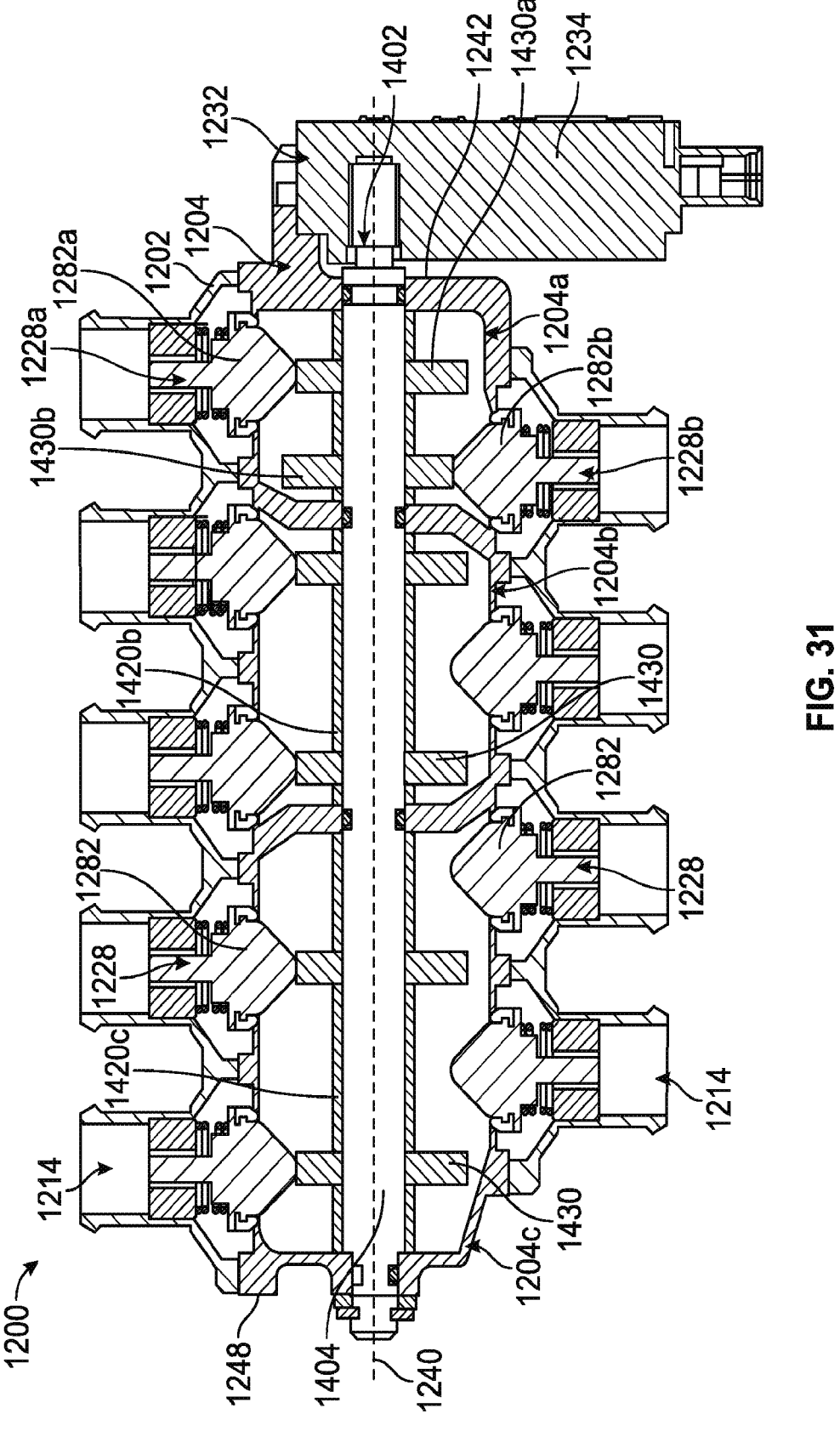
FIG. 31 is a cross-sectional view of a control valve according to one aspect of the present disclosure.

It should be appreciated that other configurations of a poppet assembly are also possible. For example, a plurality of poppets of a poppet assembly can each be arranged within a respective valve chamber port and biased inwardly toward a camshaft that can engage the poppet outwardly to permit flow through the valve chamber ports. In this regard, FIG. 31 illustrates a control valve 1200 that can include a valve body 1202 having one or more valve chambers 1204, a poppet assembly 1228 disposed within each valve chamber 1204, and a camshaft assembly 1232. The control valve 1200 illustrated in FIG. 31 can be substantially similar to the control valves previously described herein, for example the control valve 200 illustrated in FIGS. 4-30, with similar components identified using like reference numerals but under the "1200" to "1400" series, unless as described herein or apparent from the figures. Aspects that are the same or substantially similar in structure and/or function will not be repeated. As such, it is to be understood that, unless stated or shown otherwise, elements reference with like numerals can function the same or substantially similar to those of the control valve 200 of FIGS. 4-30.

As shown in FIG. 31, the valve body 1202 of the control valve 1200 can include a first valve chamber 1204*a*, a second valve chamber 1204*b*, and a third valve chamber 1204*c* arranged in series between a first valve body end 1242 and a second valve body end 1248 opposite the first valve body end 1242. Each of the valve chambers 1204*a*, 1204*b*, 1204*c* can include at least one chamber port 1220 that is in fluid communication with at least one valve port 1214 of the control valve 1200. A camshaft 1402 of the camshaft assembly 1232 can extend through the first and second valve body ends 1242, 1248 and through each of the valve chambers 1204*a*, 1204*b*, 1204*c* along a camshaft axis 1240. In the illustrated non-limiting example, the camshaft assembly 1232 can further include at least one actuator 1234 coupled to a central shaft 1404 of the camshaft 1402 to rotate the camshaft 1402 in one or more rotational directions about the camshaft axis 1240.

Figure 32:
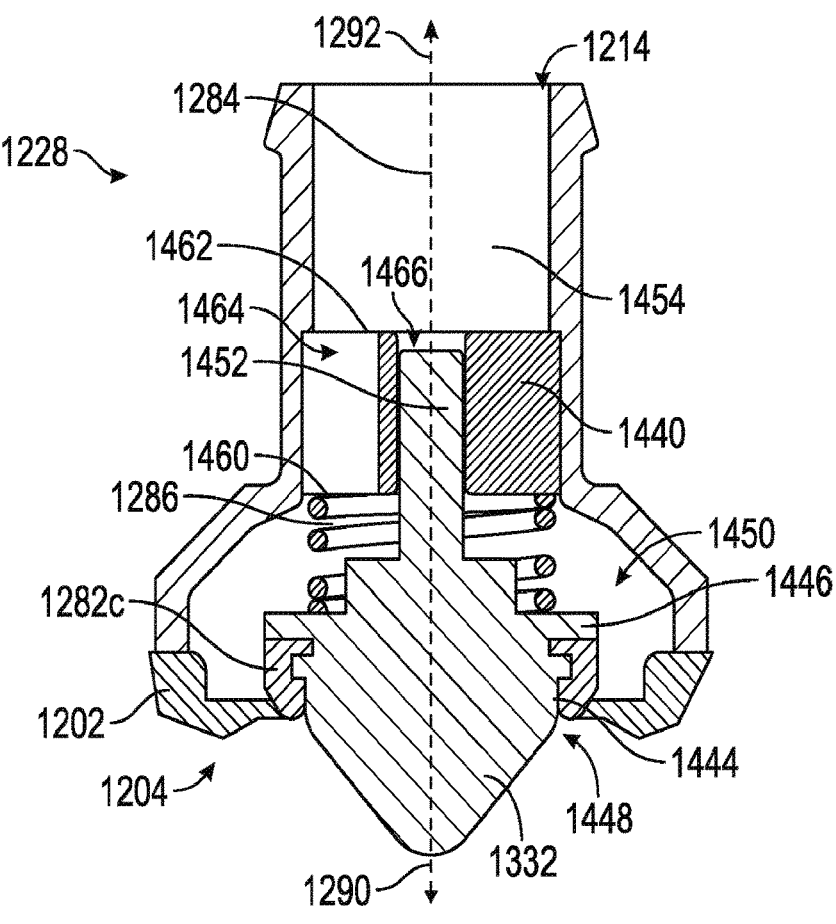
FIG. 32 is a cross-sectional view of a poppet assembly of the control valve of FIG. 31.

Referring now to FIG. 32, each poppet assembly 1228 can be arranged within a respective one of the chamber ports 1220 of the valve chambers 1204*a*, 1204*b*, 1204*c* and can include a poppet 1282, a poppet guide 1440, and a spring 1286 arranged between the poppet 1282 and the poppet guide 1440. The poppet 1282 can have a first end 1444 arranged within a port opening 1448 of the chamber port 1220 and a second end 1446 extending from the first end 1444 along a poppet axis 1284 into a poppet cavity 1450 of the chamber port 1220. A poppet engagement protrusion 1332 can extend axially from the first end 1444 along the poppet axis 1284 away from the second end 1446 and partially into the valve chamber 1204 of the valve body 1202. A poppet post 1452 can extend axially from the second end 1446 along the poppet axis 1284 away from the first end 1444 and into the poppet cavity 1450 of the chamber port 1220. In the illustrated non-limiting example, a poppet seal 1282c can be arranged between the first and second ends 1444, 1446 of the poppet 1282 that can be configured to contact the port opening 1448 to provide a seal between the poppet cavity 1450 of the chamber port 1220 and the valve chamber 1204 of the valve body 1202.

Figure 33:
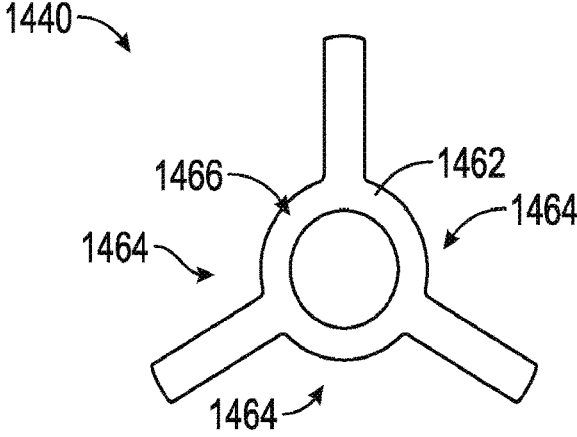
FIG. 33 is a top view of a poppet guide of the poppet assembly of FIG. 32.

The poppet guide 1440 of the poppet assembly 1228 can be arranged within a poppet passageway 1454 of the chamber port 1220 that provides fluid communication between the poppet cavity 1450 of the chamber port 1220 and the respective valve port 1214 of the control valve 1200. As shown in FIG. 33, in the illustrated non-limiting example, the poppet guide 1440 can have a first end 1460, a second end 1462 opposite the first end 1460, one or more poppet guide openings 1464, and one or more poppet post holes 1466. The poppet guide openings 1464 can extend through the first and second ends 1460, 1462 of the poppet guide 1440 to permit flow through the poppet guide 1440 and the poppet passageway 1454 of the chamber port 1220. The poppet post hole 1466 can extend through at least the first end 1460 and can be configured to slidably receive the poppet post 1452 of the poppet 1282. In the illustrated non-limiting example, the poppet post hole 1466 is axially aligned with the poppet axis 1284 and the poppet guide openings 1464 extend radially outward from the poppet post hole 1466 relative to the poppet axis 1284.

The spring 1286 of the poppet assembly 1228 can be disposed between the second end 1446 of the poppet 1282 and the first end 1460 of the poppet guide 1440. In the illustrated non-limiting example, the poppet guide 1440 can be fixedly attached within the poppet passageway 1454 such that the poppet 1282 is moveable relative to the poppet guide 1440 axially along the poppet axis 1284 within the poppet cavity 1450 of the chamber port 1220 between a poppet closed position (as shown in FIG. 32), in which the poppet 1282 contacts the port opening 1448, and a poppet open position, in which the poppet 1282 does not contact the port opening 1448. The spring 1286 can be configured to bias the poppet 1282 axially away from the poppet guide 1440 toward the port opening 1448 (i.e., toward the poppet closed position) in a first axial direction 1290.

Referring again to FIG. 31, the camshaft 1402 of the camshaft assembly 1232 can include one or more cams 1420 that can be fixedly attached to the central shaft 1404 and can be arranged within each of the valve chambers 1204 of the valve body 1202. In addition, each of the cams 1420 of the camshaft 1402 can have one or more cam lobes 1430 (see FIG. 34) that extend radially outward from the central shaft 1404 relative to the camshaft axis 1240. In the illustrated non-limiting example, the camshaft 1402 includes a first cam 1420a arranged within the first valve chamber 1204a, a second cam 1420b arranged within the second valve chamber 1204b, and a third cam 1420c arranged within the third valve chamber 1204c.

The cam lobes 1430 of the cams 1420a, 1420b, 1420c can be configured to rotatably engage the poppet engagement protrusions 1332 of the poppets 1282 of the poppet assemblies 1228 to move each poppet 1282 from the poppet closed position toward the poppet open position in a second axial direction 1292 that is opposite the first axial direction 1290. In particular, as shown in FIG. 31, the cam lobes 1430 of the cams 1420a, 1420b, 1420c can be arranged along the central shaft 1404 of the camshaft 1402 such that one cam lobe 1430 is aligned with the poppet axis 1284 of one poppet assembly 1228 of the valve chambers 1204a, 1204b, 1204c. For example, in the illustrated non-limiting example, the first valve chamber 1204a includes a first chamber port 1220a with a first poppet assembly 1228a having a first poppet 1282a and a second chamber port 1220b with a second poppet assembly 1228b having a second poppet 1282b.

Accordingly, the first cam 1420a of the camshaft 1402 arranged within the first valve chamber 1204a includes a first cam lobe 1430a aligned with the poppet axis 1284 of the first poppet assembly 1228a and a second cam lobe 1430b aligned with the poppet axis 1284 of the second poppet assembly 1228b. As such, when the central shaft 1404 of the camshaft 1402 is rotated via the actuator 1234 in a first rotational direction, the first cam lobe 1430a can rotatably engage the poppet engagement protrusion 1332 of the first poppet 1282a and cause the first poppet 1282a to move axially along the poppet axis 1284 toward the poppet guide 1440 and away from the port opening 1448 of the first chamber port 1220a. As the central shaft 1404 of the camshaft 1402 is rotated further in the first rotational direction (or rotated in a second rotational direction that is opposite the first rotational direction), the first cam lobe 1430a of the first cam 1420a can disengage the poppet engagement protrusion 1332 of the first poppet 1282a of the first poppet assembly 1228a and the spring 1286 can bias the first poppet 1282a axially toward the port opening 1448 of the first chamber port 1220a and the poppet closed position. Simultaneously or separately, the second cam lobe 1430b of the second cam 1420b can rotatably engage the poppet engagement protrusion 1332 of the second poppet 1282b and cause the second poppet 1282b to move axially along the poppet axis 1284 toward the poppet guide 1440 and away from the port opening 1448 of the second chamber port 1220b, In some non-limiting examples, the first cam lobe 1430a of the first cam 1420a can be rotatably engage both the first and second poppet assemblies 1228a, 1228b.

Figure 34:
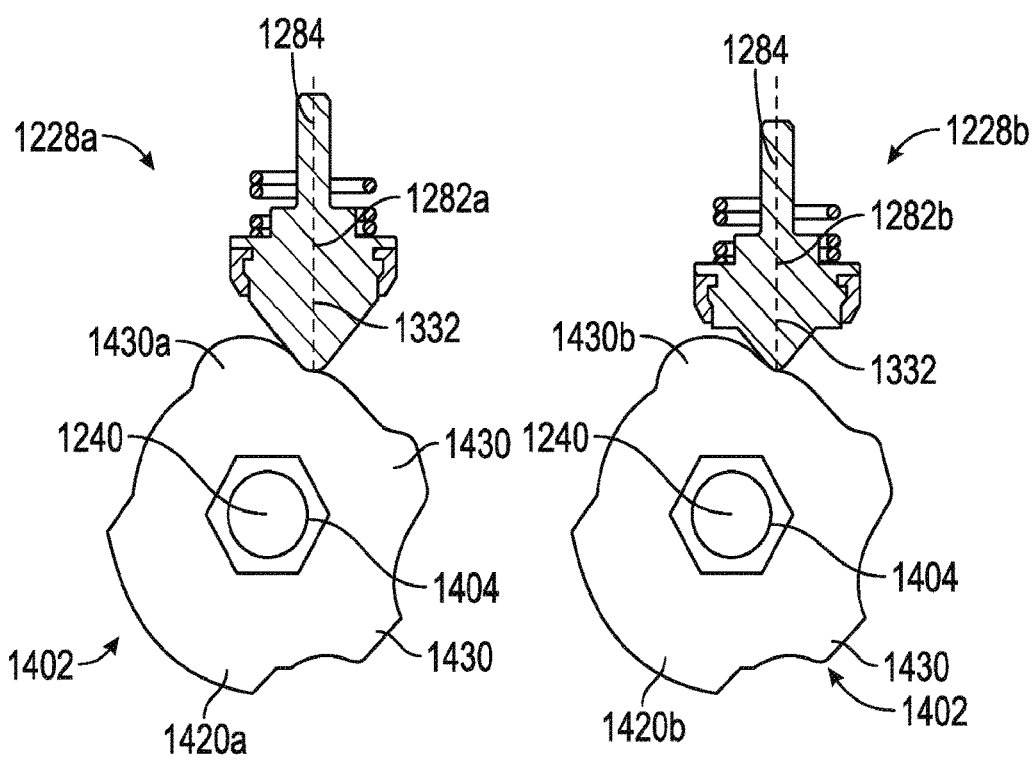
FIG. 34 is an example configuration of a plurality of poppet assemblies of the control valve of FIG. 31.

As shown in FIG. 34, in some non-limiting examples, the poppets 1282 of one or more of the poppet assemblies 1228 of the control valve 1200 can have differing dimensions than the poppets 1282 of the other poppet assemblies 1228. For example, the poppet engagement protrusion 1332 of the first poppet 1282a of the first poppet assembly 1228a can differ from the poppet engagement protrusion 1332 of the second poppet 1282b of the second poppet assembly 1228b. In particular, as shown in FIG. 34, the poppet engagement protrusion 1332 of the first poppet 1282a has a greater width and a greater length than that of poppet engagement protrusion 1332 of the second poppet 1282b. Due to the greater width of the first poppet 1282a, a time in which the first cam lobe 1430a rotatably engages the poppet engagement protrusion 1332 of the first poppet 1282a as the camshaft 1402 rotates is greater than a time in which the second cam lobe 1430b rotatably engages the poppet engagement protrusion 1332 of the second poppet 1282b. Relatedly, due to the greater length of the first poppet 1282a, the first cam lobe 1430a can cause the first poppet 1282a to move further away from the port opening 1448 (see FIG. 31) of the first chamber port 1220a than the second cam lobe 1430b can cause the second poppet 1282b to move to move from the second chamber port 1220b.

Figure 35:
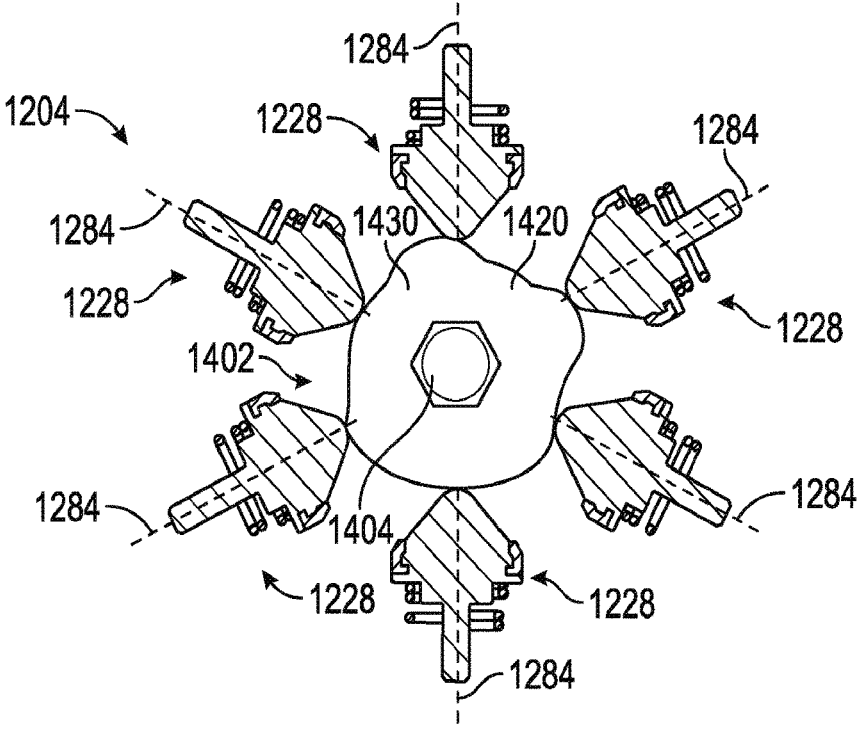
FIG. 35 is another example configuration of the plurality of poppet assemblies of the control valve of FIG. 31.

It should be appreciated that the poppet assembly 1228 can be utilized in other arrangements of chamber ports 1220 within a valve chamber 1204 of a valve body 1202. For example, as shown in FIG. 35, in some non-limiting examples, one valve chamber 1204 of the valve body 1202 of the control valve 1200 can include three or more chamber ports 1220 with three or more poppet assemblies 1228 arranged circumferentially about the camshaft 1402 relative to the camshaft axis 1240. Thus, a single cam 1420 of the camshaft 1402 can rotatably engage the three or more poppets 1282 of the three or more poppet assemblies 1228 of the three or more chamber ports 1220. In the illustrated non-limiting example, six poppet assemblies 1228 are arranged evenly arranged circumferentially about the camshaft 1402. In some non-limiting examples, one or more of the three or more poppet assemblies 1228 can be arranged at a radial angle that is relatively greater than or less than the other poppet assemblies 1228 relative to the camshaft axis 1240.

Figures 36, 37, 38:
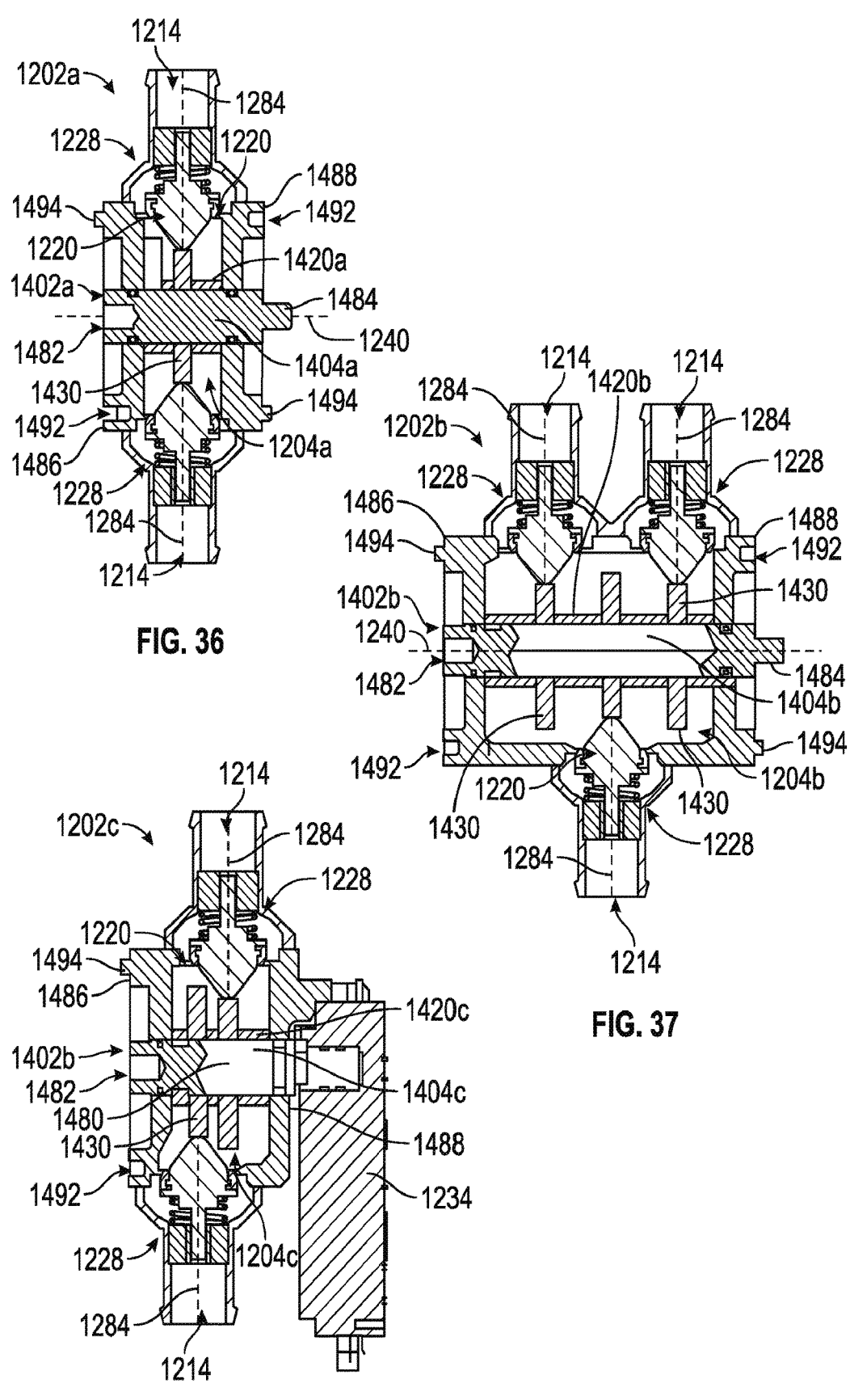
FIG. 36 is a cross-sectional view of an example first valve section of the control valve of FIG. 31.
FIG. 37 is a cross-sectional view of an example second valve section of the control valve of FIG. 31.
FIG. 38 is a cross-sectional view of an example third valve section of the control valve of FIG. 31.

It should also be appreciated that the valve body 1202 of the control valve 1200 can be assembled of two or more valve body sections that each can define one or more valve chambers 1204 to form the valve body 1202. For examples, FIGS. 36-38 illustrate a first valve section 1202a defining the first valve chamber 1204a, a second valve section 1202b defining the second valve chamber 1204b, and a third valve section 1202c defining the third valve chamber 1204c. Similarly, the camshaft 1402 of the camshaft assembly 1232 can include a first camshaft 1402a extending through the first valve section 1202b with a first central shaft 1404a and the first cam 1420a, a second camshaft 1402b extending through the second valve section 1202c with a second central shaft 1404b and the second cam 1420b, and a third camshaft 1402c extending through the third valve section 1202c with a third central shaft 1404c and a third cam 1420c.

As shown in FIG. 36, the first valve chamber 1204a of the first valve section 1202a has two chamber ports 1220 with two poppet assemblies 1228, and the first cam 1420a of the first camshaft 1402a has one cam lobe 1430 that rotatably engages the two poppet assemblies 1228. In other words, in the illustrated non-limiting example, the chamber ports 1220 and the corresponding poppet axes 1284 of the poppet assemblies 1228 of the first valve section 1202a are axially aligned. As shown in FIG. 37, the second valve chamber 1204b of the second valve section 1202b has three chamber ports 1220 with three poppet assemblies 1228, and the second cam 1420b of the second camshaft 1402b has three cam lobes 1430 that rotatably engage one of the three poppet assemblies 1228. Each of the first and second central shafts 1404a, 1404b of the first and second camshafts 1402a, 1402b can have a camshaft recess 1482 at one longitudinal end and a camshaft protrusion 1484 at the other longitudinal end. In addition, first and second ends 1486, 1488 of the first and second valve sections 1202a, 1202b can each have at least one valve body recess 1492 and at least one valve body protrusion 1494.

As shown in FIG. 38, the third valve chamber 1204c of the third valve section 1202c has two chamber ports 1220 with two poppet assemblies 1228 that are axially offset from each other. Thus, unlike the first camshaft 1402a of the first valve section 1202a, the third cam 1420c of the third camshaft 1402c has two cam lobes 1430 that rotatably engage the axially offset two poppet assemblies 1228. In addition, the third central shaft 1404c of the third camshaft 1402c can have only the camshaft recess 1482 at one longitudinal end and can be coupled to the actuator 1234 of the control valve 1200 at the other longitudinal end along the second end 1488 of the third valve section 1202c. Further, the first end 1486 of the third valve section 1202c can have at least one valve body recess 1492 and one valve body protrusion 1494.

Referring to FIGS. 36-38, in the illustrated non-limiting example, the valve sections 1202a, 1202b, 1202c can be coupled together to form the valve body 1202 having the valve chambers 1204a, 1204b, 1204c. In particular, the second end 1488 of the first valve section 1202a can be mated with the first end 1486 of the second valve section 1202b and the second end 1488 of the second valve section 1202b can be mated with the first end 1486 of the third valve section 1202c via the valve body recesses and protrusions 1492, 1494. Thus, with the first, second, and third valve sections 1202a, 1202b, 1202c assembled, the first, second, and third valve chambers 1204a, 1204b, 1204c of the valve body 1202 can be arranged in series along the camshaft axis 1240. In addition, the central shafts 1404a, 1404b, 1404c of the camshafts 1402a, 1402b, 1402c of the valve sections 1202a, 1202b, 1202c can be coupled together to form the central shaft 1404 of the camshaft 1402. In particular, the first central shaft 1404a of the first camshaft 1402a can be coupled to one end of the second central shaft 1404b of the second camshaft 1402b and the other end of the second central shaft 1404b can be coupled to the third central shaft 1404c of the third camshaft 1402c via the camshaft recesses and protrusions 1482, 1484. Thus, the central shafts 1404a, 1404b, 1404c can be mated in series along the camshaft axis 1240 to form the central shaft 1404 of the camshaft 1402, which can be rotated by the actuator 1234 of the third valve section 1202c.

Figure 39:
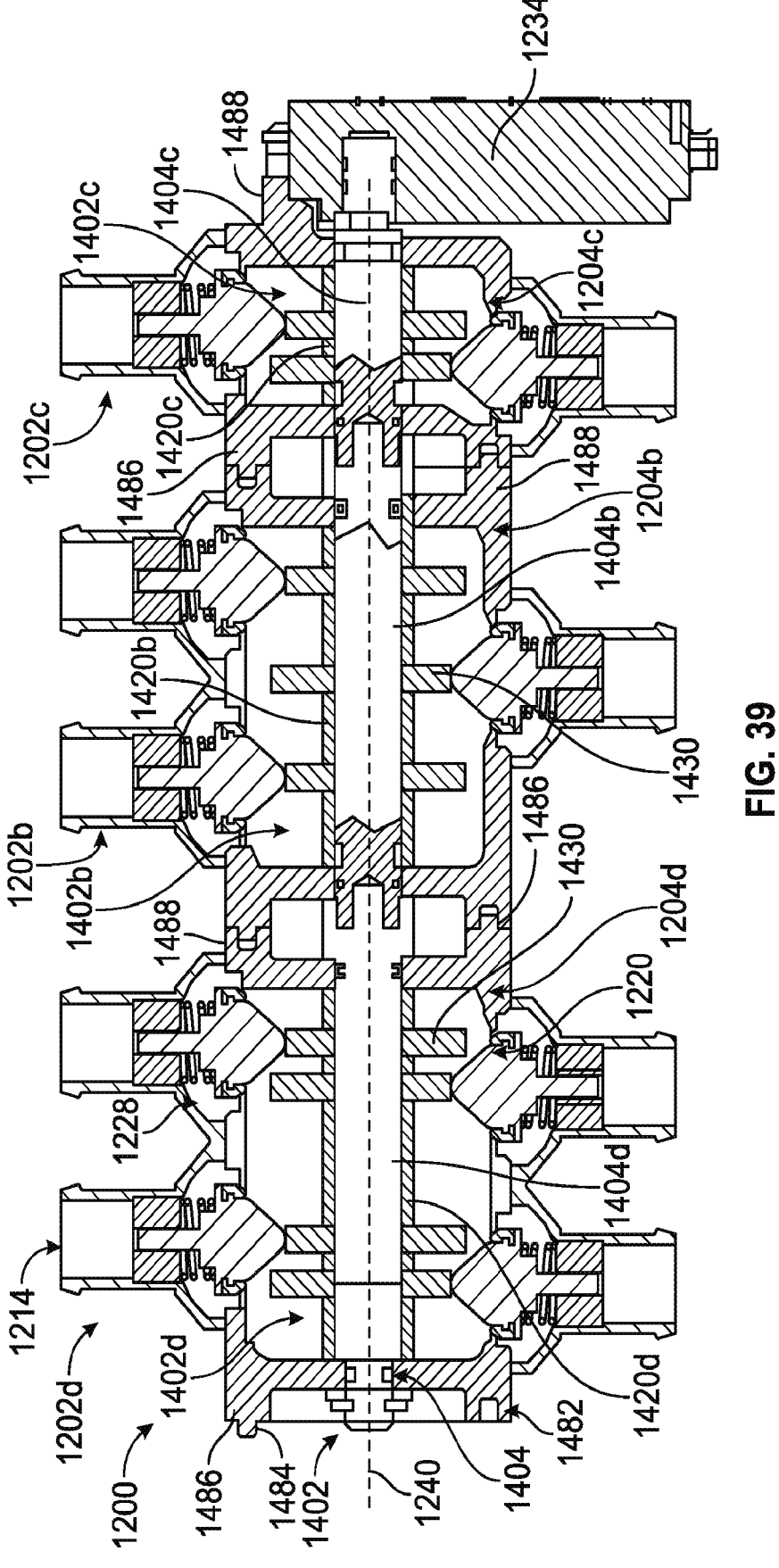
FIG. 39 is a cross-sectional view of assembled example valve sections of the control valve of FIG. 31.
Figure 40:
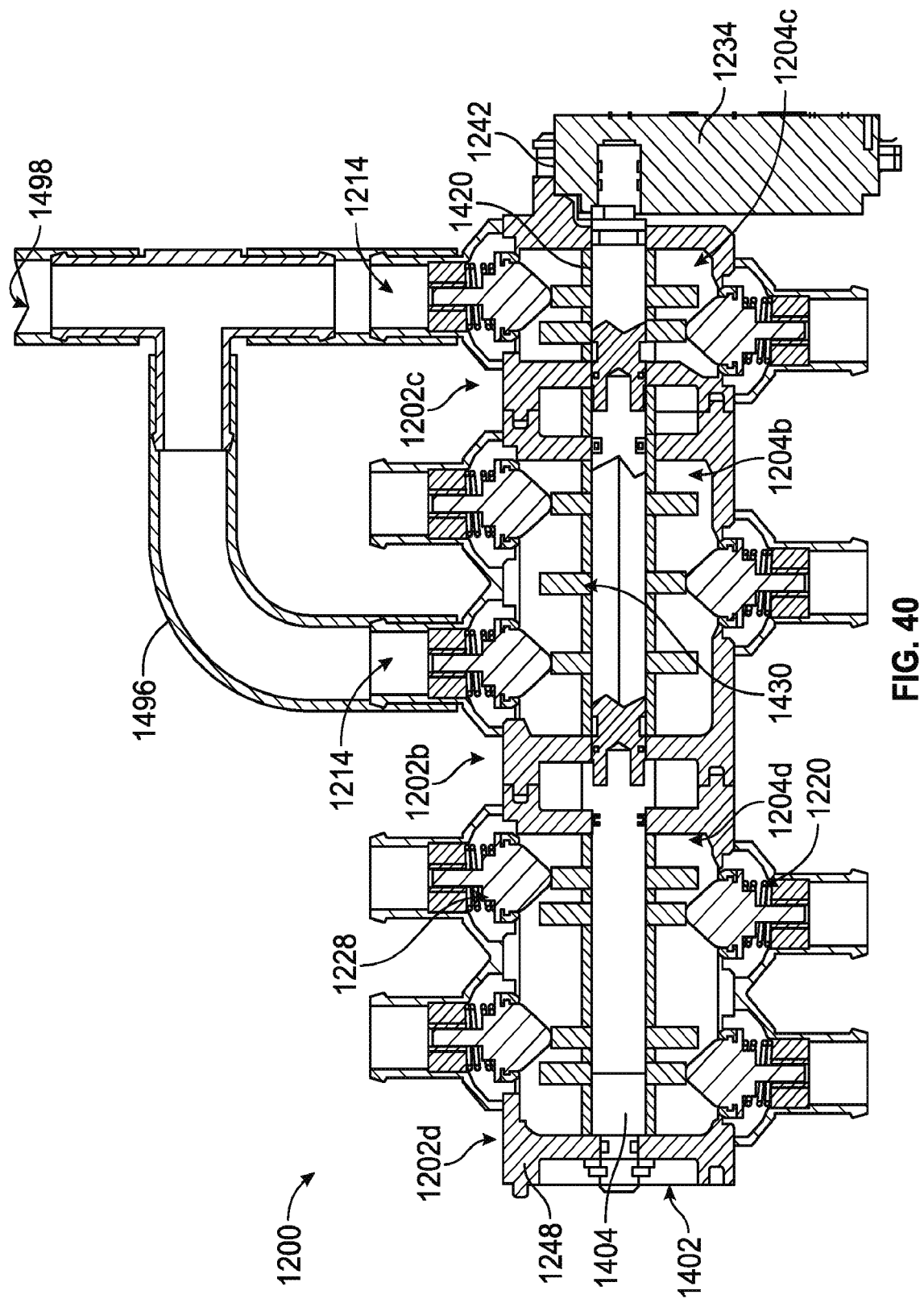
FIG. 40 is a cross-sectional of the control valve of FIG. 39 with a valve conduit.

Referring now to FIGS. 39 and 40, the interoperability of the valve sections 1202a, 1202b, 1202c can provide an easily customizable arrangement of the valve body 1202 of the control valve 1200 for particular applications. More specifically, any of the valve sections 1202a, 1202b, 1202c can be rearranged or replaced with a different valve section that can have more or less valve ports 1214 and/or differing poppet assembly 1228 arrangements. For example, as shown in FIG. 39, a fourth valve section 1202d can be utilized to form the valve body 1202 in place of the first valve section 1202a (see FIG. 36) with the fourth valve section 1202d defining a fourth valve chamber 1204d with four poppet assemblies 1228 and including a fourth camshaft 1402d having a fourth central shaft 1404d and a fourth cam 1420d. Further, as shown in FIG. 40, in some non-limiting examples, one or more of the valve ports 1214 (and thus also the valve chamber 1204) of the valve sections 1202b, 1202c, 1202d can be in fluid communication with each other via a valve conduit 1496 (such as, e.g., a valve manifold). For example, in the illustrated non-limiting example, one valve port 1214 of each of the second and third valve sections 1202b, 1202c are in fluid communication with each other via the valve conduit 1496 and can be also in fluid communication with a shared valve conduit port 1498.

Figure 41:
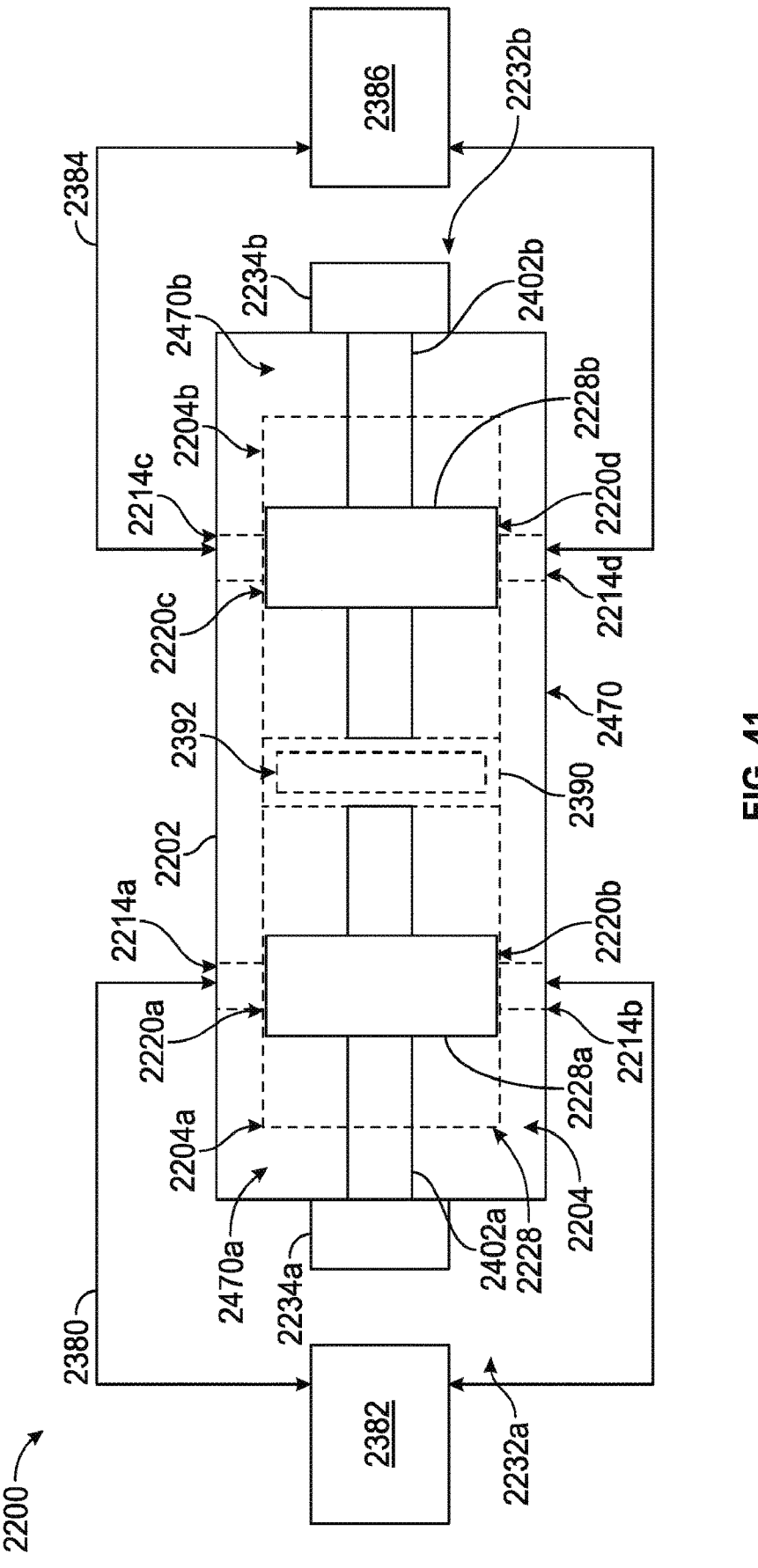
FIG. 41 is an exemplary schematic illustration of a control valve according to one aspect of the present disclosure.

Referring now to FIG. 41, the previous illustrated non-limiting example control valves 200, 1200 of FIGS. 4-40 included a plurality of valve chambers with one or more poppet cartridges arranged within each valve chamber. In other non-limiting examples, a control valve can include two or more valve sections having one or more valve chambers, with one or more of the valve sections being fluidly isolated from the other valve sections. For example, FIG. 41 illustrates a non-limiting example of a control valve 2200 that includes a valve body 2202 defining a plurality of valve sections 2470 arranged in series, where each valve section 2470 includes at least one valve chamber 2204 and a poppet assembly 2228 arranged within each valve chamber 2204. The control valve 2200 illustrated in FIG. 41 can be substantially similar to the control valves previously described herein, for example the control valve 200 illustrated in FIGS. 4-30, with similar components identified using like reference numerals, except as described herein or apparent from the figures. Aspects that are the same or substantially similar in structure and/or function will not be repeated. As such, it is to be understood that, unless stated or shown otherwise, elements reference with like numerals can function the same or substantially similar to those of the control valve 200 of FIGS. 4-30.

In the illustrated non-limiting example, the valve body 2202 includes a first valve section 2470a having a first valve chamber 2204a and a first poppet assembly 2228a (such as, e.g., the first plurality of poppet cartridges 230a of the control valve 200 of FIGS. 4-30) and a second valve section 2470b having a second valve chamber 2204b and a second poppet assembly 2228b (such as, e.g., the second plurality of poppet cartridges 230b of the control valve 200). The first valve chamber 2204a includes first and second chamber ports 2220a, 2220b in fluid communication with first and second valve ports 2214a, 2214b of the valve body 2202, respectively, and the second valve chamber 2204b includes third and fourth chamber ports 2220c, 2220d in fluid communication with third and fourth valve ports 2214c, 2214d of the valve body 2202, respectively.

As illustrated in FIG. 41, the control valve 2200 further includes a first camshaft assembly 2232a with a first camshaft or central shaft 2402a and a first actuator 2234a and a second camshaft assembly 2232b with a second camshaft or central shaft 2402b and a second actuator 2234b (such as, e.g., the first and second camshaft assemblies 1232a, 1232b of the control valve 200). The first camshaft assembly 2232a can be configured to engage the first poppet assembly 2228a to selectively permit or block flow from the first valve chamber 2204a of the first valve section 2470a through the first and second chamber ports 2220a, 2220b to the first and second valve ports 2214a, 2214b. Similarly, the second camshaft assembly 2232b can be configured to engage the second poppet assembly 2228b to selectively permit or block flow from the second valve chamber 2204b of the second valve section 2470b through the third and fourth chamber ports 2220c, 2220d to the third and fourth valve ports 2214a, 2214b. In some non-limiting examples, the control valve 2200 can include a single camshaft assembly configured to selectively engage both the first and second poppet assemblies 2228a, 2228b of the first and second valve sections 2470a, 2470b.

Referring still to FIG. 41, the first and second valve ports 2214a, 2214b of the first valve section 2228a of the valve body 2202 can be in fluid communication with a first external hydraulic circuit 2380 that can be configured to provide flow to and from a first component 2382. Similarly, the third and fourth valve ports 2214c, 2214d of the second valve section 2228b of the control valve 2202 can be in fluid communication with a second hydraulic circuit 2384 that can be configured to provide flow to and from a second component 2386. In the illustrated non-limiting example, the first and second external hydraulic circuits 2380, 2384 are fluidly isolated to each other by a dividing sidewall 2390 (such as, e.g., the central sidewall 244 of the valve body 202 of the control valve 200) of the valve body 2202 arranged between the first and second valve chambers 2204a, 2204b (i.e., the first and second valve sections 2470a, 2470b).

Further, in the illustrated non-limiting example, the first and second external hydraulic circuits 2380, 2384 can be thermally isolated from each other by an interior compartment 2392 of the dividing sidewall 2390 of the valve body 2202. For example, the first hydraulic circuit 2380 can be configured to provide hydraulic fluid at a first temperature to the first component 2382, and the second hydraulic circuit 2384 can be configured to provide hydraulic fluid at a second temperature that is different than the first temperature to the second component 2384. Thus, to help limit or reduce heat transfer between the first valve section 2470a having the hydraulic fluid at the first temperature and the second valve section 2470b having the hydraulic fluid at the second temperature, the interior compartment 2392 of the dividing sidewall 2390 can be filled with a fluid (e.g., gas or liquid). In some non-limiting examples, the interior compartment 2392 of the dividing sidewall 2390 of the valve body 2202 can be filled with an insulating material (e.g., foam). In some non-limiting examples, the dividing sidewall 2390 have a thickness that is greater than that of other sidewalls of the valve body 2202. In some non-limiting examples, the dividing sidewall 2390 of the valve body 2202 can include a plurality of interior compartments that can be filled with one or both of a fluid or an insulating material. In some non-limiting examples, the dividing sidewall 2390 of the valve body 2202 can include a plurality of dividing sidewalls arranged in series between the first and second valve sections 2470a, 2470b and at least some of the plurality of dividing sidewalls can include one or more interior compartments 2392.

In some non-limiting examples, the control valves described herein can be implemented in coolant applications, refrigerant applications, oil applications, water applications, fuel applications, air applications, or other gaseous or liquid fluid applications. Other non-limiting example applications can include a valve that can be used as a flow diverting valve, an on/off valve (such as, e.g., a bi-stable valve), or a proportional valve.

In some non-limiting examples, devices or systems (e.g., a control valve or a poppet assembly of a control valve) disclosed herein can be utilized, manufactured, or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, a method of manufacturing relevant components of such a device or system (or the device or system as a whole), and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as non-limiting examples, of the utilized features and implemented capabilities of such device or system.

Within this specification examples have been described in a way which enables a clear and concise specification to be written, but it is intended and will be appreciated that examples can be variously combined or separated without parting from the disclosure. For example, it will be appreciated that all preferred features described herein are applicable to all aspects of the disclosure described herein.

Thus, while the disclosure has been described in connection with particular examples, the disclosure is not necessarily so limited, and that numerous other examples, implementations, uses, modifications and departures from the examples and uses are intended to be encompassed by the claims attached hereto. The entire disclosure of each patent and publication cited herein is incorporated by reference, as if each such patent or publication were individually incorporated by reference herein.

Various features and advantages of the disclosure are set forth in the following claims.

We claim:

1. A control valve, comprising:

a valve body having a first side and a second side opposite the first side;

a first valve chamber arranged within the valve body;

a second valve chamber arranged within the valve body, wherein the first and second valve chambers are separated by a sidewall of the valve body that extends between the first and second sides of the valve body, and wherein the sidewall of the valve body defines an interior compartment, the interior compartment being configured to thermally isolate the first valve chamber from the second valve chamber;

one or more chamber ports to provide fluid communication to or from the first valve chamber and the second valve chamber, a camshaft extending through the valve body into the first valve chamber and the second valve chamber, and defining a camshaft axis, the camshaft including a cam lobe; an actuator coupled to the camshaft and configured to selectively rotate the camshaft about the camshaft axis; and a poppet assembly received within each of the first valve chamber and the second valve chamber, the poppet assembly including:

a poppet carriage operatively coupled to the camshaft and in engagement with the cam lobe such that the poppet carriage is movable by the camshaft between a first end position and a second end position along a poppet axis; a poppet coupled to the poppet carriage; and a spring configured to bias the poppet carriage radially away from the camshaft, toward the first end position, in a first radial direction relative to the camshaft axis;

wherein when the camshaft is rotated, the cam lobe engages the poppet carriage to move the poppet carriage from the first end position toward the second end position in a second radial direction that is opposite the first radial direction.

2. The control valve of claim 1, wherein the poppet is in a closed position when the poppet carriage is in the first end position.

3. The control valve of claim 2, wherein the poppet includes a sealing element arranged along an outer perimeter of the poppet to provide a seal between the poppet and one of the one or more chamber ports when the poppet is in the closed position.

4. The control valve of claim 2, wherein the poppet carriage has a first end, a second end opposite the first end, and a carriage opening extending through the poppet carriage between the first and second ends; wherein the poppet is coupled to the first end of the poppet carriage; and wherein the camshaft extends through the carriage opening of the poppet carriage to arrange the cam lobe in axial alignment with the carriage opening.

5. The control valve of claim 4, wherein the poppet carriage has a protrusion extending from the second end, towards the camshaft, into the carriage opening, wherein the cam lobe engages the protrusion of the poppet carriage to move the poppet carriage toward the second end position.

6. A control valve, comprising:

a valve body including a valve chamber, a first chamber port, and a chamber second port, the first and second chamber ports being configured to provide fluid communication to or from the valve chamber;

a camshaft extending through the valve body into the valve chamber and defining a camshaft axis, the camshaft including a cam;

an actuator coupled to the camshaft and configured to selectively rotate the camshaft about the camshaft axis; and a poppet cartridge received within the valve chamber and having a poppet axis, the poppet cartridge including:

a first poppet carriage having a first carriage opening extending through the first poppet carriage between a first outer end and a first inner end of the first poppet carriage, the first carriage opening defining a first engagement surface to be engaged by the cam such that the first poppet carriage is movable by the camshaft along the poppet axis between a first poppet closed position and a first poppet open position;

a first poppet coupled to the first outer end of the first poppet carriage;

a second poppet carriage having a second carriage opening extending through the second poppet carriage between a second outer end and a second inner end of the second poppet carriage, the second carriage opening defining a second engagement surface to be engaged by the cam such that the second poppet carriage is movable by the camshaft along the poppet axis between a second poppet closed position and a second poppet open position;

a second poppet coupled to the second outer end of the second poppet carriage; and a spring configured to bias the first and second poppet carriages radially away from the camshaft axis;

wherein the first engagement surface of the first poppet carriage is radially opposite the first poppet relative to the camshaft axis, and the second engagement surface of the second poppet carriage is radially opposite the second poppet relative to the camshaft axis.

7. The control valve of claim 6, wherein the camshaft extends through the first carriage opening of the first poppet carriage and the second carriage opening of the second poppet carriage such that, when the camshaft is rotated, the cam rotationally engages one or both of: the first engagement surface of the first poppet carriage to move the first poppet carriage from the first poppet closed position toward the first poppet open position, or the second engagement surface of the second poppet carriage to move the second poppet carriage from the second poppet closed position toward the second poppet open position.

8. The control valve of claim 6, wherein the first engagement surface of the first poppet carriage is radially opposite the second engagement surface of the second poppet carriage, relative to the camshaft axis.

9. The control valve of claim 8, wherein the spring biases the first poppet carriage toward the first poppet closed position in a first axial direction relative to the poppet axis and the second poppet carriage toward the second poppet closed position in a second axial direction that is opposite the first axial direction.

10. The control valve of claim 8, wherein the first and second poppets are axially aligned along the poppet axis.

11. The control valve of claim 6, wherein the first engagement surface of the first poppet carriage includes a first protrusion that extends radially toward the camshaft axis and partially into the first carriage opening; wherein the second engagement surface of the second poppet carriage includes a second protrusion that extends radially toward the camshaft axis and partially into the second carriage opening; and wherein the cam of the camshaft is configured to selectively engage the first protrusion of the first poppet carriage and the second protrusion of the second poppet carriage.

12. The control valve of claim 6, wherein the valve chamber of the valve body is a first valve chamber, and the valve body further includes a second valve chamber adjacent to the first valve chamber, wherein the first and second valve chambers are separated by a sidewall of the valve body that extends between first and second sides of the valve body, and wherein the sidewall of the valve body defines an interior compartment, the interior compartment being configured to thermally isolate the first valve chamber from the second valve chamber of the valve body.

13. A control valve, comprising:

a valve body having a first side and a second side opposite the first side;

a valve chamber arranged within the valve body and having a first chamber port disposed along the first side of the valve body and a second chamber port disposed along the second side of the valve body;

a camshaft arranged within a camshaft opening of the valve body, the camshaft opening extending through a first end of the valve body that is adjacent to the first and second sides of the valve body and a second end of the valve body, opposite the first end, along a camshaft axis, the camshaft having a first cam lobe and a second cam lobe;

an actuator coupled to the camshaft and configured to selectively rotate the camshaft in at least one rotational direction about the camshaft axis; a first valve chamber manifold coupled to the first side of the valve body and defining a first manifold passageway in fluid communication with the first chamber port;

a second valve chamber manifold coupled to the second side of the valve body and defining a second manifold passageway in fluid communication with the second chamber port; a cartridge slot extending within the valve chamber between the first side of the valve body and the second side of the valve body; and a poppet cartridge received within the cartridge slot of the valve body and operatively coupled to the camshaft, the poppet cartridge including:

a first poppet carriage having a first poppet and movable between a first poppet open position and a first poppet closed position, the first poppet being configured to engage the first chamber port when the first poppet carriage is in the first poppet closed position;

a second poppet carriage having a second poppet and movable between a second poppet open position and a second poppet closed position, the second poppet being configured to engage the second chamber port when the second poppet carriage is in the second poppet closed position; and a spring coupled between the first and second poppet carriages, the spring being configured to bias the first poppet toward the first poppet closed position and bias the second poppet toward the second poppet closed position;

wherein the first cam lobe of the camshaft is configured to engage the first poppet carriage to move the first poppet carriage from the first poppet closed position toward the first poppet open position, and the second cam lobe of the camshaft is configured to engage the second poppet carriage to move the second poppet carriage from the second poppet closed position toward the second poppet open position.

14. The control valve of claim 13, wherein the second poppet carriage is configured to slidably engage the first poppet carriage such that the first and second poppet carriages are slidably moveable relative each other within the cartridge slot of the valve chamber.

15. The control valve of claim 13, further comprising: a seal plate arranged between the second valve chamber manifold and the second side of the valve body, the seal plate being configured to partially define the valve chamber such that the second chamber port is defined by the seal plate.

16. The control valve of claim 13, wherein the cartridge slot is a first cartridge slot, and the control valve further comprises a second cartridge slot extending between the first and second sides of the valve body; and wherein a first poppet cartridge is received within the first cartridge slot and a second poppet cartridge is received within the second cartridge slot.

17. The control valve of claim 16, wherein the valve chamber of the valve body is a first valve chamber, and the valve body further includes a second valve chamber adjacent to the first valve chamber; wherein the first and second valve chambers are separated by a sidewall of the valve body that extends between the first and second sides of the valve body.

18. The control valve of claim 17, wherein the first valve chamber is in fluid communication with the second valve chamber via one or more of: the first manifold passageway of the first valve chamber manifold; the second manifold passageway of the second valve chamber manifold; or a third manifold passageway of either of the first or second valve chamber manifolds.

19. The control valve of claim 18, wherein the sidewall of the valve body defines an interior compartment, the interior compartment being configured to thermally isolate the first valve chamber from the second valve chamber of the valve body.

* * * * *